(12) United States Patent
Liu

(10) Patent No.: US 12,289,589 B2
(45) Date of Patent: Apr. 29, 2025

(54) ELECTROACOUSTIC TRANSDUCER, SPEAKER MODULE, AND ELECTRONIC DEVICE

(71) Applicant: Huawei Technologies Co., Ltd., Shenzhen (CN)

(72) Inventor: Jinhua Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 187 days.

(21) Appl. No.: 17/926,296

(22) PCT Filed: May 13, 2021

(86) PCT No.: PCT/CN2021/093655
§ 371 (c)(1),
(2) Date: Nov. 18, 2022

(87) PCT Pub. No.: WO2021/233204
PCT Pub. Date: Nov. 25, 2021

(65) Prior Publication Data
US 2023/0217179 A1 Jul. 6, 2023

(30) Foreign Application Priority Data

May 20, 2020 (CN) .......................... 202010431755.2
Jul. 15, 2020 (CN) .......................... 202010683159.3

(51) Int. Cl.
*H04R 9/02* (2006.01)
*H04M 1/03* (2006.01)
(Continued)

(52) U.S. Cl.
CPC ............ *H04R 9/025* (2013.01); *H04M 1/035* (2013.01); *H04R 7/18* (2013.01); *H04R 9/045* (2013.01); *H04R 9/06* (2013.01); *H04R 2499/11* (2013.01)

(58) Field of Classification Search
CPC . H04R 9/06; H04R 9/045; H04R 7/18; H04R 2499/11
See application file for complete search history.

(56) References Cited

U.S. PATENT DOCUMENTS 10,003,887 B2  6/2018  Linghu et al.
10,250,989 B1  4/2019  Xiao et al.
(Continued)

FOREIGN PATENT DOCUMENTS

CN   109348372 A  *  2/2019  ............... H04R 7/16
CN   109348672 A  *  2/2019
(Continued)

OTHER PUBLICATIONS

Chen Jing et al, Dynamic Characteristics of Novel Single-chip Fabricated Corrugated Diaphragms for Micro-acoustic Devices, 2001, 4 pages.
(Continued)

*Primary Examiner* — Sunita Joshi
(74) *Attorney, Agent, or Firm* — Conley Rose, P.C.

(57) ABSTRACT

An electroacoustic transducer includes a framework, a voice membrane, a voice coil, a flexible circuit board, an auxiliary diaphragm, and a first gasket. An edge of the voice membrane is fastened to a top surface of the framework. The voice coil is located on an inner side of the framework, and one end of the voice coil is fastened to the voice membrane. A first fastening part of the flexible circuit board is fastened to a bottom surface of the framework, and a second fastening part of the flexible circuit board is fastened to the voice coil. The auxiliary diaphragm is located on one side of the flexible circuit board. The first gasket is located between the first fastening part of the flexible circuit board and the first fastening part of the auxiliary diaphragm.

20 Claims, 57 Drawing Sheets

(51) Int. Cl.
    *H04R 7/18*    (2006.01)
    *H04R 9/04*    (2006.01)
    *H04R 9/06*    (2006.01)

(56) References Cited

U.S. PATENT DOCUMENTS

| | | |
|---|---|---|
| 2014/0093119 A1 | 4/2014 | Kagawa et al. |
| 2020/0045466 A1 | 2/2020 | Song et al. |
| 2020/0213755 A1 | 7/2020 | Liang et al. |
| 2020/0389735 A1 | 12/2020 | Yu et al. |
| 2020/0413199 A1 | 12/2020 | Song et al. |

FOREIGN PATENT DOCUMENTS

| | | | |
|---|---|---|---|
| CN | 109379680 A | | 2/2019 |
| CN | 208924473 U | | 5/2019 |
| CN | 109862484 A | | 6/2019 |
| CN | 209390365 U | | 9/2019 |
| CN | 209897255 U | | 1/2020 |
| CN | 210093522 U | | 2/2020 |
| CN | 111131976 A | | 5/2020 |
| CN | 213938307 U | * | 8/2021 |
| JP | H0984189 A | | 3/1997 |
| WO | 2018128324 A1 | | 7/2018 |

OTHER PUBLICATIONS

Xu Shihe et al, "Electro-acoustic Devices with Adhesive Bonding of the Principles and Application of Technology," 2014, 9 pages.

* cited by examiner

ELECTROACOUSTIC TRANSDUCER, SPEAKER MODULE, AND ELECTRONIC DEVICE

CROSS-REFERENCE TO RELATED APPLICATIONS

This is a U.S. National Stage of International Patent Application No. PCT/CN2021/093655 filed on May 13, 2021, which claims priority to Chinese Patent Application No. 202010683159.3 filed on Jul. 15, 2020, and claims priority to Chinese Patent Application No. 202010431755.2 filed on May 20, 2020. All of the aforementioned applications are hereby incorporated by reference in their entireties.

TECHNICAL FIELD

This application relates to the field of audio technologies, and in particular, to an electroacoustic transducer, a speaker module, and an electronic device.

BACKGROUND

A moving coil micro speaker is an electroacoustic transducer, and is currently a commonly used audio component of a portable electronic device. Because a voice coil is inserted into a magnetic circuit of the speaker, an auxiliary diaphragm vibrates with the voice coil in the magnetic circuit, and is likely to interfere with another part of the speaker, making it difficult for the speaker to drive at large vibration amplitude and resulting in poor low-frequency sensitivity of the speaker.

SUMMARY

This application is intended to provide an electroacoustic transducer with large vibration amplitude and high sensitivity, a speaker module, and an electronic device.

According to a first aspect, this application provides an electroacoustic transducer, including a framework, a voice membrane, a voice coil, a flexible circuit board, an auxiliary diaphragm, and a first gasket. An edge of the voice membrane is fastened to a top surface of the framework. The voice coil is located on an inner side of the framework, and one end of the voice coil is fastened to the voice membrane. The flexible circuit board includes a first fastening part, a connection stub, and a second fastening part that are sequentially connected, the first fastening part of the flexible circuit board is fastened to a bottom surface of the framework, and the second fastening part of the flexible circuit board is fastened to the voice coil. The auxiliary diaphragm is located on one side of the flexible circuit board, the auxiliary diaphragm includes a first fastening part, a vibration part, and a second fastening part that are sequentially connected, the first fastening part of the auxiliary diaphragm is fastened to the first fastening part of the flexible circuit board, the vibration part of the auxiliary diaphragm protrudes in a direction away from the connection stub of the flexible circuit board, and the second fastening part of the auxiliary diaphragm is fastened to the second fastening part of the flexible circuit board. The first gasket is located between the first fastening part of the flexible circuit board and the first fastening part of the auxiliary diaphragm.

In the electroacoustic transducer shown in this application, the first gasket is located between the first fastening part of the flexible circuit board and the first fastening part of the auxiliary diaphragm, to increase a distance between the first fastening part of the flexible circuit board and the first fastening part of the auxiliary diaphragm in a thickness direction of the electroacoustic transducer, further increase a distance between the connection stub of the flexible circuit board and the vibration part of the auxiliary diaphragm in the thickness direction of the electroacoustic transducer, and avoid a problem that noise is generated by interference between the vibration part of the auxiliary diaphragm and the connection stub of the flexible circuit board, thereby increasing amplitude of the electroacoustic transducer, reducing a resonance frequency of the electroacoustic transducer, and improving low-frequency sensitivity and loudness of the electroacoustic transducer.

Fastening may be a direct connection or an indirect connection, and the indirect connection means that another part is further connected between the two.

In an implementation, the electroacoustic transducer further includes a second gasket, and the second gasket is located between the second fastening part of the flexible circuit board and the second fastening part of the auxiliary diaphragm, to increase a distance between the second fastening part of the flexible circuit board and the second fastening part of the auxiliary diaphragm in the thickness direction of the electroacoustic transducer, further increase the distance between the connection stub of the flexible circuit board and the vibration part of the auxiliary diaphragm in the thickness direction of the electroacoustic transducer, and avoid a problem that noise is generated by interference between the vibration part of the auxiliary diaphragm and the connection stub of the flexible circuit board, thereby increasing amplitude of the electroacoustic transducer, reducing a resonance frequency of the electroacoustic transducer, and improving low-frequency sensitivity and loudness of the electroacoustic transducer.

In an implementation, the auxiliary diaphragm is located on a side that is of the flexible circuit board and that faces the voice membrane. In this case, the vibration part of the auxiliary diaphragm is located on an outer side of the voice coil, so that bottom-side space of the auxiliary diaphragm is released, and interference between the vibration part of the auxiliary diaphragm and a part (for example, a lower electrode plate) that is in the electroacoustic transducer and that is located on a bottom side of the auxiliary diaphragm is avoided.

In an implementation, the auxiliary diaphragm is located on a side that is of the flexible circuit board and that is away from the voice membrane. In this case, the vibration part of the auxiliary diaphragm protrudes in a direction away from the voice coil, so that the auxiliary diaphragm can fully use bottom-side space of the auxiliary diaphragm to vibrate, thereby increasing vibration amplitude of the electroacoustic transducer and improving low-frequency sensitivity and loudness of the electroacoustic transducer.

The second fastening part of the flexible circuit board is fastened to an outer side surface of the voice coil, so that the flexible circuit board and the auxiliary diaphragm at least partially multiplex a distance of the voice coil in the thickness direction of the electroacoustic transducer, thereby avoiding interference between the vibration part of the auxiliary vibration film and a part (for example, a lower electrode plate) that is in the electroacoustic transducer and that is located on a bottom side of the auxiliary diaphragm.

In an implementation, the electroacoustic transducer further includes an auxiliary bobbin, the auxiliary bobbin is fastened to the outer side surface of the voice coil, a bottom surface of the auxiliary bobbin is located on a side that is of a bottom surface of the voice coil and that faces a top surface of the voice coil, and the second fastening part of the flexible circuit board is fastened to the bottom surface of the auxiliary bobbin, so that connection stability between the second fastening part of the flexible circuit board and the voice coil is improved.

In an implementation, the electroacoustic transducer further includes a voice coil bobbin, and the voice coil bobbin is located between the voice membrane and the voice coil. The voice coil bobbin isolates the voice coil from the voice membrane, so that the voice membrane is away from the voice coil. In addition, the voice coil bobbin can dissipate heat of the voice coil to reduce a risk of damage to the voice membrane caused by overheating of the voice coil. In addition, the voice coil is connected to the voice membrane by using a connection frame. Therefore, a spacing between the voice membrane and an end part that is of the voice coil and that is away from the voice membrane is large, so that the voice coil can be fully inserted into a magnetic circuit, and a magnetic field generated by the magnetic circuit effectively acts on the voice coil. In addition, a spacing between the voice membrane and the magnetic circuit is large, so that vibration space of the voice membrane is large, thereby implementing large-amplitude vibration of the voice membrane.

The auxiliary bobbin and the voice coil bobbin are integrally formed to simplify a molding process of the auxiliary bobbin and further facilitate assembly and disassembly between the auxiliary bobbin and the voice coil.

In an implementation, a bottom surface of the second fastening part of the auxiliary diaphragm is flush with the bottom surface of the voice coil, or a bottom surface of the second fastening part of the auxiliary diaphragm is located on the side that is of the bottom surface of the voice coil and that faces the top surface of the voice coil, so that the second fastening part of the flexible circuit board and the second fastening part of the auxiliary diaphragm completely multiplex the distance of the voice coil in the thickness direction of the electroacoustic transducer, thereby avoiding interference between the vibration part of the auxiliary diaphragm and the part that is in the electroacoustic transducer and that is located on the bottom side of the auxiliary diaphragm.

In an implementation, the electroacoustic transducer further includes a lower electrode plate, a central magnet, and two first side magnets, the lower electrode plate is located on a side that is of the framework and that is away from the voice membrane, the central magnet and the two first side magnets are fastened to a top surface of the lower electrode plate, the two first side magnets are symmetrically arranged on two sides of the central magnet, a first gap is formed between each first side magnet and the central magnet, and an end that is of the voice coil and that is away from the voice membrane is partially located in the first gap.

As a magnetic conductive part, the lower electrode plate can close a magnetic field to reduce adverse impact of the magnetic field of the electroacoustic transducer on an ambient environment. The lower electrode plate can serve as a carrier to fasten the central magnet and the two first side magnets, so that a relative location relationship between the plurality of magnets is stable and reliable, thereby improving reliability of the electroacoustic transducer.

In an implementation, the electroacoustic transducer further includes a central electrode plate and a side electrode plate, the central electrode plate is fastened on a side that is of the central magnet and that is away from the lower electrode plate, the side electrode plate is fastened to the inner side of the framework, and is spaced apart from the flexible circuit board, the side electrode plate includes two first electrode plate parts, the two first electrode plate parts respectively directly face the two first side magnets, a second gap is formed between each first electrode plate part and the central electrode plate, the second gap is connected to the first gap, and the voice coil is partially located in the second gap.

In an implementation, two ends of the lower electrode plate are bent to form two mounting parts through extension, the two mounting parts are symmetrically arranged on the other two sides of the central magnet, and a third gap is formed between each mounting part and the central magnet. The side electrode plate further includes a connection frame part, the first electrode plate part is located on an inner side of the connection frame part, a portion of the connection frame part directly faces the mounting part, a fourth gap is formed between the portion of the connection frame part and the central electrode plate, the fourth gap is connected to the third gap, and the voice coil is partially located in the third gap, and is partially located in the fourth gap.

In an implementation, there are two flexible circuit boards, two auxiliary diaphragms, and two first gaskets, the two flexible circuit boards, the two auxiliary diaphragms, and the two first gaskets are symmetrically arranged on two sides of the central magnet, a second fastening part of each auxiliary diaphragm is fastened to a middle part of a second fastening part of one flexible circuit board, and each first gasket is fastened to a middle part of a first fastening part of one flexible circuit board.

Two avoidance grooves are disposed on the lower electrode plate, and openings of the two avoidance grooves are located on the top surface of the lower electrode plate, and respectively directly face vibration parts of the two auxiliary diaphragms, to increase a distance between the vibration part of the auxiliary diaphragm and the lower electrode plate in the thickness direction of the electroacoustic transducer and avoid a problem that the vibration part of the auxiliary diaphragm interferes with the lower electrode plate when vibrating with the voice coil, thereby increasing amplitude of the electroacoustic transducer and improving low-frequency sensitivity and loudness of the electroacoustic transducer.

In an implementation, the electroacoustic transducer further includes two second side magnets, the two second side magnets are symmetrically arranged on the other two sides of the central magnet, and a third gap is formed between each second side magnet and the central magnet. The side electrode plate further includes a second electrode plate part, the second electrode plate part directly faces the second side magnet, a fourth gap is formed between the second electrode plate part and the central electrode plate, the fourth gap is connected to the third gap, and the voice coil is partially located in the third gap, and is partially located in the fourth gap.

In an implementation, there are two flexible circuit boards, four auxiliary diaphragms, and four first gaskets, the two flexible circuit boards, the four auxiliary diaphragms, and the four first gaskets are separately symmetrically arranged on two sides of the central magnet, second fastening parts of every two auxiliary diaphragms are respectively fastened to two fastening end parts of a second fastening part of one flexible circuit board, and every two first gaskets are respectively fastened to two end parts of a first fastening part of one flexible circuit board.

Four avoidance grooves are disposed on the lower electrode plate, and openings of the four avoidance grooves are located on the top surface of the lower electrode plate, and respectively directly face vibration parts of the four auxiliary diaphragms, to increase a distance between the vibration part of the auxiliary diaphragm and the lower electrode plate in the thickness direction of the electroacoustic transducer and avoid a problem that the vibration part of the auxiliary diaphragm interferes with the lower electrode plate when vibrating with the voice coil, thereby increasing amplitude of the electroacoustic transducer and improving low-frequency sensitivity and loudness of the electroacoustic transducer.

In an implementation, the electroacoustic transducer further includes a basket, the basket includes the framework and a plurality of feet, and the plurality of feet are fastened to the bottom surface of the framework at intervals, and are fastened to the lower electrode piece.

In the electroacoustic transducer, the plurality of feet provide a support between the framework and the lower electrode plate, and the plurality of feet can have support and connection functions, and occupy little space between the framework and the lower electrode plate, so that large magnetic circuit arrangement space is formed between the framework and the lower electrode plate, and the magnetic circuit can fully use the space for magnet arrangement, and therefore the electroacoustic transducer has high magnetic induction intensity and high sensitivity.

In an implementation, a thickness of the first gasket falls between 0.1 mm and 0.5 mm, so that the distance between the first fastening part of the auxiliary diaphragm and the first fastening part of the flexible circuit board in the thickness direction of the electroacoustic transducer can be increased by at least 0.1 mm. In this case, amplitude of the electroacoustic transducer may be increased by at least 0.1 mm.

In an implementation, the first gasket and the flexible circuit board are integrally formed to simplify a molding process of the first gasket. The first gasket is a copper sheet, an aluminum foil sheet, a polyimide reinforcement plate, or a glass fiber reinforcement plate.

In an implementation, the first gasket and the auxiliary diaphragm are integrally formed to simplify a molding process of the first gasket. The first gasket is a copper ring, a plastic ring, or a steel ring.

According to a second aspect, this application further provides an electroacoustic transducer, including a framework, a voice membrane, a voice coil, a flexible circuit board, an auxiliary diaphragm, and a lower electrode plate. An edge of the voice membrane is fastened to a top surface of the framework. The voice coil is located on an inner side of the framework, one end of the voice coil is fastened to the voice membrane, and the lower electrode plate is located on a side that is of the framework and that is away from the voice membrane, and is spaced apart from the framework. The flexible circuit board includes a first fastening part, a connection stub, and a second fastening part that are sequentially connected, the first fastening part of the flexible circuit board is fastened to a bottom surface of the framework, and the second fastening part of the flexible circuit board is fastened to an outer side surface of the voice coil. The auxiliary diaphragm is located on a side that is of the flexible circuit board and that is away from the voice membrane, the auxiliary diaphragm includes a first fastening part, a vibration part, and a second fastening part that are sequentially connected, the first fastening part of the auxiliary diaphragm is fastened to the first fastening part of the flexible circuit board, the vibration part of the auxiliary diaphragm protrudes in a direction away from the connection stub of the flexible circuit board, and the second fastening part of the auxiliary diaphragm is fastened to the second fastening part of the flexible circuit board. The lower electrode plate is located on a side that is of the auxiliary diaphragm and that is away from the flexible circuit board.

In the electronic device shown in this embodiment, because the flexible circuit board is connected to the outer side surface of the voice coil, the flexible circuit board and the auxiliary diaphragm can at least partially multiplex a distance of the voice coil in a thickness direction of the electroacoustic transducer, so that the three parts named the voice coil, the flexible circuit board, and the auxiliary diaphragm are prevented from being superposed in the thickness direction of the electroacoustic transducer, vibration space between the vibration part of the auxiliary diaphragm and the lower electrode plate is increased, and a risk of interference between the vibration part of the auxiliary diaphragm and the lower electrode plate is avoided, thereby increasing amplitude of the electroacoustic transducer, implementing large-amplitude vibration of the electroacoustic transducer, and improving low-frequency sensitivity and loudness of the electroacoustic transducer.

In an implementation, the electroacoustic transducer further includes an auxiliary bobbin, the auxiliary bobbin is located on the inner side of the framework, and is fastened to the outer side surface of the voice coil, a bottom surface of the auxiliary bobbin is located on a side that is of a bottom surface of the voice coil and that faces a top surface of the voice coil, and the second fastening part of the flexible circuit board is fastened to the bottom surface of the auxiliary bobbin, so that connection stability between the second fastening part of the flexible circuit board and the voice coil is improved.

According to a third aspect, this application further provides a speaker module, including a module upper-housing and any one of the foregoing electroacoustic transducers. The electroacoustic transducer is fastened to the module upper-housing, a front sound cavity is formed between a voice membrane and the module upper-housing, a sound outlet hole is disposed on the module upper-housing, and the sound outlet hole is connected to the front sound cavity and the outside of the speaker module.

In the speaker module shown in this application, because amplitude of the electroacoustic transducer is large, and sensitivity of the electroacoustic transducer is high, sound quality of the speaker module is better.

In an implementation, the speaker module further includes a module lower-housing, the module lower-housing and the module upper-housing are fastened to each other, the electroacoustic transducer is located on inner sides of the module lower-housing and the module upper-housing, a rear sound cavity is formed on a side that is of the voice membrane and that is away from the front sound cavity, a leakage hole is disposed on the module lower-housing, and the leakage hole is connected to the rear sound cavity and the outside of the speaker module.

In the speaker module shown in this application, the module lower-housing and the module upper-housing are covered to form a modular structure, so that the module lower-housing and the module upper-housing can fully protect the electroacoustic transducer located on the inner sides of the module lower-housing and the module upper-housing, and an assembly structure of the speaker module and another part is also simplified.

According to a fourth aspect, this application further provides an electronic device, including a housing and any one of the foregoing speaker modules. The speaker module is accommodated inside the housing, a speaker hole is disposed on the housing, and the speaker hole is connected to a sound outlet hole and the outside of the electronic device.

In the electronic device shown in this application, the speaker module can produce high sound quality, so that sound play performance of the electronic device is better, and user experience is improved.

According to a fifth aspect, this application further provides an electronic device, including a housing, a display module, and a receiver. The display module is fastened to the housing, the receiver is accommodated inside the housing, and the receiver is any one of the foregoing electroacoustic transducers. A receiving hole is disposed on the display module, a receiving hole is formed between an edge of the display module and the housing, or a receiving hole is disposed on the housing. A sound emitted by the receiver is transmitted to the outside of the electronic device through the receiving hole.

In the electronic device shown in this application, because amplitude of the electroacoustic transducer is large, and sensitivity of the electroacoustic transducer is high, a microphone that uses the electroacoustic transducer can produce high sound quality, so that sound play performance of the electronic device is better, and user experience is improved.

BRIEF DESCRIPTION OF DRAWINGS

To describe technical solutions in embodiments of this application or in the background more clearly, the following describes the accompanying drawings used in embodiments of this application or in the background.

DESCRIPTION OF EMBODIMENTS

The following describes embodiments of this application with reference to the accompanying drawings in embodiments of this application.

Figure 1:
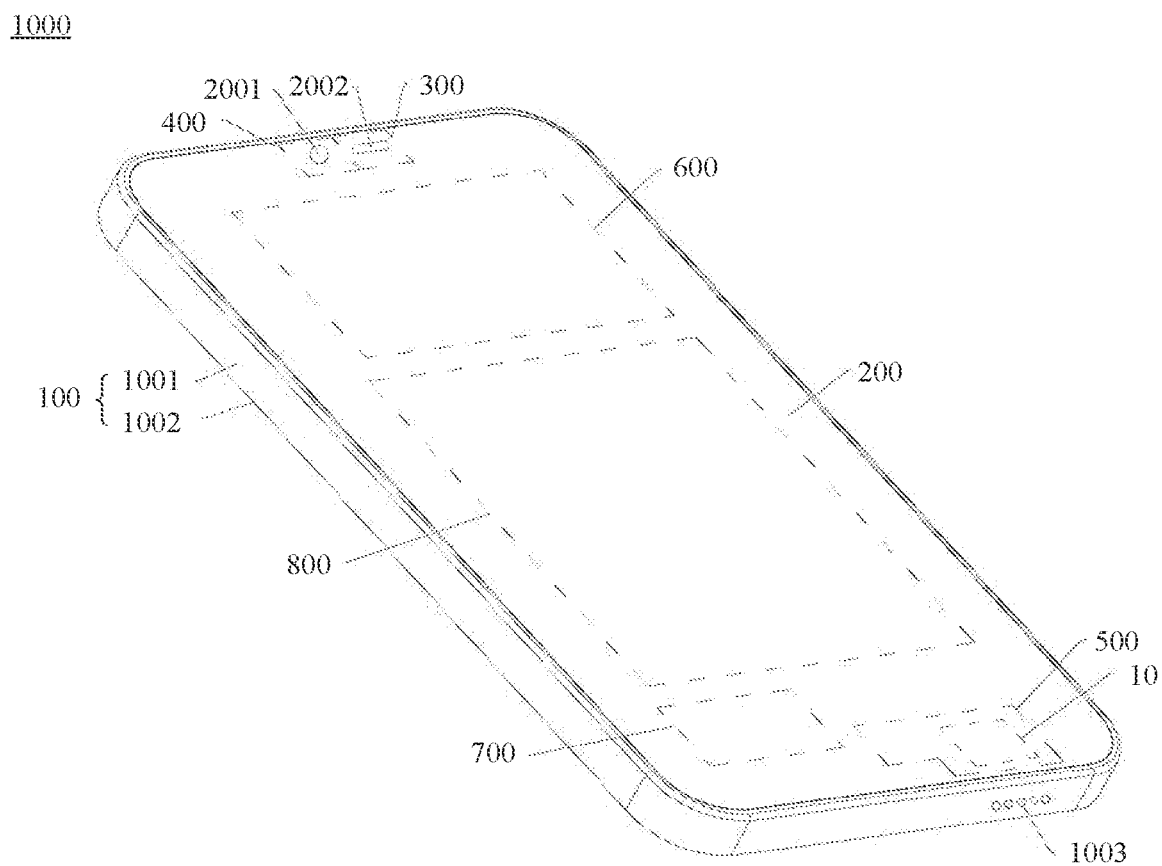
FIG. 1 is a schematic diagram of a structure of an electronic device according to an embodiment of this application.

FIG. 1 is a schematic diagram of a structure of an electronic device 1000 according to an embodiment of this application.

The electronic device 1000 may be an electronic product that has an audio play function, for example, a mobile phone, a tablet computer, a notebook computer, an in-vehicle infotainment system, a point of sales terminal (point of sales terminal, POS terminal for short), a wearable device, or a walkman. The wearable device may be a smart band, a smart watch, augmented reality (augmented reality, AR) glasses, virtual reality (virtual reality, VR) glasses, or the like. An example in which the electronic device 1000 is a mobile phone is used for description in this embodiment of this application.

The electronic device 1000 includes a housing 100, a display module 200, a receiver 300, a camera module 400, a speaker module 500, a first circuit board 600, a second circuit board 700, and a battery 800.

The housing 100 includes a frame 1001 and a rear cover 1002, and the rear cover 1002 is fastened on one side of the frame 1001. The frame 1001 and the rear cover 1002 may be integrally formed, or may be assembled to form an integral structure. A speaker hole 1003 is disposed on the housing 100, and there may be one or more speaker holes 1003. For example, there are a plurality of speaker holes 1003, and the plurality of speaker holes 1003 are disposed on the frame 1001. The speaker hole 1003 connects the inside of the electronic device 1000 and the outside of the electronic device 1000. It should be noted that the "hole" described in this embodiment of this application is a hole with a complete hole wall. A "hole" described below should be understood in a same way.

The display module 200 is fastened to the housing 100. Specifically, the display module 200 is fastened on a side that is of the frame 1001 and that is away from the rear cover 1002, and the inside of the electronic device 1000 is enclosed by the display module 200, the frame 1001, and the rear cover 1002. A light transmitting part 2001 and a receiving hole 2002 are disposed on the display module 200. The light transmitting part 2001 is a region that is in the display module 200 and that allows light to pass through. The receiving hole 2002 is a through hole penetrating the display module 200.

In an implementation, the display module 200 includes a cover plate and a display panel, the cover plate is fastened to the housing 100, and the display panel is fastened to an inner surface that is of the cover plate and that faces the housing 100. Specifically, the cover plate is fastened to the frame 1001 of the housing 100, and is configured to protect the display panel. The display panel is fastened to an inner surface that is of the cover plate and that faces the rear cover 1002, and is configured to display an image. A touch function may be further integrated into the display panel.

In some other embodiments, the receiving hole 2002 may be formed between the edge of the display module 200 and the housing 100. For example, the receiving hole 2002 is formed between the display module 200 and a top edge of the frame 1001 of the housing 100. Alternatively, in some other embodiments, the receiving hole 2002 is disposed on the housing 100. For example, the receiving hole 2002 is formed in a top region of the frame 1001 of the housing 100. It should be understood that a specific formation structure and a specific location of the receiving hole 2002 are not strictly limited in this application.

The receiver 300, the camera module 400, the speaker module 500, the first circuit board 600, the second circuit board 700, and the battery 800 are all accommodated inside the housing 100, and are all located between the display module 200 and the rear cover 1002. The inside of the housing 100 is the foregoing inside of the electronic device 1000.

Both the receiver 300 and the camera module 400 are located at the top of the electronic device 1000. A sound emitted by the receiver 300 is transmitted to the outside of the electronic device 1000 through the receiving hole 2002, to implement a sound play function of the electronic device 1000. For example, the receiver 300 may be an electroacoustic transducer described in the following embodiments. In other embodiments, the receiver 300 may be an electroacoustic transducer of another structure.

The camera module 400 collects light by using the light transmitting part 2001 of the display module 200, to perform image or video photographing as a front-facing camera module of the electronic device 1000. For example, the electronic device 1000 may further include another camera module (not shown in the figure) accommodated inside the housing 100. In this case, a photographing through hole may be disposed on the rear cover 1002, and the another photographing module collects light by using the photographing through hole, to perform image or video photographing as a rear-facing camera module of the electronic device 1000.

The speaker module 500 is located at the bottom of the electronic device 1000. A sound emitted by the speaker module 500 can be transmitted to the outside of the electronic device 1000 through the speaker hole 1003, to implement a sound play function of the electronic device 1000. The speaker module 500 includes a speaker core (not shown in the figure), and the speaker core may be an electroacoustic transducer described in the following embodiments.

The first circuit board 600 is located at the top of the electronic device 1000, the second circuit board 700 is located at the bottom of the electronic device 1000, and the first circuit board 600 and the second circuit board 700 may be connected to each other by using a flexible circuit board or a wire such as a coaxial line, to implement an electrical connection to each other. A plurality of functional components (not shown in the figure) such as a processor and a memory may be fastened to the first circuit board 600 and the second circuit board 700. The processor is coupled to function modules, for example, the display module 200, the camera module 400, the speaker module 500, and the receiver 300, of the electronic device 1000. It should be understood that specific components fastened to the first circuit board 600 and the second circuit board 700 are not strictly limited in this application. In other embodiments, the first circuit board 600 or the second circuit board 700 may be omitted from the electronic device 1000, and a component that needs to be fastened to the circuit board is fastened to a retained circuit board.

The battery 800 is located in the middle of the electronic device 1000, and is located between the first circuit board 600 and the second circuit board 700. In other words, the first circuit board 600 and the second circuit board 700 are respectively located on two sides of the battery 800. The battery 800 is configured to supply power to the electronic device 1000.

Figure 2:
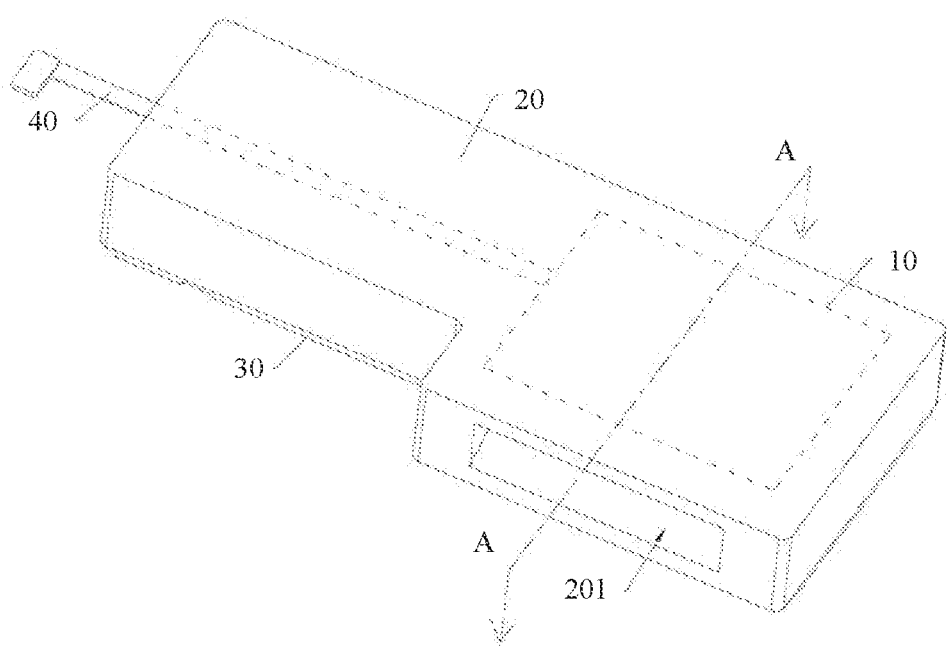
FIG. 2 is a schematic diagram of a structure of a speaker module of the electronic device shown in FIG. 1.

FIG. 2 is a schematic diagram of a structure of the speaker module 500 of the electronic device 1000 shown in FIG. 1.

The speaker module 500 includes an electroacoustic transducer 10, a module upper-housing 20, a module lower-housing 30, and a circuit board 40. The module upper-housing 20 and the module lower-housing 30 are fastened to each other to form a sound box. The electroacoustic transducer 10 is located inside the sound box, and the electroacoustic transducer 10 is configured to convert an electrical signal into a sound signal as a speaker core of the speaker module 500. One end of the circuit board 40 is located inside the sound box to connect to the electroacoustic transducer 10. The other end of the circuit board 40 is located outside the sound box to electrically connect to external components of the electroacoustic transducer 10 and the speaker module 500. For example, the end that is of the circuit board 40 and that is located outside the sound box may be fastened and electrically connected to the second circuit board 700.

A sound outlet hole 201 is disposed on the module upper-housing 20, and the sound outlet hole 201 connects the inside of the sound box and the outside of the sound box. A sound emitted by the electroacoustic transducer 10 can be transmitted to the outside of the sound box through the sound outlet hole 201. With reference to FIG. 1, the speaker hole 1003 of the housing 100 is connected to the sound outlet hole 201 of the electroacoustic transducer 10 and the outside of the electronic device 1000, and the sound emitted by the electroacoustic transducer 10 can be transmitted to the outside of the electronic device 1000 through the sound outlet hole 201 and the speaker hole 1003.

Figure 3:
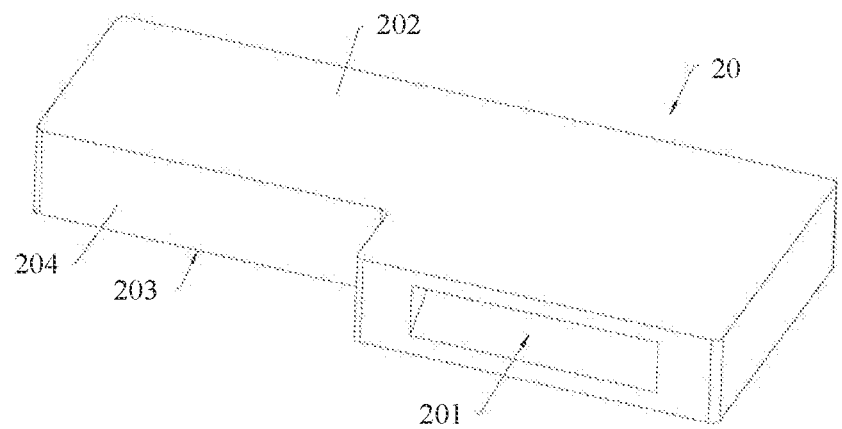
FIG. 3 is an exploded schematic diagram of the speaker module shown in FIG. 2.
Figure 3:
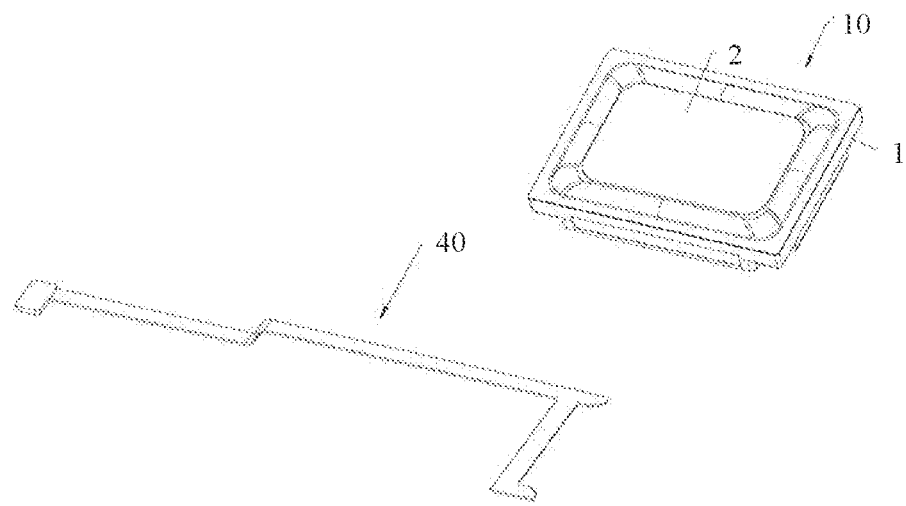
Figure 3:
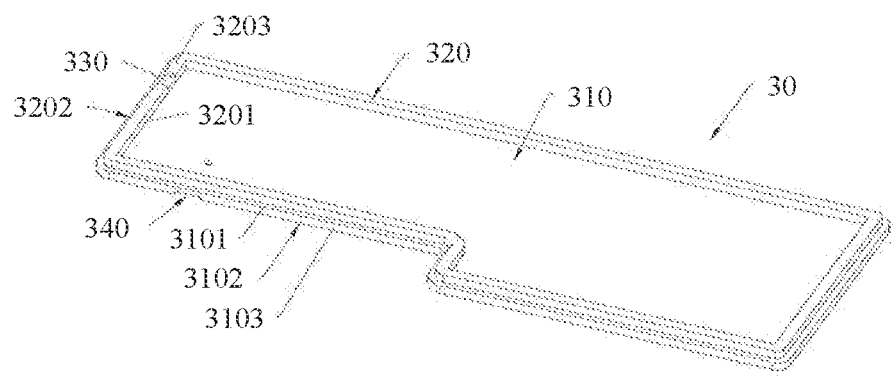
Figure 4:
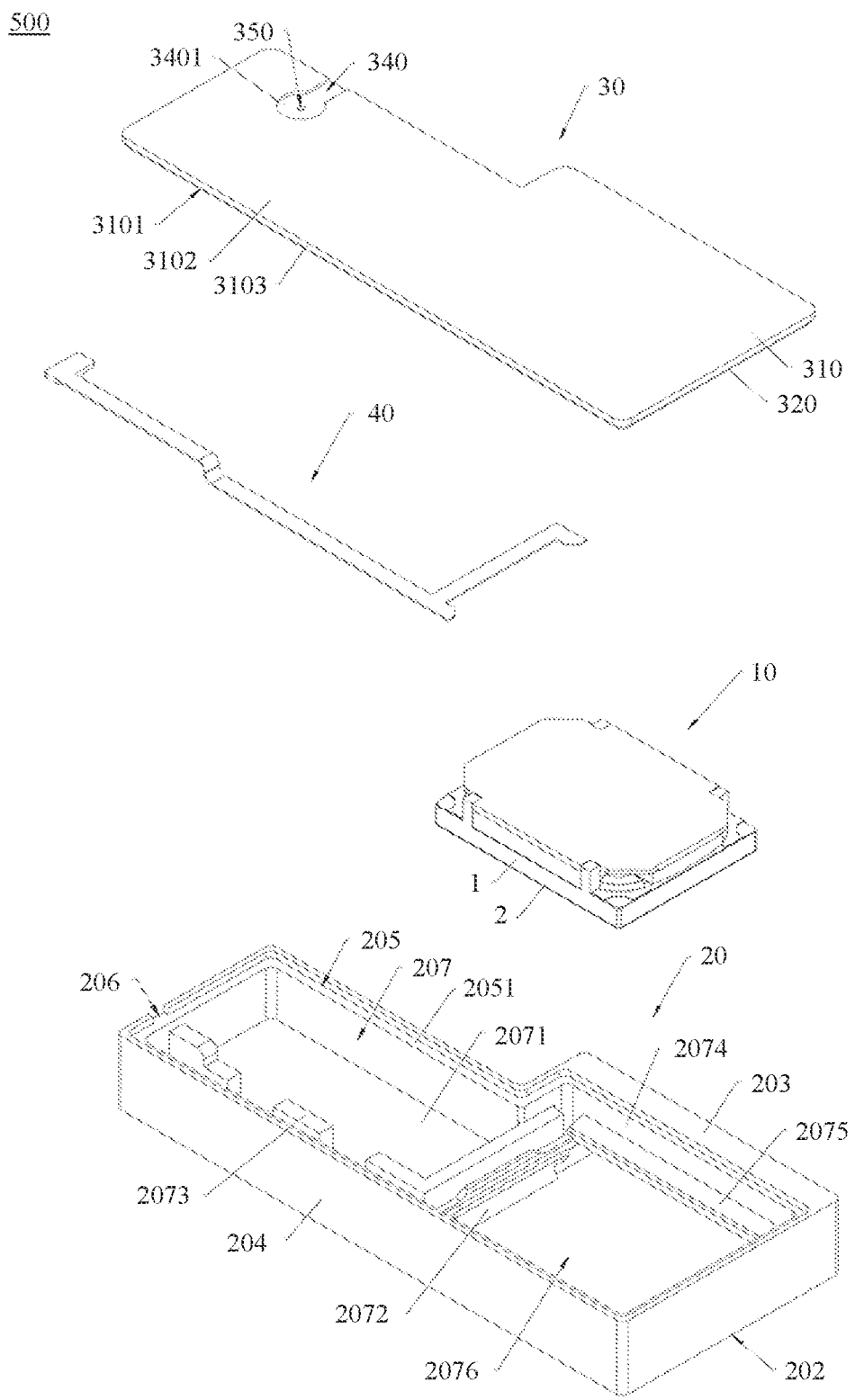
FIG. 4 is a schematic diagram of a structure of the speaker module shown in FIG. 3 from another angle.

Refer to FIG. 3 and FIG. 4. FIG. 3 is an exploded schematic diagram of the speaker module 500 shown in FIG. 2. FIG. 4 is a schematic diagram of a structure of the speaker module 500 shown in FIG. 3 from another angle.

The module upper-housing 20 includes a top surface 202 and a bottom surface 203 that are disposed opposite to each other and a peripheral side surface 204 connected between the top surface 202 and the bottom surface 203. The sound outlet hole 201 is disposed on the module upper-housing 20. Specifically, an opening of the sound outlet hole 201 is located on the peripheral side surface 204 of the module upper-housing 20, and the sound outlet hole 201 penetrates the module upper-housing 20 in a thickness direction of the module upper-housing 20. In a direction from the inside to the outside of the module upper-housing 20, a distance between hole walls of the sound outlet hole 201 gradually increases. In other words, the hole walls of the sound outlet hole 201 are horn-shaped, to improve loudness of the sound emitted by the speaker module 500. It should be noted that "disposed opposite to each other" mentioned in this embodiment of this application means that the two have opposite directions, and "disposed opposite to each other" described below should be understood in a same way.

The module upper-housing 20 further has a positioning groove 205, a notch 206, and an accommodation groove 207. An opening of the positioning groove 205 is disposed on the bottom surface 203 of the module upper-housing 20. An extension direction of the positioning groove 205 is a direction from the bottom surface 203 to the top surface 202 of the module upper-housing 20. The notch 206 extends from a sidewall of the positioning groove 205 to the peripheral side surface 204 of the module upper-housing 20. The notch 206 further penetrates the bottom surface 203 of the module upper-housing 20. It should be noted that the "notch" described in this embodiment of this application is a hole with an incomplete hole wall, and a "notch" described below should be understood in a same way.

An opening of the accommodation groove 207 is located on a bottom wall 2051 of the positioning groove 205. An extension direction of the accommodation groove 207 is a direction from the bottom wall 2051 of the positioning groove 205 to the top surface 202 of the module upper-housing 20. A first protrusion 2072 and a second protrusion 2073 are disposed on a bottom wall 2071 of the accommodation groove 207. The first protrusion 2072 may be approximately in a shape of "U" to form a circumferential region 2076, and the circumferential region 2076 is connected to the sound outlet hole 201. A third protrusion 2075 is disposed on a sidewall 2074 of the accommodation groove 207, and the third protrusion 2075 is connected to two ends of the first protrusion 2072. The second protrusion 2073 may include a continuous complete protruding bar, or may include a plurality of broken protruding bars. One end of the second protrusion 2073 is disposed near the first protrusion 2072, and the other end is disposed near the notch 206.

It should be understood that azimuth words such as "top" and "bottom" used when the speaker module 500 is described in this embodiment of this application are mainly described based on a display azimuth of the speaker module 500 in FIG. 3. This does not constitute a limitation on an azimuth of the speaker module 500 in an actual application scenario.

The electroacoustic transducer 10 includes a basket 1 and a voice membrane 2 fastened to the basket 1. The electroacoustic transducer 10 vibrates by using the voice membrane 2 to produce a sound. The circuit board 40 may be a flexible circuit board. One end of the circuit board 40 includes two branches, and ends of the two branches can form a connection end.

The module lower-housing 30 includes a substrate 310 and a limiting protruding bar 320. The substrate 310 includes a top surface 3101 and a bottom surface 3102 that are disposed opposite to each other and a peripheral side surface 3103 connected between the top surface 3101 and the bottom surface 3102. The limiting protruding bar 320 is fastened to the top surface 3101 of the substrate 310, and is disposed around a peripheral edge of the top surface 3101 of the substrate 310.

A notch 330, a connection groove 340, and a leakage hole 350 are disposed on the module lower-housing 30. Specifically, the notch 330 is disposed on the limiting protruding bar 320. The notch 330 penetrates from an inner side surface 3201 to an outer side surface 3202 of the limiting protruding bar 320 to connect inner space and outer space of the limiting protruding bar 320. The notch 330 further penetrates a top surface 3203 of the limiting protruding bar 320. After the module lower-housing 30 and the module upper-housing 20 are assembled, the notch 330 of the module lower-housing 30 directly faces the notch 206 of the module upper-housing 20 to form a notch with a large diameter. In some other embodiments, the notch 330 may be omitted from the module lower-housing 30.

The connection groove 340 and the leakage hole 350 are disposed on the substrate 310. Specifically, an opening of the connection groove 340 is disposed on the bottom surface 3102 of the substrate 310, and penetrates the peripheral side surface 3103 of the substrate 310. Openings at two ends of the leakage hole 350 are respectively disposed on a bottom wall 3401 of the connection groove 340 and the top surface 3101 of the substrate 310. The leakage hole 350 connects top-side space of the substrate 310, the connection groove 340, bottom-side space of the substrate 310, and peripheral space of the substrate 310. In some other embodiments, the connection groove 340 may not be disposed on the substrate 310, and the leakage hole 350 of the substrate 310 may penetrate from the bottom surface 3102 of the substrate 310 to the top surface 3101 of the substrate 310.

Figure 5:
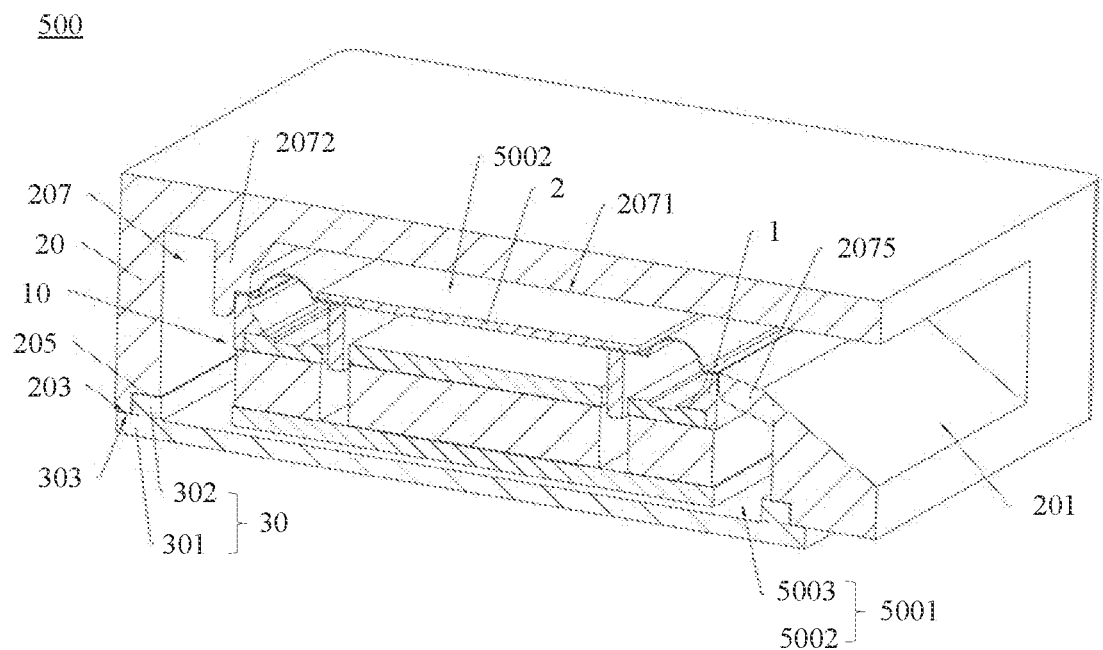
FIG. 5 is a schematic diagram of a structure obtained after the speaker module shown in FIG. 2 is sectioned along A-A.

FIG. 5 is a schematic diagram of a structure obtained after the speaker module 500 shown in FIG. 2 is sectioned along A-A. In the accompanying drawings of this application. "sectioned along A-A" means being sectioned along an A-A line and a plane on which arrows at two ends of the A-A line are located. The following descriptions of the accompanying drawings should be understood in a same way.

The module lower-housing 30 is covered with the module upper-housing 20, the top surface 3101 of the substrate 310 of the module lower-housing 30 is in contact with the bottom surface 203 of the module upper-housing 20, the limiting protruding bar 320 of the module lower-housing 30 is snapped into the positioning groove 205 of the module upper-housing 20, and the limiting protruding bar 320 and the positioning groove 205 form a concave-convex fitting structure, so that the module lower-housing 30 and the module upper-housing 20 are fixed relative to each other. A sound cavity space 5001 is jointly enclosed by the module lower-housing 30 and the module upper-housing 20.

The electroacoustic transducer 10 is accommodated in the sound cavity space 5001. In other words, the electroacoustic transducer 10 is located on inner sides of the module lower-housing 30 and the module upper-housing 20. Specifically, the electroacoustic transducer 10 is fastened to the module upper-housing 20. The basket 1 of the electroacoustic transducer 10 is fastened to the module upper-housing 20. The basket 1 is partially snapped into the circumferential region 2076 (as shown in FIG. 4), and the first protrusion 2072 and the third protrusion 2075 continuously abut against the periphery of the basket 1. The voice membrane 2 of the electroacoustic transducer 10 is located in the circumferential region 2076. The voice membrane 2 separates the sound cavity space 5001 into a front sound cavity 5002 and a rear sound cavity 5003. The front sound cavity 5002 is formed between the module upper-housing 20 and the voice membrane 2. In other words, the front sound cavity 5002 is jointly enclosed by the bottom wall 2071 of the accommodation groove 207 of the module upper-housing 20, the first protrusion 2072, the voice membrane 2, and the third protrusion 2075. The sound outlet hole 201 connects the front sound cavity 5002 and the outside of the speaker module 500.

It should be noted that "fastening" used in this embodiment of this application may be direct fastening or indirect fastening. Indirect fastening means that there is another structural member between the two. "Fastening" mentioned below should be understood in a same way.

The rear sound cavity 5003 is located on a side that is of the voice membrane 2 and that is away from the front sound cavity 5002. The leakage hole 350 connects the rear sound cavity 5003 and the outside of the speaker module 500. In other words, the rear sound cavity 5003 is connected to the outside of the speaker module 500 by using the leakage hole 350 and the connection groove 340 (as shown in FIG. 4), to ensure a barometric balance between the rear sound cavity 5003 and the outside of the speaker module 500.

Figure 6:
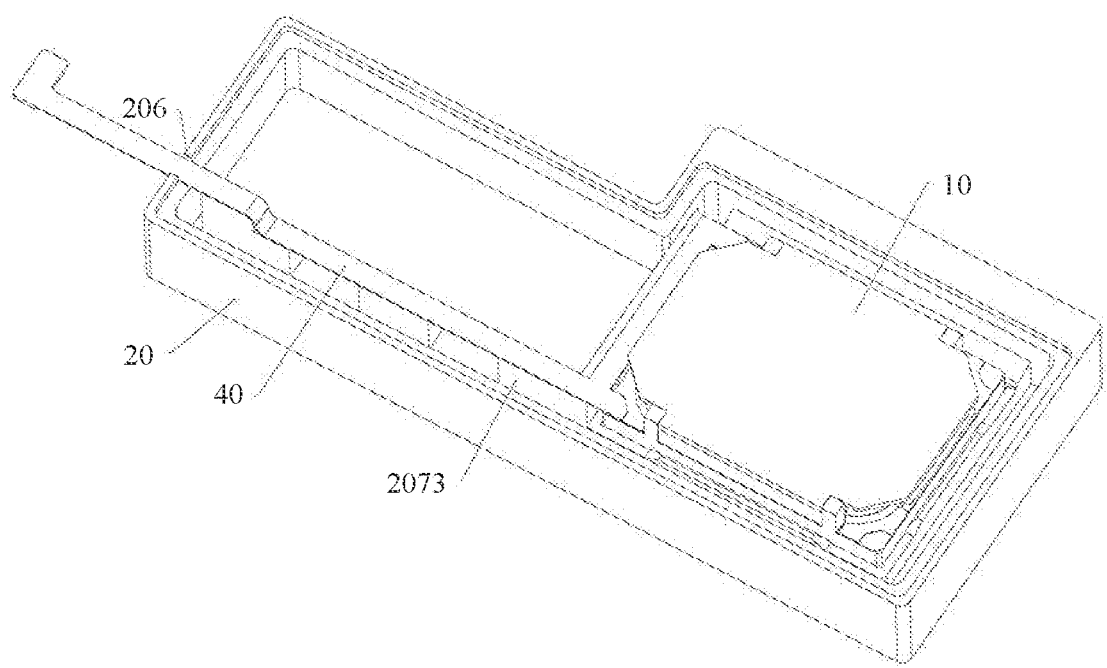
FIG. 6 is a schematic diagram of a partial structure of the speaker module shown in FIG. 2.

FIG. 6 is a schematic diagram of a partial structure of the speaker module 500 shown in FIG. 2. The module lower-housing 30 of the speaker module 500 is not shown in FIG. 6.

One end of the circuit board 40 is located inside the module upper-housing 20, and the other end extends out of the module upper-housing 20 through the notch 206. A portion that is of the circuit board 40 and that is located inside the module upper-housing 20 is disposed on the second protrusion 2073. For example, the portion that is of the circuit board 40 and that is located inside the module upper-housing 20 is fastened (for example, bonded) to an end surface (not shown in the figure) of the second protrusion 2073. In this case, the circuit board 40 is stably fastened to the module upper-housing 20 to reduce a risk of damage caused by shaking. The end parts of the two branches of the circuit board 40 are respectively fastened to two corners of the electroacoustic transducer 10 to electrically connect to the electroacoustic transducer 10.

It may be understood that structures and shapes of the module upper-housing 20, the module lower-housing 30, and the circuit board 40 of the speaker module 500 are not limited to the foregoing described case, and another solution may be designed based on an actual requirement (for example, a mounting environment requirement or a use scenario requirement). This is not specifically limited in this application.

Figure 7:
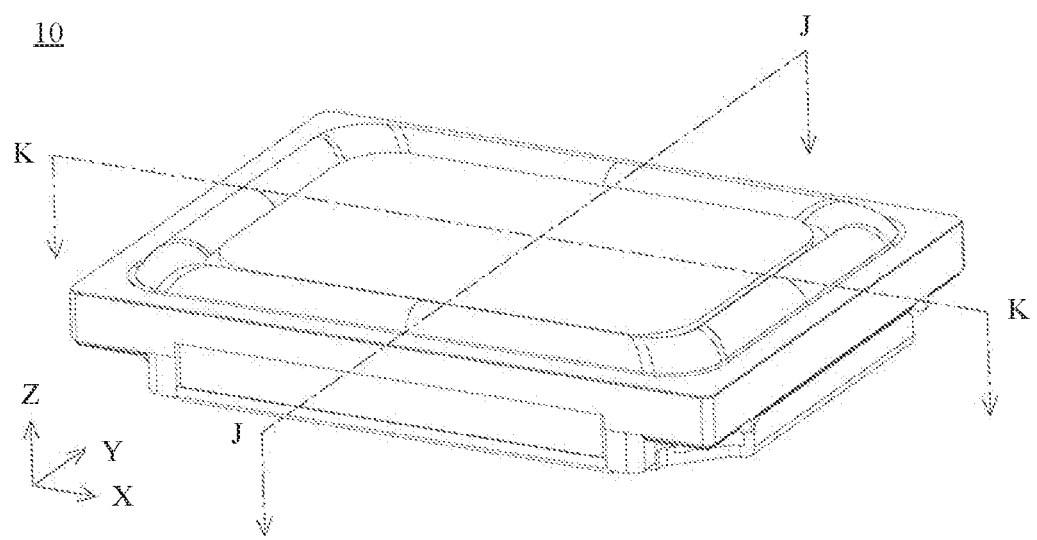
FIG. 7 is a schematic diagram of a structure of an electroacoustic transducer of the speaker module shown in FIG. 3.
Figure 8:
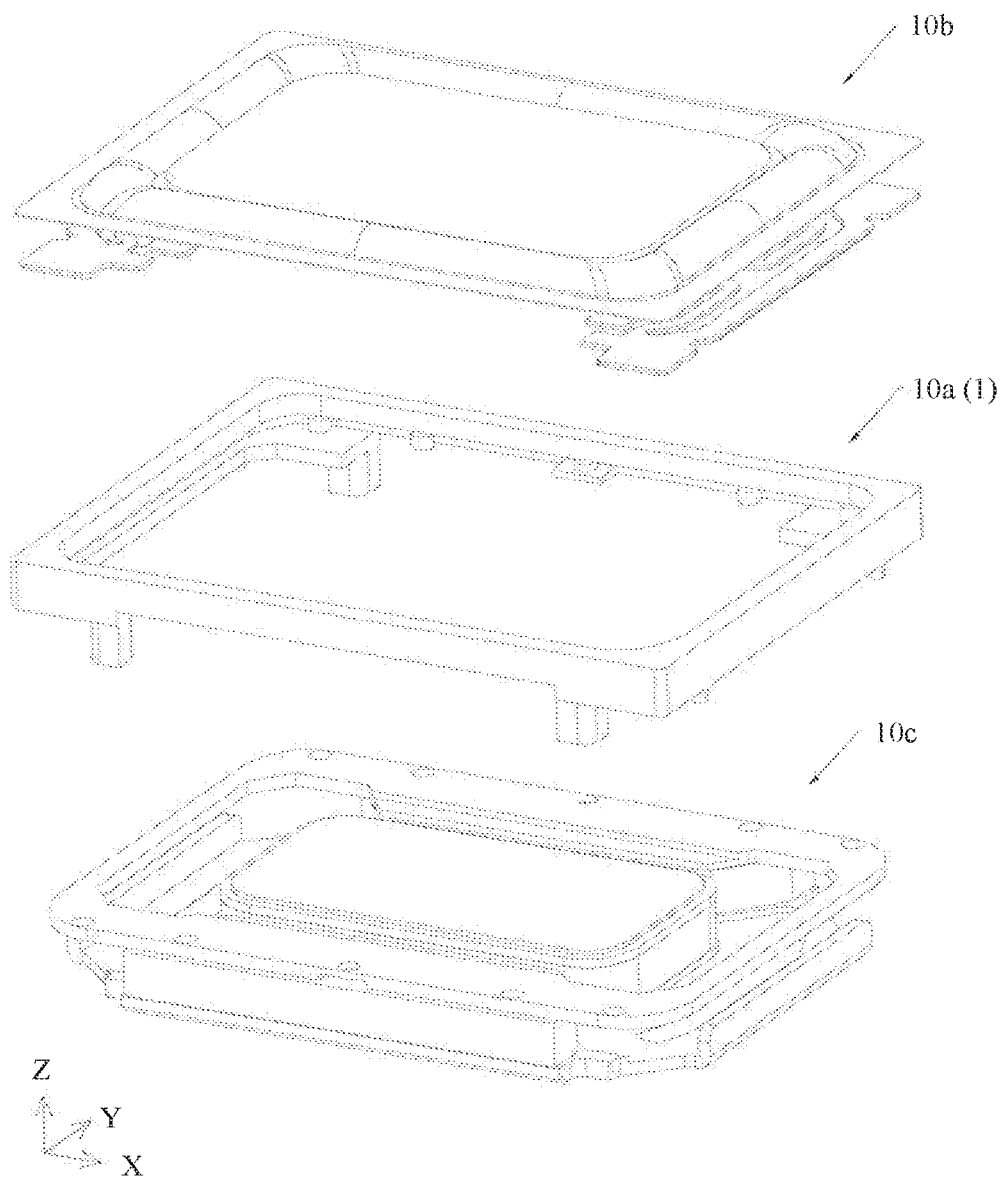
FIG. 8 is a schematic diagram of an exploded structure of the electroacoustic transducer shown in FIG. 7.

Refer to FIG. 7 and FIG. 8. FIG. 7 is a schematic diagram of a structure of the electroacoustic transducer 10 of the speaker module 500 shown in FIG. 3. FIG. 8 is a schematic diagram of an exploded structure of the electroacoustic transducer 10 shown in FIG. 7. In this embodiment of this application, an X-axis direction is shown as a length direction of the electroacoustic transducer 10, a Y-axis direction is shown as a width direction of the electroacoustic transducer 10, a Z-axis direction is shown as a thickness direction of the electroacoustic transducer 10, and the X-axis direction, the Y-axis direction, and the Z-axis direction are perpendicular to each other.

In this embodiment of this application, a plurality of parts of the electroacoustic transducer 10 are symmetrically disposed. That two parts are symmetrically disposed means that there is an axisymmetric relationship between the two parts with respect to a reference plane, allowing a slight deviation caused by a manufacturing tolerance, an assembly tolerance, or the like. Some parts may be symmetrical with respect to a first reference plane, some parts may be symmetrical with respect to a second reference plane, and the second reference plane intersects the first reference plane. For example, as shown in FIG. 7, the first reference plane may pass through a J-J line and be parallel to a YZ plane, and the YZ plane is a plane on which the width direction Y of the electroacoustic transducer 10 and the thickness direction Z of the electroacoustic transducer 10 are located. The second reference plane may pass through a K-K line and be parallel to an XZ plane, and the XZ plane is a plane on which the length direction X of the electroacoustic transducer 10 and the thickness direction Z of the electroacoustic transducer 10 are located.

The electroacoustic transducer 10 includes a support component 10a, a vibration component 10b, and a magnetic circuit component 10c. The support component 10a includes the foregoing basket 1. The vibration component 10b and the magnetic circuit component 10c are mounted in the basket 1. A portion that is of parts of the vibration component 10b and that is fastened to the basket 1 remains still relative to the basket 1, and a remaining portion may vibrate relative to the basket 1. The magnetic circuit component 10c is fixed relative to the basket 1, and the magnetic circuit component 10c is configured to provide a driving magnetic field for the vibration component 10b.

Figure 9:
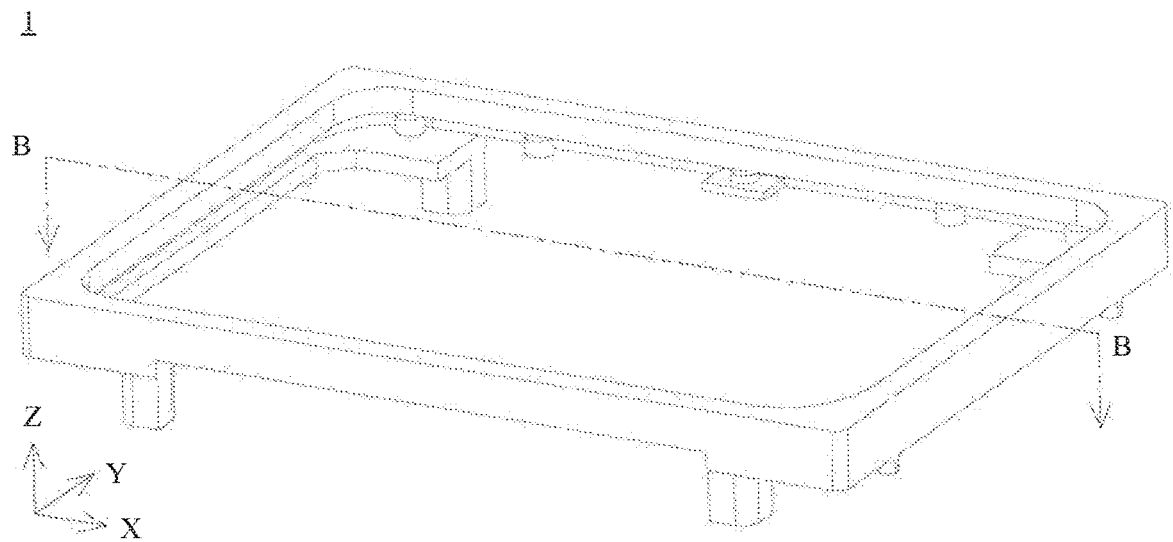
FIG. 9 is a schematic diagram of a structure of a basket in the electroacoustic transducer shown in FIG. 8.
Figure 10:
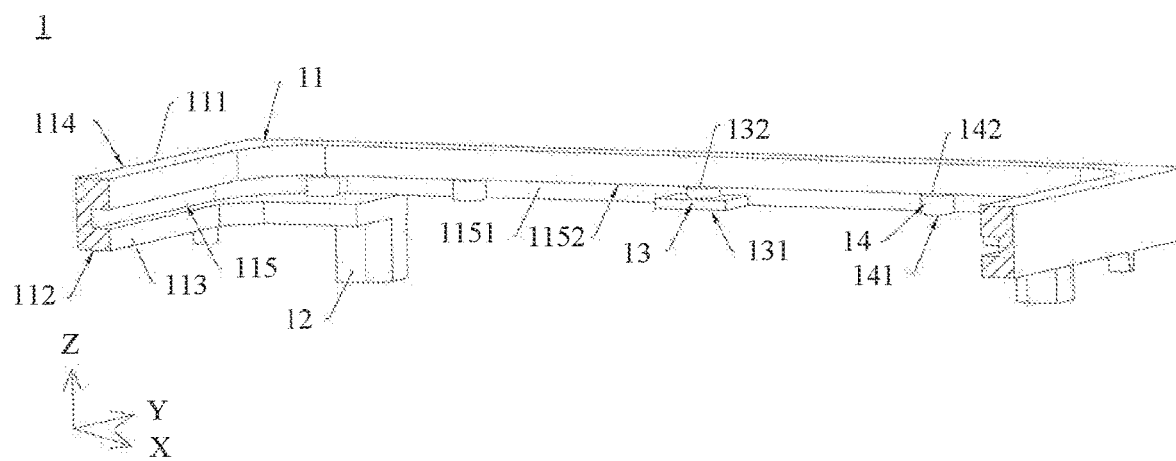
FIG. 10 is a schematic diagram of a structure obtained after the basket shown in FIG. 9 is sectioned along B-B.

Refer to FIG. 9 and FIG. 10. FIG. 9 is a schematic diagram of a structure of the basket 1 in the electroacoustic transducer 10 shown in FIG. 8. FIG. 10 is a schematic diagram of a structure obtained after the basket 1 shown in FIG. 9 is sectioned along B-B.

The basket 1 includes a framework 11 and a plurality of feet 12. The framework 11 is approximately a rectangular framework. The framework 11 includes a top surface 111 and a bottom surface 112 that are disposed opposite to each other, and the plurality of feet 12 are fastened to the bottom surface 112 of the framework 11 at intervals. There are four feet 12, and every two of the four feet 12 are symmetrically fastened to two side edges of the framework 11. The four feet 12 may be symmetrical with respect to the first reference plane, or may be symmetrical with respect to the second reference plane. In other embodiments, there may be two, three, or at least five feet 12. It should be noted that, in this embodiment of this application, that two parts are spaced apart from each other or disposed at intervals means that there is a gap between the two parts.

For example, the framework 11 and the plurality of feet 12 are integrally formed, in other words, the basket 1 is of an integral structure. In some other embodiments, structures of portions of the basket 1 may form an integral structure through assembling (for example, bonding or clamping).

The framework 11 further includes an inner side surface 113 and an outer side surface 114 that are disposed opposite to each other, and the inner side surface 113 and the outer side surface 114 are connected between the top surface 111 and the bottom surface 112. The inner side surface 113 and the outer side surface 114 are disposed in parallel. A fastening groove 115 is disposed in the framework 11, an opening of the fastening groove 115 is located on the inner side surface 113 of the framework 11, and the fastening groove 115 is disposed around an inner side of the framework 11. A recessed direction of the fastening groove 115 is a direction from the inner side surface 113 to the outer side surface 114 of the framework 11.

It should be noted that, in this embodiment of this application, "inner side" mentioned when the electroacoustic transducer 10 is described is a side close to a geometric center of the electroacoustic transducer 10, and "outer side" is a side away from the geometric center of the electroacoustic transducer 10. This does not constitute a limitation on the electroacoustic transducer 10 in an actual application scenario.

Two limiting blocks 13 and at least one limiting foot 14 are disposed on the basket 1. The two limiting blocks 13 are located on inner sides of the two side edges of the framework 11. Specifically, the two limiting blocks 13 are fastened to a groove bottom wall 1151 of the fastening groove 115, and may be symmetrical with respect to the second reference plane. A bottom surface 131 of the limiting block 13 and the bottom surface 112 of the framework 11 are located on a same surface, and a top surface 132 of the limiting block 13 abuts against a groove sidewall 1152 of the fastening groove 115. In a same limiting block 13, a portion of the limiting block 13 is located in the fastening groove, and a portion of the limiting block 13 is located outside the fastening groove 115.

For example, the limiting block 13 includes a first portion and a second portion, and the second portion is fastened to a top surface of the first portion. A bottom surface of the first portion is the bottom surface 131 of the limiting block 13, and a top surface of the second portion is the top surface 132 of the limiting block 13. In addition, a bottom surface area of the second portion is less than a top surface area of the first portion, so that a peripheral surface 133 of the limiting block 13 is in a step shape.

The at least one limiting foot 14 is fastened to the groove bottom wall 1151 of the fastening groove 115, and is spaced apart from the limiting block 13. A bottom surface 141 of the limiting foot 14 and the bottom surface 112 of the framework 11 are located on a same surface, and a top surface 142 of the limiting foot 14 abuts against the groove sidewall 1152 of the fastening groove 115. In a same limiting foot 14, a portion of the limiting foot 14 is located outside the fastening groove 115. There are eight limiting feet 14, the eight limiting feet 14 are separately located on the inner sides of the two side edges of the framework 11, and two limiting feet 14 are disposed on each of two sides of the limiting block 13.

It may be understood that, in other embodiments, the basket 1 of the electroacoustic transducer 10 may be further configured to fasten and support another part of the electroacoustic transducer 10. When this requirement is met, the basket 1 is not limited to the structure shown in this embodiment of this application, and may be of another structure.

Figure 11:
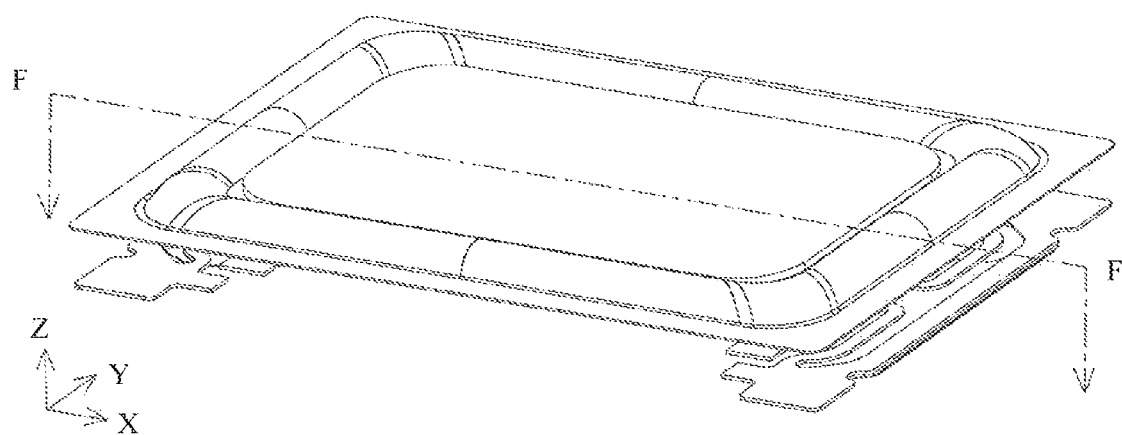
FIG. 11 is a schematic diagram of a structure of a vibration component in the electroacoustic transducer shown in FIG. 8.
Figure 12:
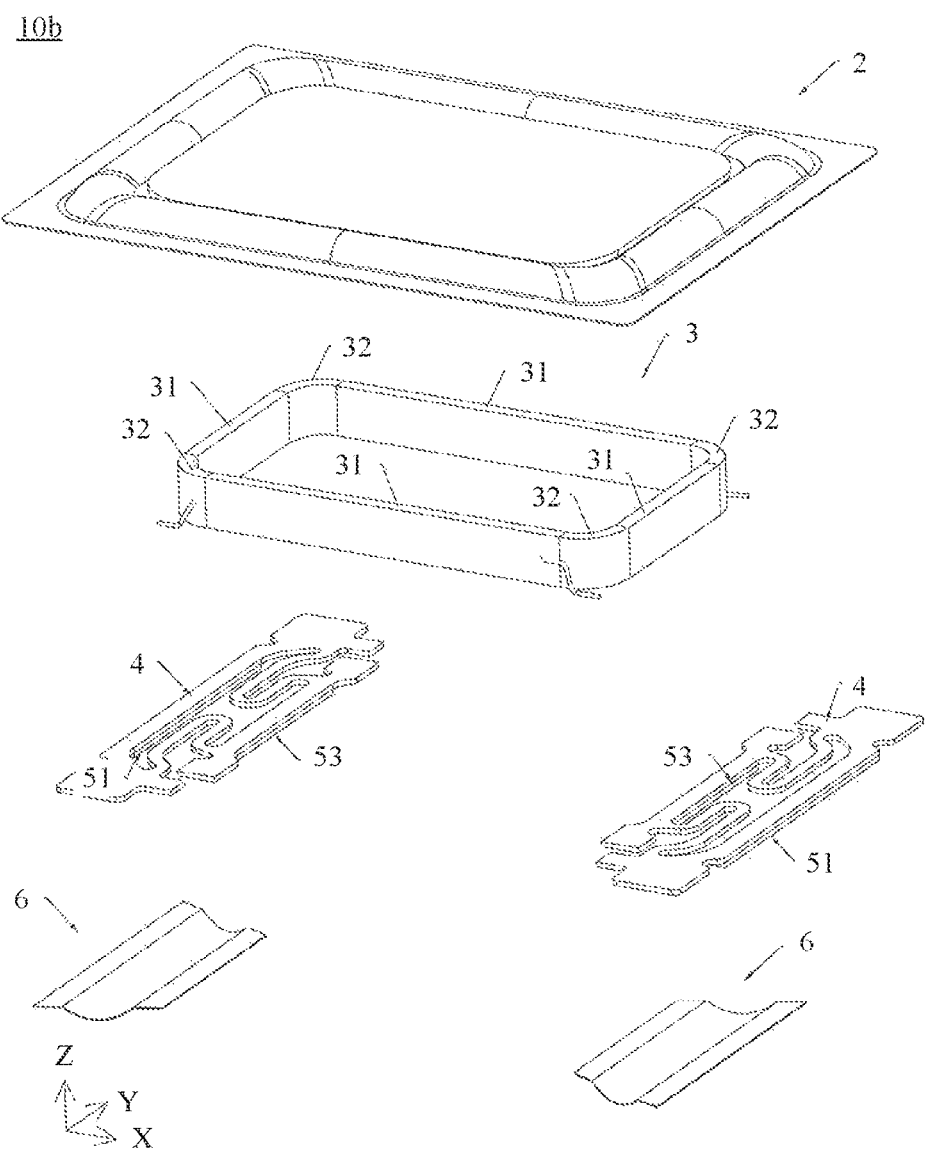
FIG. 12 is a schematic diagram of an exploded structure of the vibration component shown in FIG. 11.

Refer to FIG. 11 and FIG. 12. FIG. 11 is a schematic diagram of a structure of the vibration component 10*b* in the electroacoustic transducer 10 shown in FIG. 8. FIG. 12 is a schematic diagram of an exploded structure of the vibration component 10*b* shown in FIG. 11.

The vibration component 10*b* includes the foregoing voice membrane 2, the voice coil 3, two flexible circuit boards 4, two first gaskets 51, two second gaskets 53, and two auxiliary diaphragms 6. The magnetic circuit component 10*c* provides a magnetic field that drives the voice coil 3 to vibrate. When the voice coil 3 is inserted into the magnetic circuit component 10*c*, and a current is applied, the voice coil 3 drives the voice membrane 2, the two circuit boards 40, the two second gaskets 53, and the two auxiliary diaphragms 6 to vibrate.

In this embodiment, the voice coil 3 is in a shape of a rounded rectangle. The voice coil 3 includes four straight edges 31 and four rounded corners 32, and each rounded corner 32 is connected between two straight edges 31. It should be understood that, in this application, a length relationship between the four straight edges 31 of the voice coil 3 is not strictly limited, and a length of one straight edge 31 may be greater than, equal to, or less than a length of another adjacent straight edge 31. In other embodiments, the voice coil 3 may be in a shape of a right-angled rectangle or another shape. A specific shape of the voice coil 3 is not strictly limited in this application.

The four straight edges 31 of the voice coil 3 are a left straight edge 31 and a right straight edge 31 arranged at intervals in the X-axis direction and a front straight edge 31 and a rear straight edge 31 arranged at intervals in the Y-axis direction. The four rounded corners 32 of the voice coil 3 are two left rounded corners 32 connected to two ends of the left straight edge 31 and two right rounded corners 32 connected to two ends of the right straight edge 31.

It should be noted that azimuth words such as "left". "right". "front", and "rear" used when the electroacoustic transducer 10 is described in this embodiment of this application are mainly described based on a display azimuth of the electroacoustic transducer 10 in FIG. 12. A positive direction of an X-axis is right, a negative direction of the X-axis is left, a positive direction of a Y-axis is rear, and a negative direction of the Y-axis is front. This does not constitute a limitation on an azimuth of the electroacoustic transducer 10 in an actual application scenario.

Figure 13:
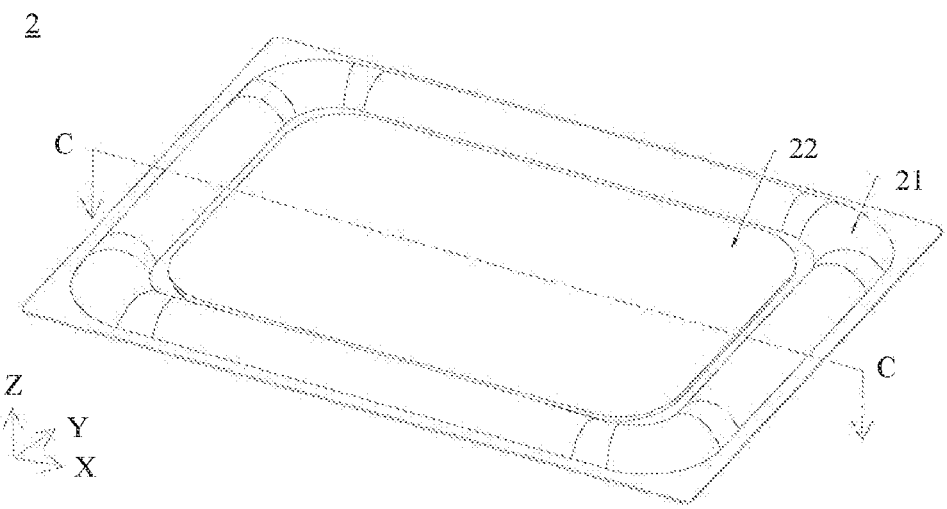
FIG. 13 is a schematic diagram of a structure of a voice membrane in the vibration component shown in FIG. 12.
Figure 14:
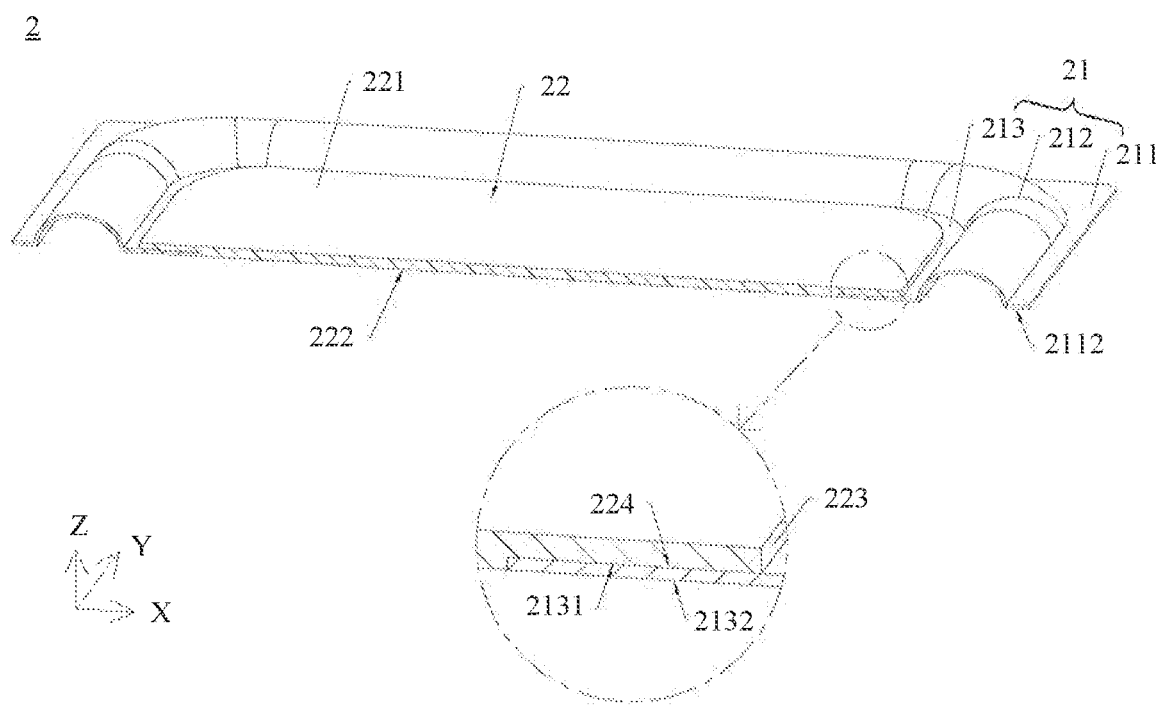
FIG. 14 is a schematic diagram of a structure obtained after the voice membrane shown in FIG. 13 is sectioned along C-C.

Refer to FIG. 13 and FIG. 14. FIG. 13 is a schematic diagram of a structure of the voice membrane 2 in the vibration component 10*b* shown in FIG. 12. FIG. 14 is a schematic diagram of a structure obtained after the voice membrane 2 shown in FIG. 13 is sectioned along C-C.

The voice membrane 2 includes a diaphragm 21 and a dome 22. The dome 22 is in a shape of a rectangular plate. The dome 22 includes a top surface 221 and a bottom surface 222 that are disposed opposite to each other and a peripheral surface 223 connected between the top surface 221 and the bottom surface 222. A limiting groove 224 is disposed on the dome 22, and an opening of the limiting groove 224 is located in a peripheral region of the bottom surface 222 of the dome 22. A recessed direction of the limiting groove 224 is a direction from the bottom surface 222 to the top surface 221 of the dome 22. In addition, the limiting groove 224 further penetrates the peripheral surface 223 of the dome 22.

The diaphragm 21 is approximately in a shape of a rectangular ring. The diaphragm 21 includes a first fastening part 211, a vibration part 212, and a second fastening part 213 that are sequentially connected, the first fastening part 211 is located on an outer side of the vibration part 212, and the second fastening part 213 is located on an inner side of the vibration part 212. A cross-sectional shape of the vibration part 212 of the diaphragm 21 is an arc shape or an approximate arc shape, and an extension track of the vibration part 212 is in a shape of a rounded rectangle. The vibration part 212 of the diaphragm 21 is convex, that is, the vibration part 212 protrudes in a direction away from a bottom surface 2112 of the first fastening part 211 and a bottom surface 2132 of the second fastening part 213 of the diaphragm 21. When the vibration part 212 of the diaphragm 21 is subjected to an external force, the vibration part 212 can be deformed, so that both the first fastening part 211 and the dome 22 can move relative to the second fastening part 213. In some other embodiments, the vibration part 212 of the diaphragm 21 may be concave, that is, the vibration part 212 is recessed away from a top surface 2112 of the first fastening part 211 and a top surface 2132 of the second fastening part 213 of the diaphragm 21.

A portion of the second fastening part 213 of the diaphragm 21 is accommodated in the limiting groove 224 of the dome 22, and is fastened to the dome 22. The top surface 2131 of the second fastening part 213 of the diaphragm 21 is in contact with a bottom wall (not shown in the figure) of the limiting groove 224 of the dome 22. For example, the second fastening part 213 of the diaphragm 21 and the dome 22 are fastened to each other through bonding. The bottom surface 2132 of the second fastening part 213 of the diaphragm 21 is flush with the bottom surface 222 of the dome 22.

In this embodiment of this application, because the vibration part 212 of the diaphragm 21 is convex, space under the diaphragm 21 is released, and the magnetic circuit component 10c located below the diaphragm 21 is allowed to have a larger height, so that magnetic induction intensity of the electroacoustic transducer 10 is increased, and sensitivity of the electroacoustic transducer 10 is improved.

Figure 15:
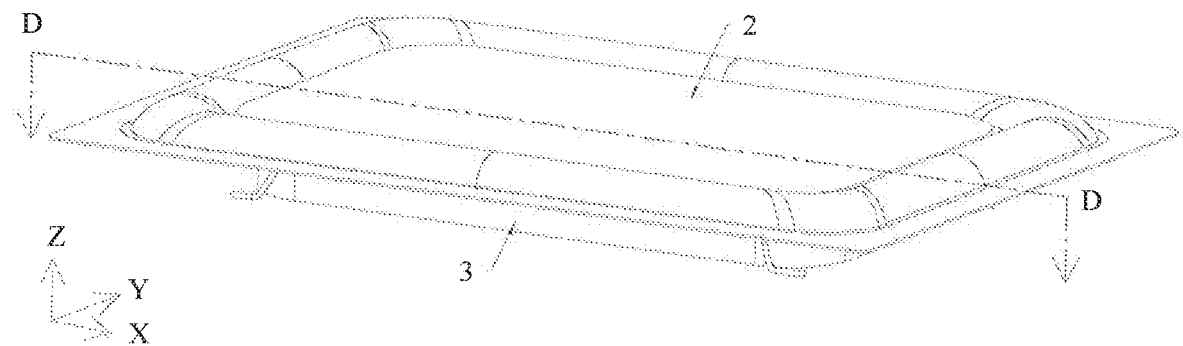
FIG. 15 is a schematic diagram of an assembly structure of a voice membrane and a voice coil in the vibration component shown in FIG. 12.
Figure 16:
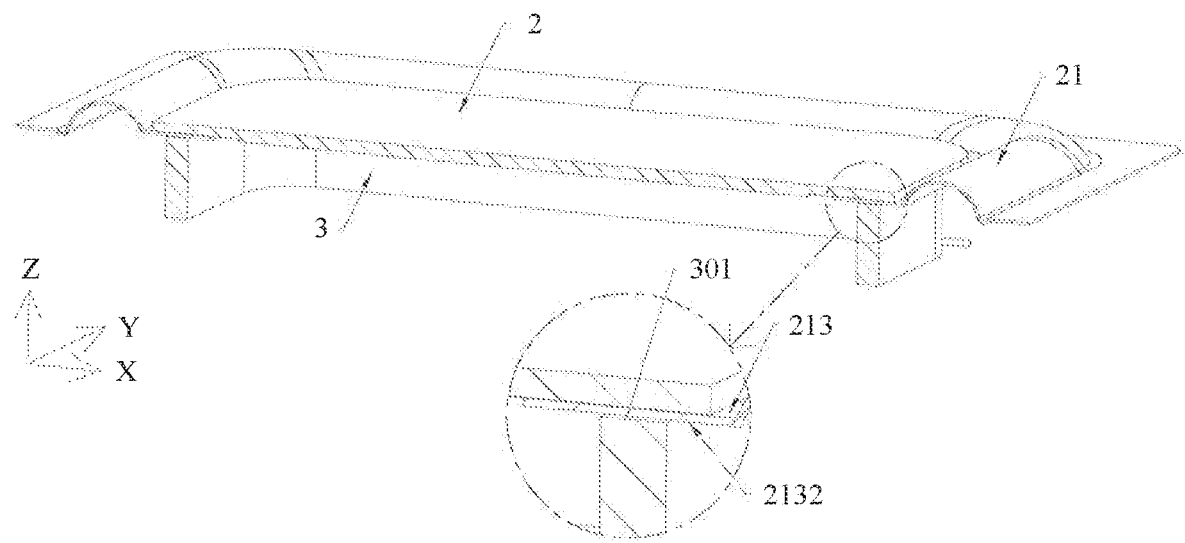
FIG. 16 is a schematic diagram of a structure obtained after the structure shown in FIG. 15 is sectioned along D-D.

Refer to FIG. 15 and FIG. 16. FIG. 15 is a schematic diagram of an assembly structure of the voice membrane 2 and the voice coil 3 in the vibration component 10b shown in FIG. 12. FIG. 16 is a schematic diagram of a structure obtained after the structure shown in FIG. 15 is sectioned along D-D.

The voice membrane 2 is located on one side of the voice coil 3, and is fastened to one end of the voice coil 3. Specifically, the diaphragm 21 of the voice membrane 2 is fastened to one end of the voice coil 3. The second fastening part 213 of the diaphragm 21 is fastened to the voice coil 3. In this case, the bottom surface 2132 of the second fastening part 213 is in contact with a top surface 301 of the voice coil 3. For example, the second fastening part 213 and the voice coil 3 may be fastened to each other through bonding.

In some other embodiments, the electroacoustic transducer 10 may further include a voice coil bobbin, and the voice coil bobbin is connected between the voice membrane 2 and the voice coil 3. In this case, the voice coil bobbin isolates the voice coil 3 from the voice membrane 2, so that the voice membrane 2 is away from the voice coil 3. In addition, the voice coil bobbin can dissipate heat of the voice coil 3 to reduce a risk of damage to the voice membrane 2 caused by overheating of the voice coil 3.

Figure 17:
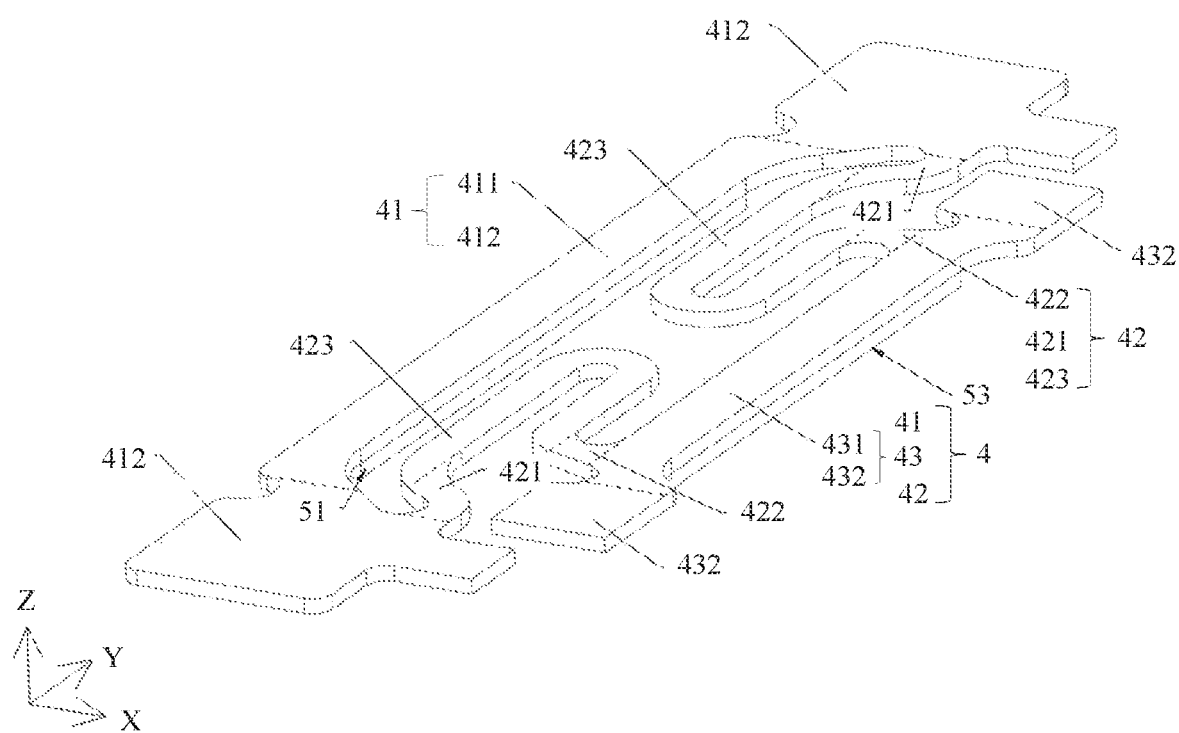
FIG. 17 is a schematic diagram of an assembly structure of a flexible circuit board, a first gasket, and a second gasket in the vibration component shown in FIG. 12.

Refer to FIG. 12 and FIG. 17. FIG. 17 is a schematic diagram of an assembly structure of the flexible circuit board 4, the first gasket 51, and the second gasket 53 in the vibration component 10b shown in FIG. 12. FIG. 17 shows only one flexible circuit board 4, one first gasket 51, and one second gasket 53.

The two flexible circuit boards 4 have a same structure. The flexible circuit board 4 includes a first fastening part 41, a connection stub 42, and a second fastening part 43 that are sequentially connected. There are two connection stubs 42. The two connection stubs 42 are connected between the first fastening part 41 and the second fastening part 43, the first fastening part 41 is located on outer sides of the two connection stubs 42, and the second fastening part 43 is located on inner sides of the two connection stubs 42. The first fastening part 41 is a fixed portion of the flexible circuit board 4, the second fastening part 43 is a movable portion of the flexible circuit board 4, and the second fastening part 43 may move relative to the first fastening part 41, and drive the two connection stubs 42 to move relative to the first fastening part 41.

The first fastening part 41 is approximately in a shape of "[". The first fastening part 41 includes a middle part 411 and two end parts 412 that are respectively connected to two sides of the middle part 411. The second fastening part 43 is located on an inner side of the first fastening part 41, and is spaced apart from the first fastening part 41. The second fastening part 43 includes a middle part 431 and two end parts 422 that are connected to two sides of the middle part 431. The middle part 431 of the second fastening part 43 is parallel to the middle part 411 of the first fastening part 41, and is spaced apart from the middle part 411 of the first fastening part 41.

The two connection stubs 42 are located on the inner side of the first fastening part 41, and the two connection stubs 42 are spaced apart from each other. Each connection stub 42 includes a head end 421, a tail end 422, and a connection segment 423 connected between the head end 421 and the tail end 422. Head ends 421 of the two connection stubs 42 are respectively connected to the two end parts 412 of the first fastening part 41. Tail ends 422 of the two connection stubs 42 are connected to the middle part 431 of the second fastening part 43. The tail ends 422 of the two connection stubs 42 are connected to different locations of the middle part 431 of the second fastening part 43, and a gap is formed between the connection stub 42 and the second fastening part 43.

Connection segments 423 of the two connection stubs 42 are located between the middle part 411 of the first fastening part 41 and the middle part 431 of the second fastening part 43, and are spaced apart from the middle part 411 of the first fastening part 41 and the middle part 431 of the second fastening part 43. The connection segments 423 of the two connection stubs 42 are in a shape of "U", to increase a size of the flexible circuit board 4, reduce stress on the flexible circuit board 4 when the flexible circuit board 4 moves with the voice coil 3, avoid a problem of fatigue fracture of the flexible circuit board 4 occurring due to stress, and prolong a service life of the flexible circuit board 4. In addition, the connection segments 423 of the two connection stubs 42 are disposed opposite to each other. In other words, "U"-shaped openings of the connection segments 423 of the two connection stubs 42 face opposite directions. In some other embodiments, the connection segment 423 of the connection stub 42 may be designed in another shape such as "L" or "N".

Figure 18:
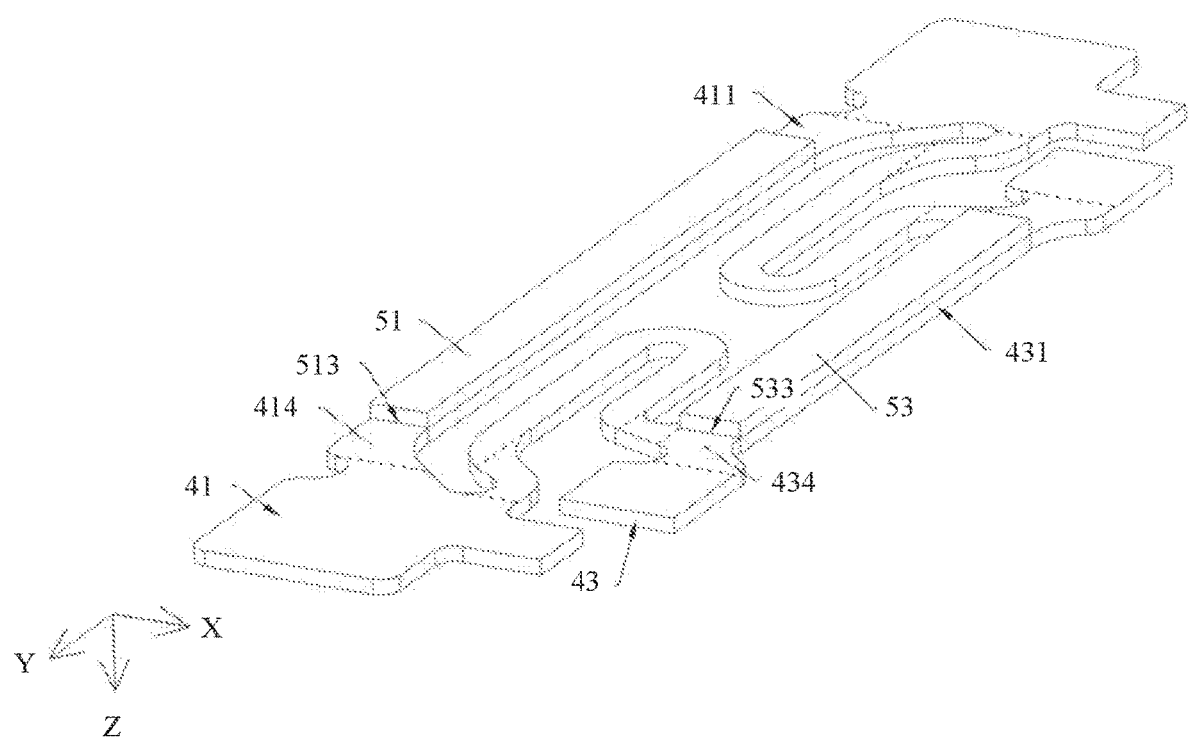
FIG. 18 is a schematic diagram of a structure that is of the structure shown in FIG. 17 and that is viewed from another angle.

FIG. 18 is a schematic diagram of a structure that is of the structure shown in FIG. 17 and that is viewed from another angle.

The two first gaskets 51 have a same structure. A thickness of the first gasket 51 falls between 0.1 mm and 0.5 mm. Specifically, the two first gaskets 51 are respectively fastened to first fastening parts 41 of the two flexible circuit boards 4. The first gasket 51 is fastened to the middle part 411 of the first fastening part 41 of the flexible circuit board 4. In this case, a top surface 513 of the first gasket 51 is in contact with a bottom surface 414 of the first fastening part 41 of the flexible circuit board 4.

The two second gaskets 53 have a same structure. A thickness of the second gasket 53 falls between 0.1 mm and 0.5 mm. Specifically, the two second gaskets 53 are respectively fastened to second fastening parts 43 of the two flexible circuit boards 4. The second gasket 53 is fastened to the middle part 431 of the second fastening part 43 of the flexible circuit board 4. In this case, a top surface 533 of the second gasket 53 is in contact with a bottom surface 434 of the second fastening part 43 of the flexible circuit board 4.

Figure 19:
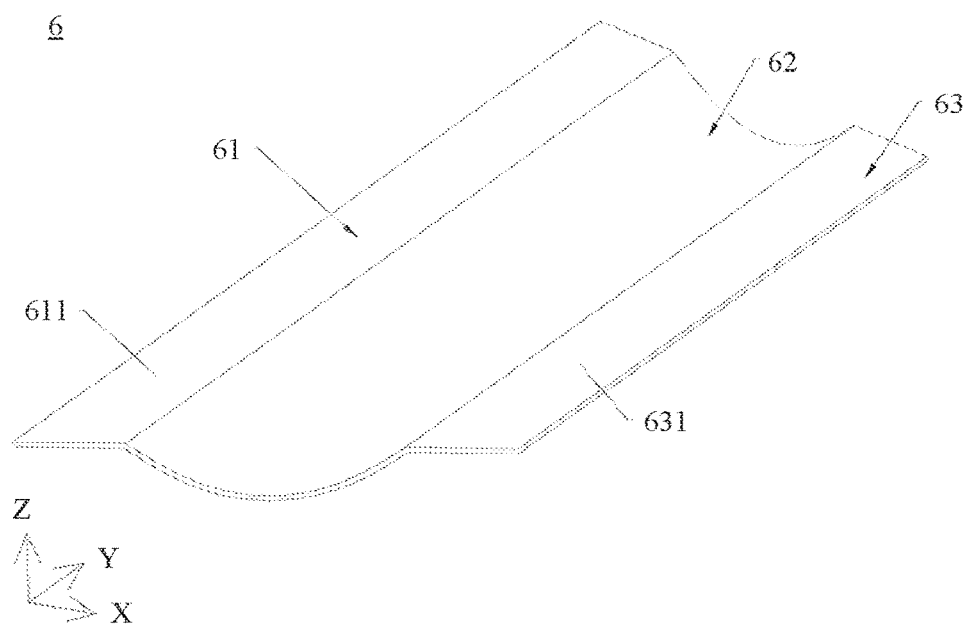
FIG. 19 is a schematic diagram of a structure of an auxiliary diaphragm in the vibration component shown in FIG. 12.

Refer to FIG. 12 and FIG. 19. FIG. 19 is a schematic diagram of a structure of the auxiliary diaphragm 6 in the vibration component 10b shown in FIG. 12.

The two auxiliary diaphragms 6 have a same structure. The auxiliary diaphragm 6 includes a first fastening part 61, a vibration part 62, and a second fastening part 63 that are sequentially connected. The first fastening part 61 is located on an outer side of the vibration part 62, and the second fastening part 63 is located on an inner side of the vibration part 62. A cross-sectional shape of the vibration part 62 of the auxiliary diaphragm 6 is an arc shape or an approximate arc shape, and the vibration part 62 extends in the Y-axis direction. The vibration part 62 of the auxiliary diaphragm 6 is concave, that is, the vibration part 62 is recessed away from a top surface 611 of the first fastening part 61 and a top surface 631 of the second fastening part 63. The first fastening part 61 is a fixed portion of the auxiliary diaphragm 6, and the second fastening part 63 is a movable portion of the auxiliary diaphragm 6, and may move relative to the first fastening part 61, and drive the vibration part 62 to move relative to the first fastening part 61. In this case, the vibration part 62 may be deformed when driven by the second fastening part 63.

Figure 20:
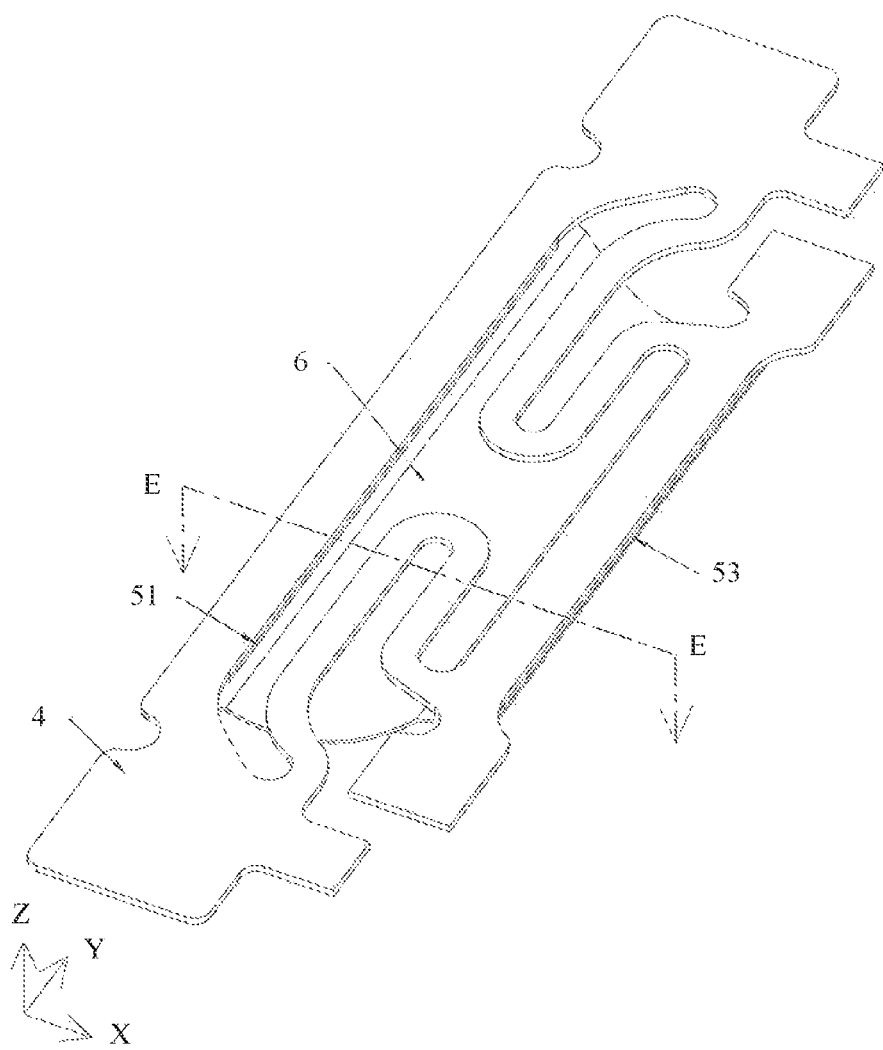
FIG. 20 is a schematic diagram of an assembly structure of a flexible circuit board, a gasket, and an auxiliary diaphragm in the vibration component shown in FIG. 12.
Figure 21:
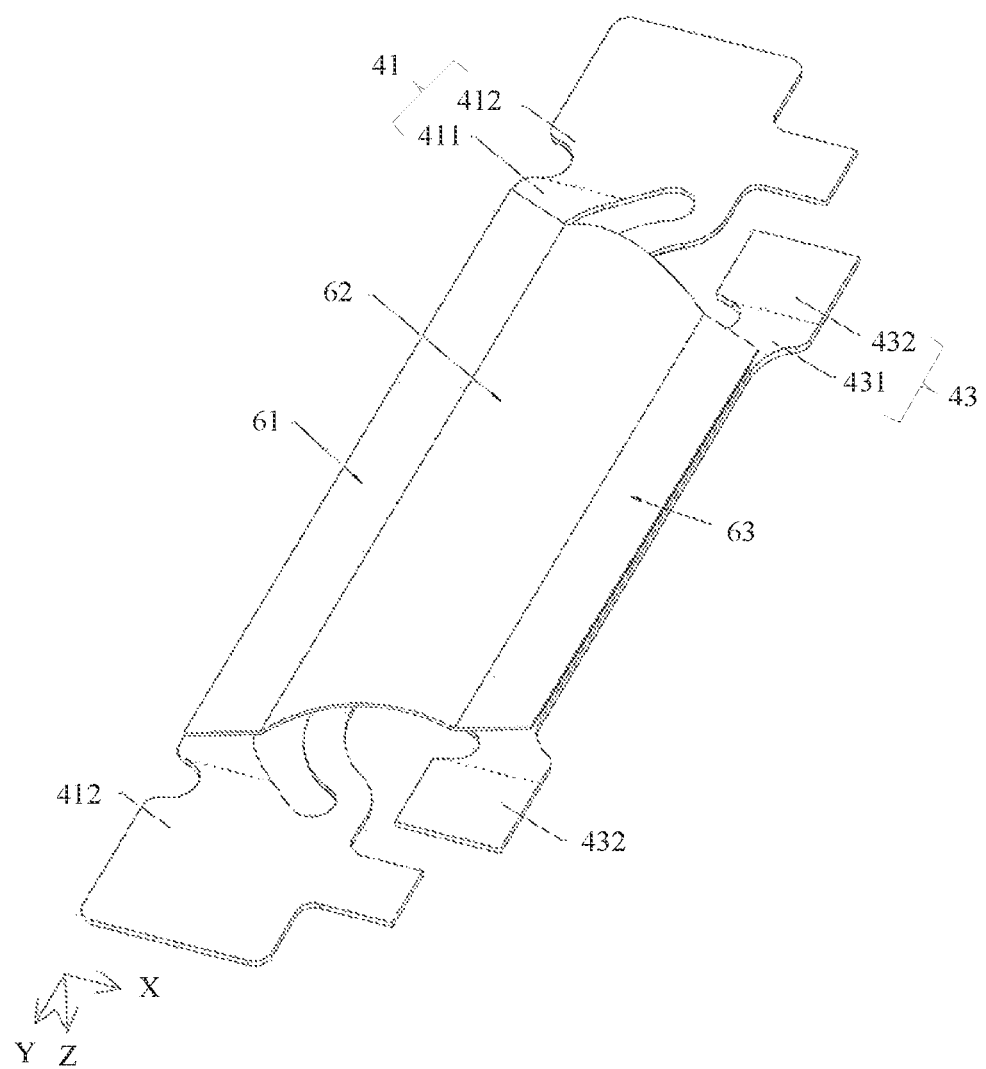
FIG. 21 is a schematic diagram of a structure that is of the structure shown in FIG. 20 and that is viewed from another angle.
Figure 22:
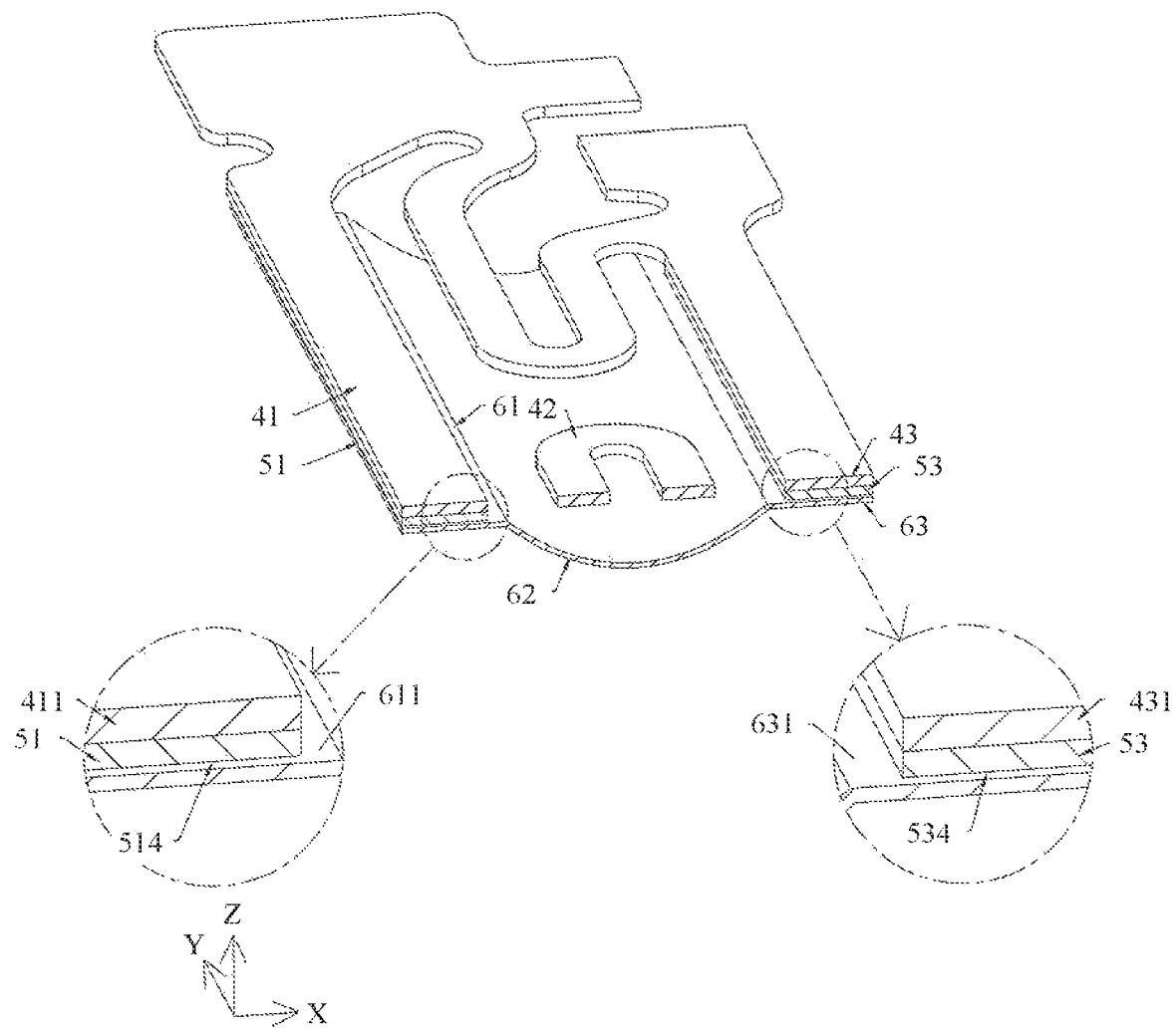
FIG. 22 is a schematic diagram of a structure obtained after the structure shown in FIG. 20 is sectioned along E-E.

Refer to FIG. 20 to FIG. 22. FIG. 20 is a schematic diagram of an assembly structure of the flexible circuit board 4, the gasket 5, and the auxiliary diaphragm 6 in the vibration component 10b shown in FIG. 12. FIG. 21 is a schematic diagram of a structure that is of the structure shown in FIG. 20 and that is viewed from another angle. FIG. 22 is a schematic diagram of a structure obtained after the structure shown in FIG. 20 is sectioned along E-E. FIG. 20 is a schematic diagram of an assembly structure of only one flexible circuit board 4, one gasket 5, and one auxiliary diaphragm 6.

The auxiliary diaphragm 6 is located on one side of the flexible circuit board 4. Specifically, the first fastening part 61 of the auxiliary diaphragm 6 is fastened to the first fastening part 41 of the flexible circuit board 4, the vibration part 62 of the auxiliary diaphragm 6 protrudes in a direction away from the connection stub 42 of the flexible circuit board 4, and the second fastening part 63 of the auxiliary diaphragm 6 is fastened to the second fastening part 43 of the flexible circuit board 4. The first fastening part 61 of the auxiliary diaphragm 6 is fastened to the middle part 411 of the first fastening part 41 of the flexible circuit board 4, and the second fastening part 63 of the auxiliary diaphragm 6 is fastened to the middle part 431 of the second fastening part 43 of the flexible circuit board 4.

The first gasket 51 is located between the first fastening part 61 of the auxiliary diaphragm 6 and the first fastening part 41 of the flexible circuit board 4. Specifically, a bottom surface 514 of the first gasket 51 is in contact with the top surface 611 of the first fastening part 61 of the auxiliary diaphragm 6. In other words, the first gasket 51 is connected between the first fastening part 61 of the auxiliary diaphragm 6 and the first fastening part 41 of the flexible circuit board 4. In other words, the first fastening part 61 of the auxiliary diaphragm 6 is fastened to the first fastening part 41 of the flexible circuit board 4 by using the first gasket 51, to increase a distance between the first fastening part 61 of the auxiliary diaphragm 6 and the first fastening part 41 of the flexible circuit board 4 in the thickness direction (namely, the Z-axis direction shown in the figure) of the electroacoustic transducer 10 and further increase a distance between the vibration part 62 of the auxiliary diaphragm 6 and the connection stub 42 of the flexible circuit board 4 in the Z-axis direction.

In an implementation, the first gasket 51 and the flexible circuit board 4 are integrally formed. In other words, the first gasket 51 and the flexible circuit board 4 may be formed in a same production process to simplify a molding process of the first gasket 51. In this case, the first gasket 51 and the first fastening part 61 of the auxiliary diaphragm 6 may be fastened to each other through bonding.

The first gasket 51 is a reinforcement structure such as a copper sheet, an aluminum foil sheet, a polyimide (polyimide, PI) reinforcement plate, or a glass fiber reinforcement plate (also referred to as a PR-4 reinforcement plate), to support the first fastening part 41 of the flexible circuit board 4 and facilitate assembly of the flexible circuit board 4. It should be noted that a conventional flexible circuit board is of a structure with a uniform thickness. An integral structure of the first gasket 51 and the flexible circuit board 4 shown in this implementation may be considered as a heterogeneous flexible circuit board with a non-uniform thickness, and a portion with an increased thickness in the heterogeneous flexible circuit board is the foregoing first gasket 51.

In another implementation, the first gasket 51 and the first fastening part 61 of the auxiliary diaphragm 6 may be integrally formed. In other words, the first gasket 51 and the auxiliary diaphragm 6 may be formed in a same production process to simplify a molding process of the first gasket 51. In this case, the first gasket 51 and the first fastening part 41 of the flexible circuit board 4 may be fastened to each other through bonding.

The first gasket 51 is a structural member such as a copper ring, a plastic ring, or a steel ring, to produce the first fastening part 61 of the auxiliary diaphragm 6 and facilitate assembly of the auxiliary diaphragm 6. It should be noted that a conventional diaphragm is of a structure with a uniform thickness. An integral structure of the first gasket 51 and the auxiliary diaphragm 6 shown in this implementation may be considered as a heterogeneous diaphragm with a non-uniform thickness, and a portion with an increased thickness in the heterogeneous diaphragm is the foregoing first gasket 51.

In the third implementation, the first gasket 51 is an independent part. In other words, the first gasket 51, the flexible circuit board 4, and the auxiliary diaphragm 6 are formed in different processes. In this case, the first gasket 51 may be separately fastened to the first fastening part 41 of the flexible circuit board 4 and the first fastening part 61 of the auxiliary diaphragm 6 through bonding.

The second gasket 53 is located between the second fastening part 63 of the auxiliary diaphragm 6 and the second fastening part 43 of the flexible circuit board 4. Specifically, a bottom surface 534 of the second gasket 53 is in contact with the top surface 631 of the second fastening part 63 of the auxiliary diaphragm 6. In other words, the second gasket 53 is connected between the second fastening part 41 of the flexible circuit board 4 and the second fastening part 63 of the auxiliary diaphragm 6. In other words, the second fastening part 63 of the auxiliary diaphragm 6 is fastened to the second fastening part 43 of the flexible circuit board 4 by using the second gasket 53, to increase a distance between the second fastening part 63 of the auxiliary diaphragm 6 and the second fastening part 43 of the flexible circuit board 4 in the Z-axis direction and further increase a distance between the vibration part 62 of the auxiliary diaphragm 6 and the connection stub 42 of the flexible circuit board 4 in the Z-axis direction.

In an implementation, the second gasket 53 and the flexible circuit board 4 are integrally formed. In other words, the second gasket 53 and the flexible circuit board 4 may be formed in a same production process to simplify a molding process of the second gasket 53. In this case, the second gasket 53 and the second fastening part 63 of the auxiliary diaphragm 6 may be fastened to each other through bonding.

The second gasket 53 is a reinforcement structure such as a copper sheet, an aluminum foil sheet, a polyimide reinforcement plate, or a glass fiber reinforcement plate, to support the second fastening part 43 of the flexible circuit board 4 and facilitate assembly of the flexible circuit board 4. It should be noted that a conventional flexible circuit board is of a structure with a uniform thickness. An integral structure of the second gasket 53 and the flexible circuit board 4 shown in this implementation may be considered as a heterogeneous flexible circuit board with a non-uniform thickness, and a portion with an increased thickness in the heterogeneous flexible circuit board is the foregoing second gasket 53.

In another implementation, the second gasket 53 and the second fastening part 63 of the auxiliary diaphragm 6 may be integrally formed. In other words, the second gasket 53 and the auxiliary diaphragm 6 may be formed in a same production process to simplify a molding process of the second gasket 53. In this case, the second gasket 53 and the second fastening part 43 of the flexible circuit board 4 may be fastened to each other through bonding.

The second gasket 53 is a structural member such as a copper ring, a plastic ring, or a steel ring, to produce the second fastening part 63 of the auxiliary diaphragm 6 and facilitate assembly of the auxiliary diaphragm 6. It should be noted that a conventional diaphragm is of a structure with a uniform thickness. An integral structure of the second gasket 53 and the auxiliary diaphragm 6 shown in this implementation may be considered as a heterogeneous diaphragm with a non-uniform thickness, and a portion with an increased thickness in the heterogeneous diaphragm is the foregoing second gasket 53.

In the third implementation, the second gasket 53 is an independent part. In other words, the second gasket 53, the flexible circuit board 4, and the auxiliary diaphragm 6 are formed in different processes. In this case, the second gasket 53 may be separately fastened to the second fastening part 43 of the flexible circuit board 4 and the second fastening part 63 of the auxiliary diaphragm 6 through bonding.

Figure 23:
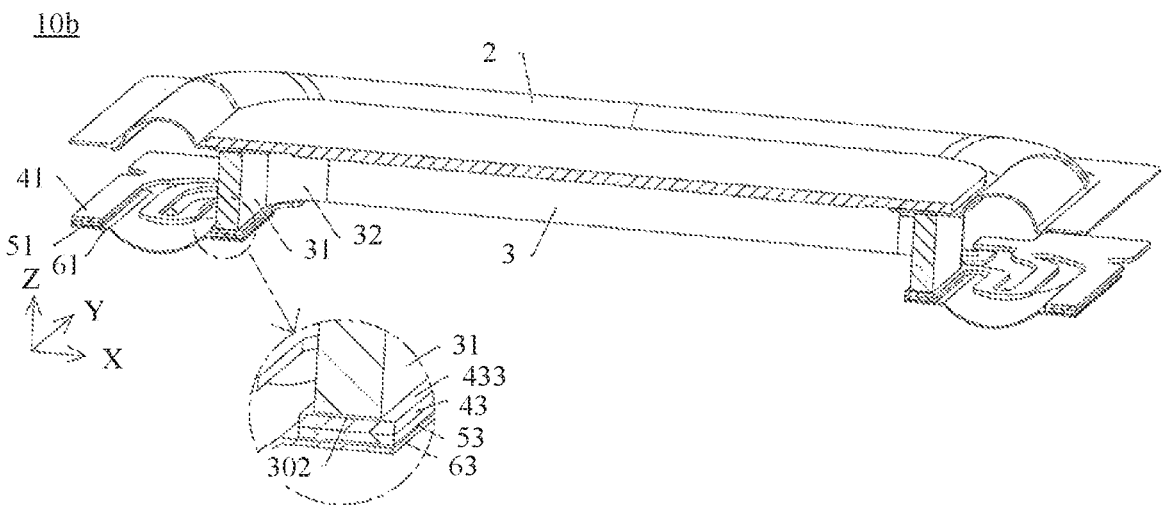
FIG. 23 is a schematic diagram of a structure obtained after the vibration component shown in FIG. 11 is sectioned along F-F.
Figure 24:
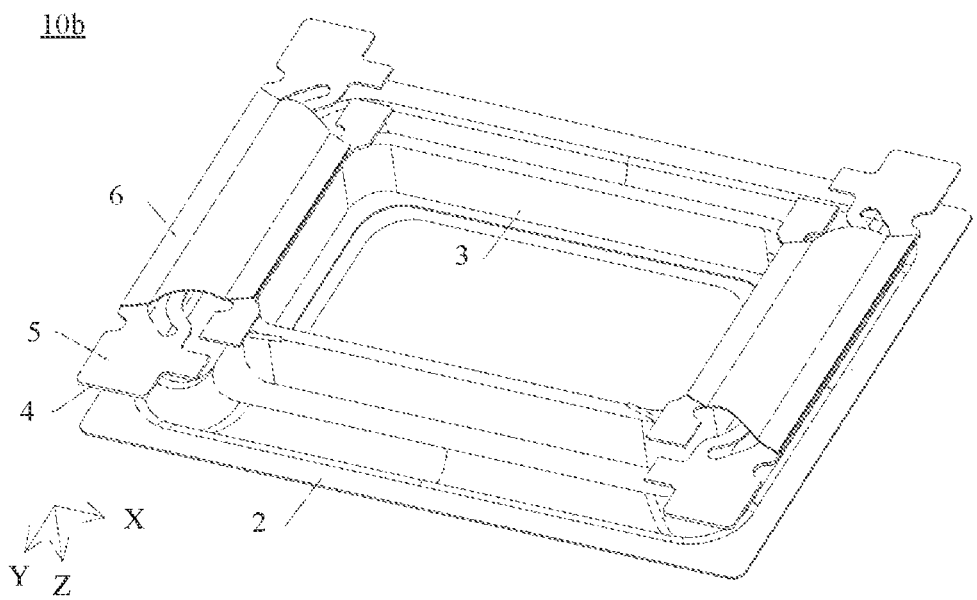
FIG. 24 is a schematic diagram of a structure of the vibration component shown in FIG. 11 from another angle.

Refer to FIG. 23 and FIG. 24. FIG. 23 is a schematic diagram of a structure obtained after the vibration component 10b shown in FIG. 11 is sectioned along F-F. FIG. 24 is a schematic diagram of a structure of the vibration component 10b shown in FIG. 11 from another angle.

The two flexible circuit boards 4, the two first gaskets 51, the two second gaskets 52, and the two auxiliary diaphragms 6 are all located on a side that is of the voice coil 3 and that is away from the voice membrane 2. The two flexible circuit boards 4 are arranged at intervals. The two flexible circuit boards 4 may be symmetrical with respect to the first reference plane, and each flexible circuit board 4 may be symmetrical with respect to the second reference plane. The two flexible circuit boards 4 are fastened to the voice coil 3. Specifically, second fastening parts 43 of the two flexible circuit boards 4 are fastened to the voice coil 3. The middle part 431 of the second fastening part 43 of the flexible circuit board 4 is fastened to the voice coil 3. In this case, a top surface 433 of the second fastening part 43 of the flexible circuit board 4 is in contact with a bottom surface 302 of the voice coil 3. For example, the second fastening parts 43 of the two flexible circuit boards 4 and the voice coil 3 may be fastened to each other through bonding.

In this embodiment, the two flexible circuit boards 4 are a left flexible circuit board 4 and a right flexible circuit board 4 arranged in the X-axis direction. A second fastening part 43 of the left flexible circuit board 4 is fastened to the left straight edge 31 and the two left rounded corners 32 of the voice coil 3, and a second fastening part 43 of the right flexible circuit board 4 is fastened to the right straight edge 31 and the two right rounded corners 32 of the voice coil 3.

In addition, the voice coil 3 is further separately electrically connected to the two flexible circuit boards 4 by using wires. Specifically, the four rounded corners 32 of the voice coil 3 are separately connected to the first fastening parts 41 of the two flexible circuit boards 4 by using two wires. The two left rounded corners 32 are respectively connected to two end parts 412 of a first fastening part 41 of the left flexible circuit board 4 by using two wires, and the two right rounded corners 32 are respectively connected to two end parts 412 of a first fastening part 41 of the right flexible circuit board 4 by using two wires.

The two first gaskets 51 are located on a side of the first fastening parts 41 of the two flexible circuit boards 4 that is away from the voice membrane 2. The two first gaskets 51 are arranged at intervals, and may be symmetrical with respect to the first reference plane. Specifically, each first gasket 51 is fastened to a first fastening part 41 of one flexible circuit board 4. The two first gaskets 51 are a left first gasket 51 and a right first gasket 51 arranged in the X-axis direction, the left first gasket 51 is fastened to the first fastening part 41 of the left flexible circuit board 4, and the right first gasket 51 is fastened to the first fastening part 41 of the right flexible circuit board 4.

The two second gaskets 53 are located on a side of the second fastening parts 43 of the two flexible circuit boards 4 that is away from the voice coil 3. The two second gaskets 53 are arranged at intervals, and may be symmetrical with respect to the first reference plane. Specifically, each second gasket 53 is fastened to a second fastening part 43 of one flexible circuit board 4. The two second gaskets 53 are a left second gasket 53 and a right second gasket 53 arranged in the X-axis direction, the left second gasket 53 is fastened to the second fastening part 43 of the left flexible circuit board 4, and the right second gasket 53 is fastened to the second fastening part 43 of the right flexible circuit board 4.

The two auxiliary diaphragms 6 are located on a side of the two flexible circuit boards 4 that is away from the voice membrane 3. The two auxiliary diaphragms 6 are arranged at intervals, and may be symmetrical with respect to the first reference plane. The vibration part 63 of the auxiliary diaphragm 6 protrudes in a direction away from the voice membrane 3, so that the vibration part 62 of the auxiliary diaphragm 6 has larger vibration space, and can fully use space below the vibration component 10b to vibrate, thereby implementing large-amplitude vibration of the auxiliary diaphragm 6.

In this embodiment, the two auxiliary diaphragms 6 are a left auxiliary diaphragm 6 and a right auxiliary diaphragm 6 arranged in the X-axis direction. A first fastening part 61 of the left auxiliary diaphragm 6 is fastened to the first fastening part 41 of the left flexible circuit board 4 by using the left first gasket 51, and a second fastening part 63 of the left auxiliary diaphragm 6 is fastened to the second fastening part 43 of the left flexible circuit board 4 by using the left second gasket 53. A first fastening part 61 of the right auxiliary diaphragm 6 is fastened to the first fastening part 41 of the right flexible circuit board 4 by using the right first gasket 51, and a second fastening part 63 of the right auxiliary diaphragm 6 is fastened to the second fastening part 43 of the right flexible circuit board 4 by using the right second gasket 53. In other words, both the left first gasket 51 and the left second gasket 53 are connected between the left auxiliary diaphragm 6 and the left flexible circuit board 4, and the right first gasket 5 and the right second gasket 53 are connected between the right auxiliary diaphragm 6 and the right flexible circuit board 4.

It should be noted that, in other embodiments, the two auxiliary diaphragms 6 may be located on a side of the two flexible circuit boards 4 that is close to the voice membrane 2. In this case, the first fastening part 61 of the auxiliary diaphragm 6 is fastened to the voice coil 3, and the vibration part 62 of the auxiliary diaphragm 6 protrudes toward the voice membrane 2.

Figure 25:
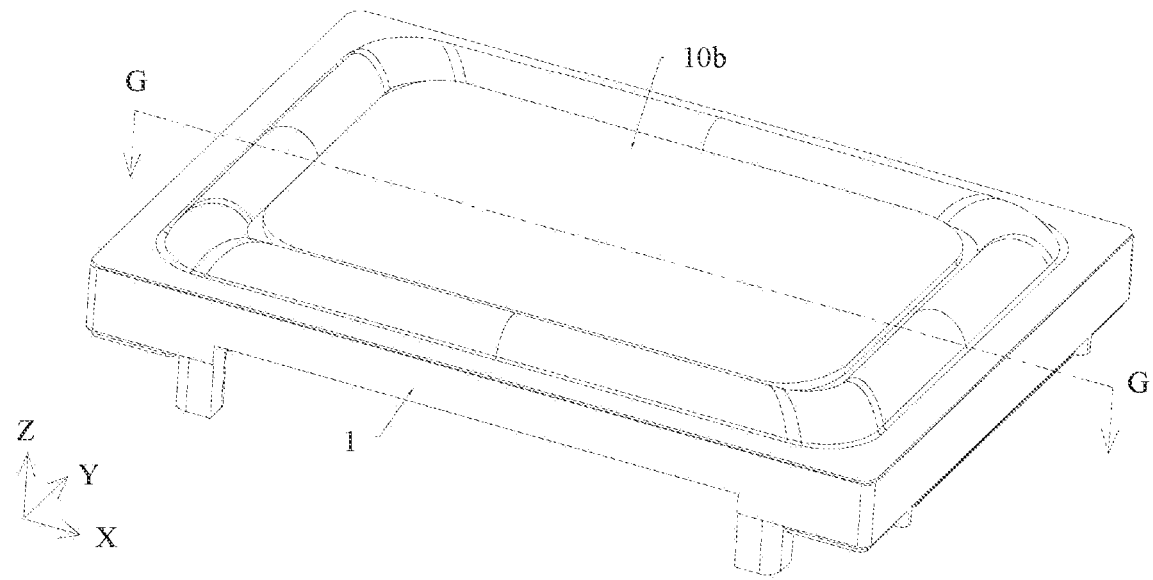
FIG. 25 is a schematic diagram of an assembly structure of a vibration component and a basket in the electroacoustic transducer shown in FIG. 8.
Figure 26:
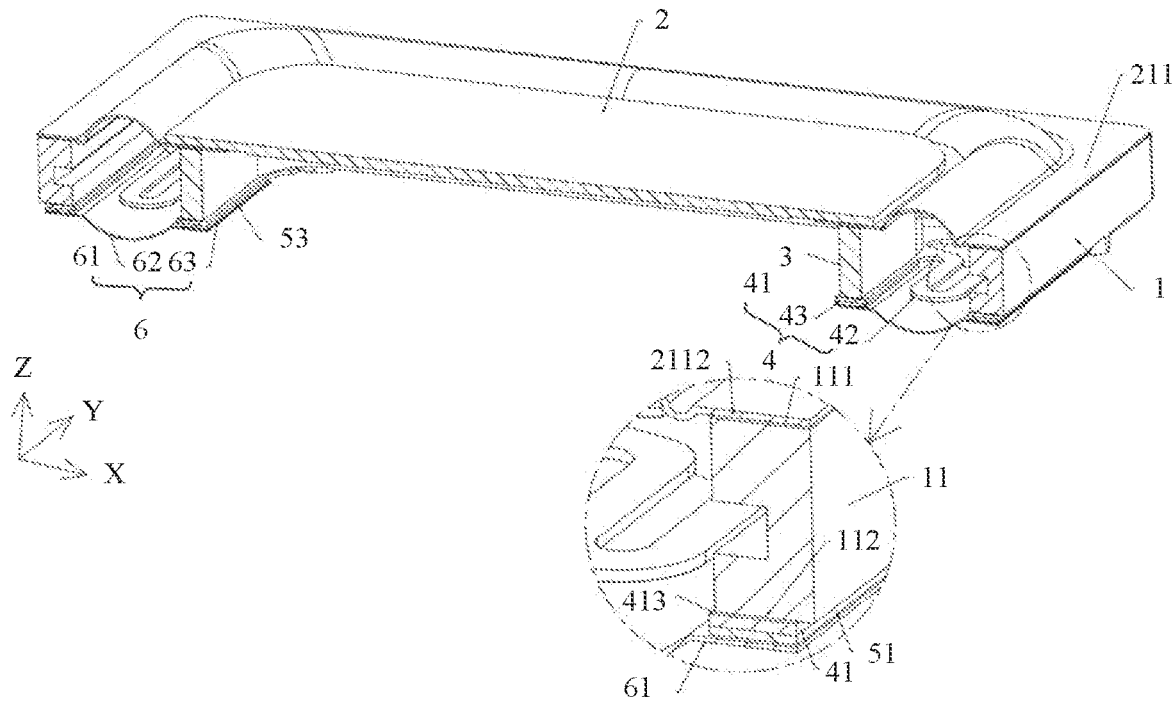
FIG. 26 is a schematic diagram of a structure obtained after the structure shown in FIG. 25 is sectioned along G-G.

Refer to FIG. 25 and FIG. 26. FIG. 25 is a schematic diagram of an assembly structure of the vibration component 10b and the basket 1 in the electroacoustic transducer 10 shown in FIG. 8. FIG. 26 is a schematic diagram of a structure obtained after the structure shown in FIG. 25 is sectioned along G-G.

An edge of the voice membrane 2 is fastened to the top surface 111 of the framework 11 of the basket 1. Specifically, the first fastening part 211 of the diaphragm 21 is fastened to the top surface 111 of the framework 11. The bottom surface 2112 of the first fastening part 211 of the diaphragm 21 is in contact with the top surface 111 of the framework 11. For example, the first fastening part 211 of the diaphragm 21 and the framework 11 of the basket 1 may be fastened to each other through bonding. In this case, a vibration direction of the voice membrane 2 is parallel to the thickness direction (namely, the Z-axis direction) of the electroacoustic transducer 10. In addition, the vibration part of the diaphragm 21 protrudes in a direction away from the basket 1, so that the vibration part 212 of the diaphragm 21 has larger vibration space, thereby implementing large-amplitude vibration of the voice membrane 2.

The voice coil 3 is located on an inner side of the basket 1. The two flexible circuit boards 4, the two gaskets 5, and the two auxiliary diaphragms 6 are located on a side that is of the framework 11 of the basket 1 and that is away from the voice membrane 2. Specifically, the first fastening part 41 of the flexible circuit board 4 is fastened to the framework 11. A top surface 413 of the first fastening part 41 of the flexible circuit board 4 is in contact with the bottom surface 112 of the framework 11. For example, the first fastening part 41 of the flexible circuit board 4 and the framework 11 may be fastened to each other through bonding. In this case, the first fastening part 41 of the flexible circuit board 4 is fastened to the framework 11, the second fastening part 43 of the flexible circuit board 4 is fastened to the voice coil 3, and the two connection stubs 42 of the flexible circuit board 4 and the vibration part 62 of the auxiliary diaphragm 6 suspend relative to the framework 11.

In this embodiment, the electroacoustic transducer 10 includes two elastic systems, the voice membrane is a first elastic system located at the top of the voice coil 3, the flexible circuit board 4 and the auxiliary diaphragm 6 are a second elastic system located at the bottom of the voice coil 3, and the two elastic systems vibrate with the voice coil 3, so that the voice coil 3 moves up and down in a magnetic circuit provided by the magnetic circuit component 10c, to avoid a problem that the voice coil 3 collides with a part of the magnetic circuit component 10c when the voice coil 3 moves in the magnetic field provided by the magnetic circuit component 10c, thereby suppressing rolling vibration of the voice coil 3 and ensuring that the electroacoustic transducer 10 has better sound quality.

It should be understood that in a conventional electroacoustic transducer 10, when a voice coil 3 drives a voice membrane 2, a flexible circuit board 4, and an auxiliary diaphragm 6 to vibrate, a second fastening part 41 of the flexible circuit board 4 and a second fastening part 62 of the auxiliary diaphragm 6 move with the voice coil 3, a first fastening part 41 of the flexible circuit board 4 and a first fastening part 61 of the auxiliary diaphragm 6 are fixed relative to a basket 1, a connection stub 42 of the flexible circuit board 4 moves with the second fastening part 43, and a vibration part 62 of the auxiliary diaphragm 6 moves with the second fastening part 63. In this case, a displacement difference between the connection stub 42 of the flexible circuit board 4 and the vibration part 62 of the auxiliary diaphragm 6 is large, and the vibration part 62 of the auxiliary diaphragm 6 is likely to interfere with the connection stub 42 of the flexible circuit board 4. In particular, portions that are of the vibration part 62 and the connection stub 42 and that are close to the basket 1 are likely to interfere with each other. Consequently, the electroacoustic transducer 10 generates noise, and the electroacoustic transducer 10 cannot implement large-amplitude vibration.

In the electroacoustic transducer 10 shown in this embodiment, because the first gasket 51 exists, the distance between the first fastening part 41 of the flexible circuit board 4 and the first fastening part 61 of the auxiliary diaphragm 6 in the thickness direction (namely, the Z-axis direction) of the electroacoustic transducer 10 is increased, which equivalently means that the distance between the vibration part 62 of the auxiliary diaphragm 6 and the connection stub 42 of the flexible circuit board 4 in the thickness direction of the electroacoustic transducer 10 is increased, so that a problem that noise is generated because the vibration part 62 of the auxiliary diaphragm 6 interferes with the connection stub 42 of the flexible circuit board 4 is avoided, amplitude of the electroacoustic transducer 10 is increased, a resonance frequency of the electroacoustic transducer 10 is reduced, and low-frequency sensitivity and loudness of the electroacoustic transducer are improved. Because the thickness of the first gasket 51 falls between 0.1 mm and 0.5 mm, the amplitude of the electroacoustic transducer 10 may be increased by at least 0.1 mm. In this case, the amplitude of the electroacoustic transducer 10 may be at least 0.5 mm.

In addition, because the second gasket 53 exists, the distance between the second fastening part 43 of the flexible circuit board 4 and the second fastening part 63 of the auxiliary diaphragm 6 in the thickness direction (namely, the Z-axis direction) of the electroacoustic transducer 10 is further increased, to further increase the distance between the vibration part 62 of the auxiliary diaphragm 6 and the connection stub 42 of the flexible circuit board 4 in the thickness direction of the electroacoustic transducer 10, so that the problem that noise is generated because the vibration part 62 of the auxiliary diaphragm 6 interferes with the connection stub 42 of the flexible circuit board 4 is avoided, the amplitude of the electroacoustic transducer 10 is increased, the resonance frequency of the electroacoustic transducer 10 is reduced, and the low-frequency sensitivity and the loudness of the electroacoustic transducer 10 are improved.

It should be noted that, in some other embodiments, the electroacoustic transducer 10 may not include the second gasket 53, but use only the first gasket 51 to increase the distance between the vibration part 62 of the auxiliary diaphragm 6 and the connection stub 42 of the flexible circuit board 4 in the thickness direction of the electroacoustic transducer 10.

Figure 27:
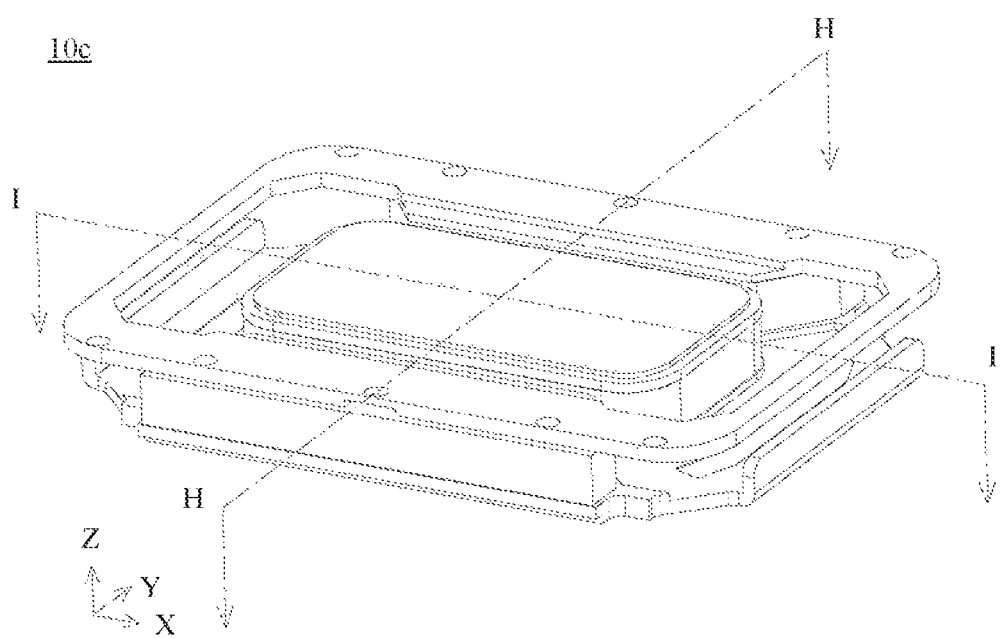
FIG. 27 is a schematic diagram of a structure of a magnetic circuit component in the electroacoustic transducer shown in FIG. 8.
Figure 28:
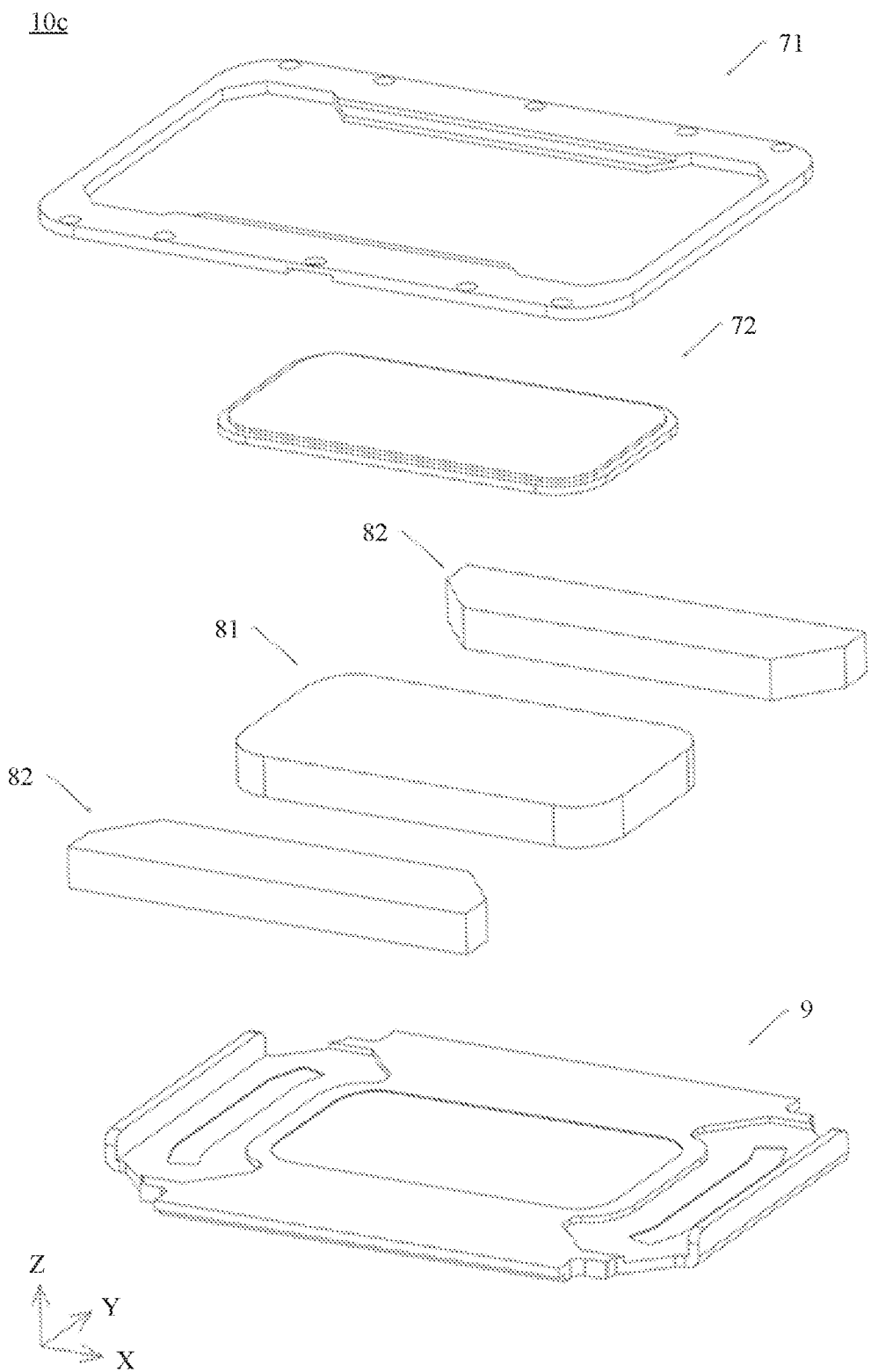
FIG. 28 is a schematic diagram of an exploded structure of the magnetic circuit component shown in FIG. 27.

Refer to FIG. 27 and FIG. 28. FIG. 27 is a schematic diagram of a structure of the magnetic circuit component 10c in the electroacoustic transducer 10 shown in FIG. 8. FIG. 28 is a schematic diagram of an exploded structure of the magnetic circuit component 10c shown in FIG. 27.

The magnetic circuit component 10c includes a central electrode plate 71, a side electrode plate 72, a central magnet 81, two first side magnets 82, and a lower electrode plate 9. The central electrode plate 71, the side electrode plate 72, and the lower electrode plate 9 are magnetic conductive parts. The central magnet 81 and the two first side magnets 82 are permanent magnets, and jointly form a magnet group.

Figure 29:
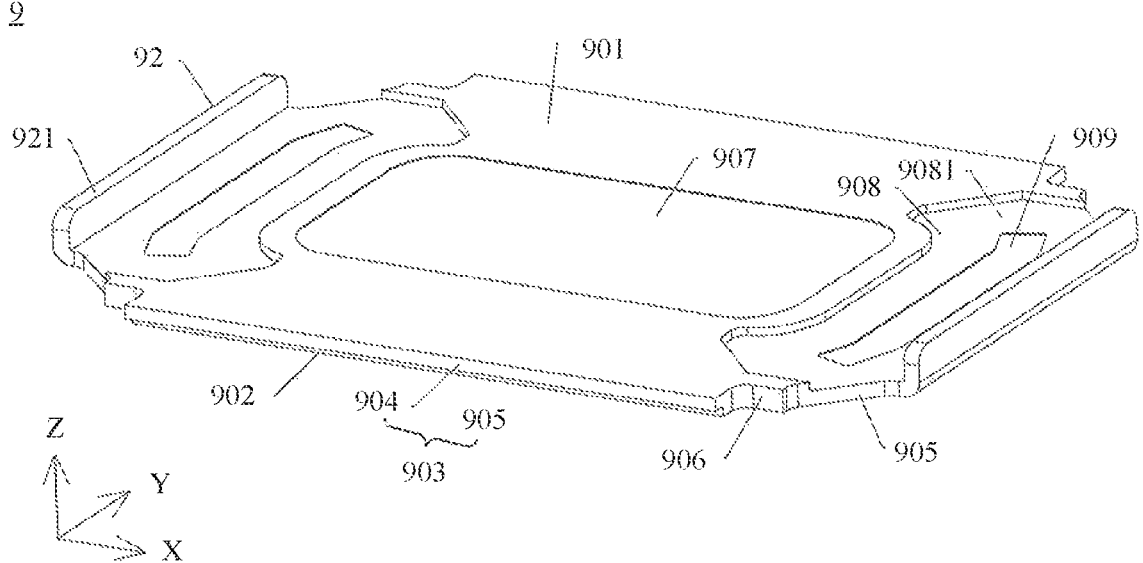
FIG. 29 is a schematic diagram of a structure of a lower electrode plate in the magnetic circuit component shown in FIG. 28.

FIG. 29 is a schematic diagram of a structure of the lower electrode plate 9 in the magnetic circuit component 10c shown in FIG. 28.

The lower electrode plate 9 includes a top surface 901 and a bottom surface 902 that are disposed opposite to each other and a peripheral surface 903 connected between the top surface 901 and the bottom surface 902. The peripheral surface 903 of the lower electrode plate 9 includes two side peripheral surfaces 904 and four chamfered surfaces 905 that are disposed opposite to each other, and every two chamfered surfaces 905 are connected to two ends of a first peripheral surface 914.

Four clamping spaces 906, a central groove 907, two avoidance grooves 908, and two auxiliary grooves 909 are disposed on the lower electrode plate 9. In this embodiment, the clamping space 906 is a notch, and an opening of the clamping space 906 is located on the top surface 901 of the lower electrode plate 9. An extension direction of the clamping space 906 is a direction from the top surface 901 to the bottom surface 902 of the lower electrode plate 9, and the clamping space 906 penetrates the bottom surface 902 and the side peripheral surface 904 of the lower electrode plate 9. The four clamping spaces 906 are arranged at intervals on the edge of the lower electrode plate 9, and may be symmetrical with respect to the first reference plane, or may be symmetrical with respect to the second reference plane. In some other embodiments, the clamping space 906 may be a hole.

An opening of the central groove 907 is located on the top surface 901 of the lower electrode plate 9. Specifically, the opening of the central groove 907 is located in a central region of the top surface 901 of the lower electrode plate 9. A recessed direction of the central groove 9078 is a direction from the top surface 901 to the bottom surface 902 of the lower electrode plate 9.

Openings of the two avoidance grooves 908 are located on the top surface 901 of the lower electrode plate 9. Specifically, the openings of the two avoidance grooves 908 are located in an edge region of the lower electrode plate 9. The openings of the two avoidance grooves 908 are arranged at intervals in the X-axis direction. Recessed directions of the avoidance grooves 908 are the direction from the top surface 901 to the bottom surface 902 of the lower electrode plate 9. In addition, the two avoidance grooves 908 may be symmetrical with respect to the first reference plane, and each avoidance groove 908 may be symmetrical with respect to the second reference plane. They are respectively located on two sides of the opening of the central groove 907. In this case, the openings of the two avoidance grooves 908 are respectively located on two sides of the opening of the central groove 907, and are spaced apart from the opening of the central groove 907.

Openings of the two auxiliary grooves 909 are respectively located on groove bottom walls 9181 of the two avoidance grooves 908. Specifically, the opening of the auxiliary groove 909 is located in a central region of the groove bottom wall 9081 of the avoidance groove 908. A recessed direction of the auxiliary groove 909 is a direction from the groove bottom wall 9081 of the avoidance groove 908 to the bottom surface 902 of the lower electrode plate 9.

In addition, two ends of the lower electrode plate 9 are bent to form two mounting parts 92 through extension. The two mounting parts 92 are arranged at intervals in the X-axis direction, and may be symmetrical with respect to the first reference plane. The mounting part 92 extends in the Y-axis direction, and includes a top surface 921 that faces a same direction as the top surface 901 of the lower electrode plate 9.

Figure 30:
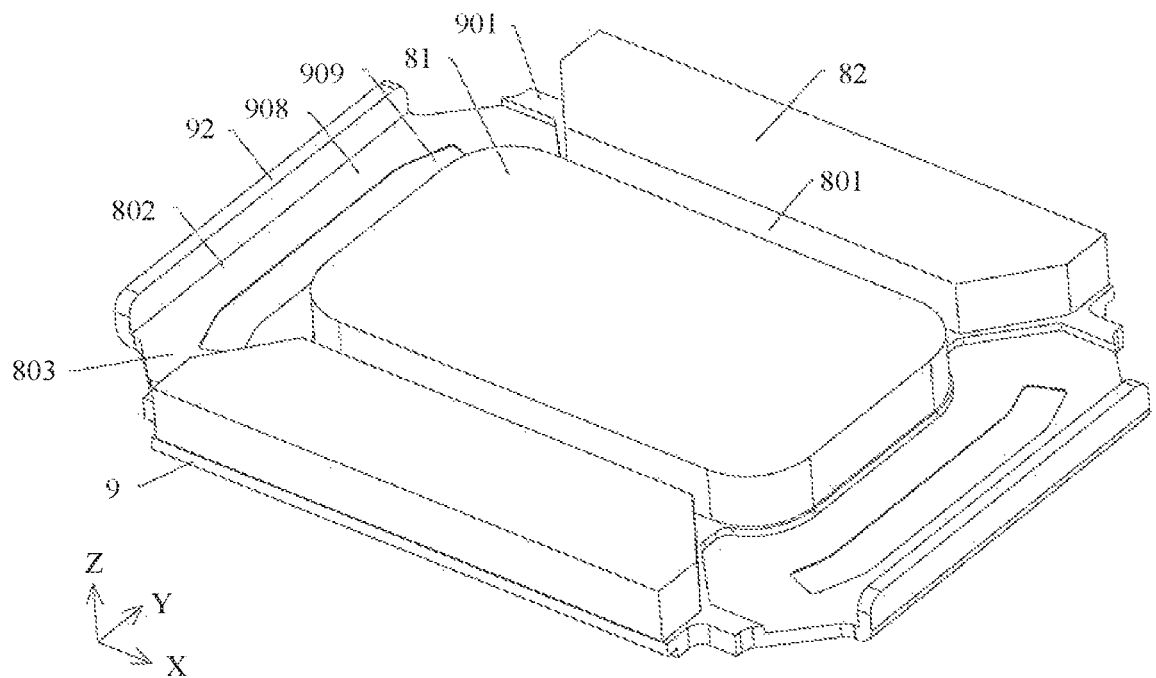
FIG. 30 is a schematic diagram of an assembly structure of a central magnet, two first side magnets, and a lower electrode plate in the magnetic circuit component shown in FIG. 28.

FIG. 30 is a schematic diagram of an assembly structure of the central magnet 81, the two first side magnets 82, and the lower electrode plate 9 in the magnetic circuit component 10c shown in FIG. 28.

Both the central magnet 81 and the two first side magnets 82 are located on the top surface 901 of the lower electrode plate 9. The central magnet 81 is approximately in a shape of a rounded rectangle or a rectangle. The central magnet 81 covers the central groove 907 of the lower electrode plate 9. Specifically, the central magnet 81 is fastened to the top surface 901 of the lower electrode plate 9, and covers the opening of the central groove 907. For example, the central magnet 81 may be fastened to the top surface 901 of the lower electrode plate 9 through bonding. The central groove 907 is disposed to reduce a weight of the lower electrode plate 9 and reduce a connection area between a bottom surface of the central magnet 81 and the top surface 901 of the lower electrode plate 9, so that it is easier to implement a connection between the surfaces, and connection quality is higher. In some other embodiments, the central groove 907 may be omitted from the lower electrode plate 9.

The two first side magnets 82 are symmetrically arranged on two sides of the central magnet 81, and may be symmetrical with respect to the second reference plane. Specifically, the two first side magnets 82 are fastened to the top surface 901 of the lower electrode plate 9. For example, the two first side magnets 82 may be fastened to the top surface 901 of the lower electrode plate 9 through bonding. The two first side magnets 82 are arranged at intervals in the Y-axis direction, and a first gap 801 is formed between each first side magnet 82 and the central magnet 81.

The two mounting parts 92 of the lower electrode plate 9 are disposed at intervals in the X-axis direction, and are symmetrically arranged on the other two sides of the central magnet 81, and a third gap 802 is formed between each mounting part 92 and the central magnet 81. The two avoidance grooves 908 and the two auxiliary grooves 909 of the lower electrode plate 9 are separately connected to two third gaps 802, to form space with a larger volume. In addition, four connection gaps 803 are formed on outer sides of four corners of the central magnet 81, and each connection gap 803 is connected to an adjacent first gap 801 and third gap 802, and is connected to the outside of the magnetic circuit component 10c.

Figure 31:
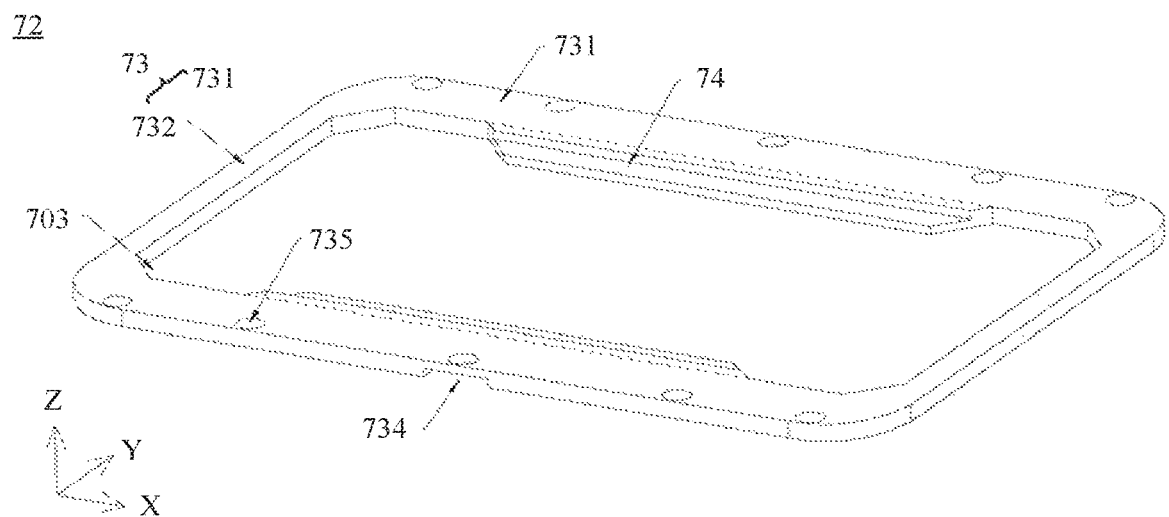
FIG. 31 is a schematic diagram of a structure of a side electrode plate in the magnetic circuit component shown in FIG. 28.

FIG. 31 is a schematic diagram of a structure of the side electrode plate 72 in the magnetic circuit component 10c shown in FIG. 28.

The side electrode plate 72 includes a connection frame part 73 and two first electrode plate parts 74 located on an inner side of the connection frame part 73. The connection frame part 73 includes two first straight edges 731 disposed opposite to each other and two second straight edges 732 located between the two first straight edges 731. The two first straight edges 731 are arranged at intervals in the Y-axis direction, and may be symmetrically distributed with respect to the second reference plane. The two second straight edges 732 are arranged at intervals in the X-axis direction, and may be symmetrically distributed with respect to the first reference plane. The two first electrode plate parts 74 are respectively connected to the two first straight edges 731 of the connection frame part 73, and may be symmetrical with respect to the second reference plane.

Two limiting grooves 734 and at least one limiting hole 735 are disposed on the connection frame part 73. The two limiting grooves 734 are respectively disposed on the two first straight edges 731. Specifically, an opening of the limiting groove 734 is located in a central region of a top surface of the first straight edge 731. A recessed direction of the limiting groove 734 is a direction from the top surface to a bottom surface of the first straight edge 731, and the limiting groove 734 penetrates the bottom surface of the first straight edge 731. The limiting groove 734 includes a first portion and a second portion connected to the first portion, and the second portion is located on a bottom side of the first portion, and penetrates the bottom surface and an outer side surface of the first straight edge 731.

The at least one limiting hole 735 is disposed on the two first straight edges 731. Specifically, an opening of the limiting hole 735 is located on the top surface of the first straight edge 731. An extension direction of the limiting hole 735 is a direction from the top surface to the bottom surface of the first straight edge 731, and the limiting hole 735 penetrates the bottom surface of the first straight edge 731. In other words, the limiting hole 735 penetrates the first straight edge 731 in a thickness direction (namely, the Z-axis direction) of the first straight edge 731. Four limiting holes 735 are disposed on each first straight edge 731, the four limiting holes 735 are arranged at intervals in the X-axis direction, and two limiting holes are disposed on each of two sides of the limiting groove 734. It should be understood that the limiting hole 735 is not limited to a circular hole shown in FIG. 31, and may be alternatively a square hole or a heterogeneous hole. In addition, four corner gaps 703 are formed at four corners on an inner side of the connection frame part 73, and every two corner gaps 703 are separately located on two sides of one first electrode plate part 74.

Figure 32:
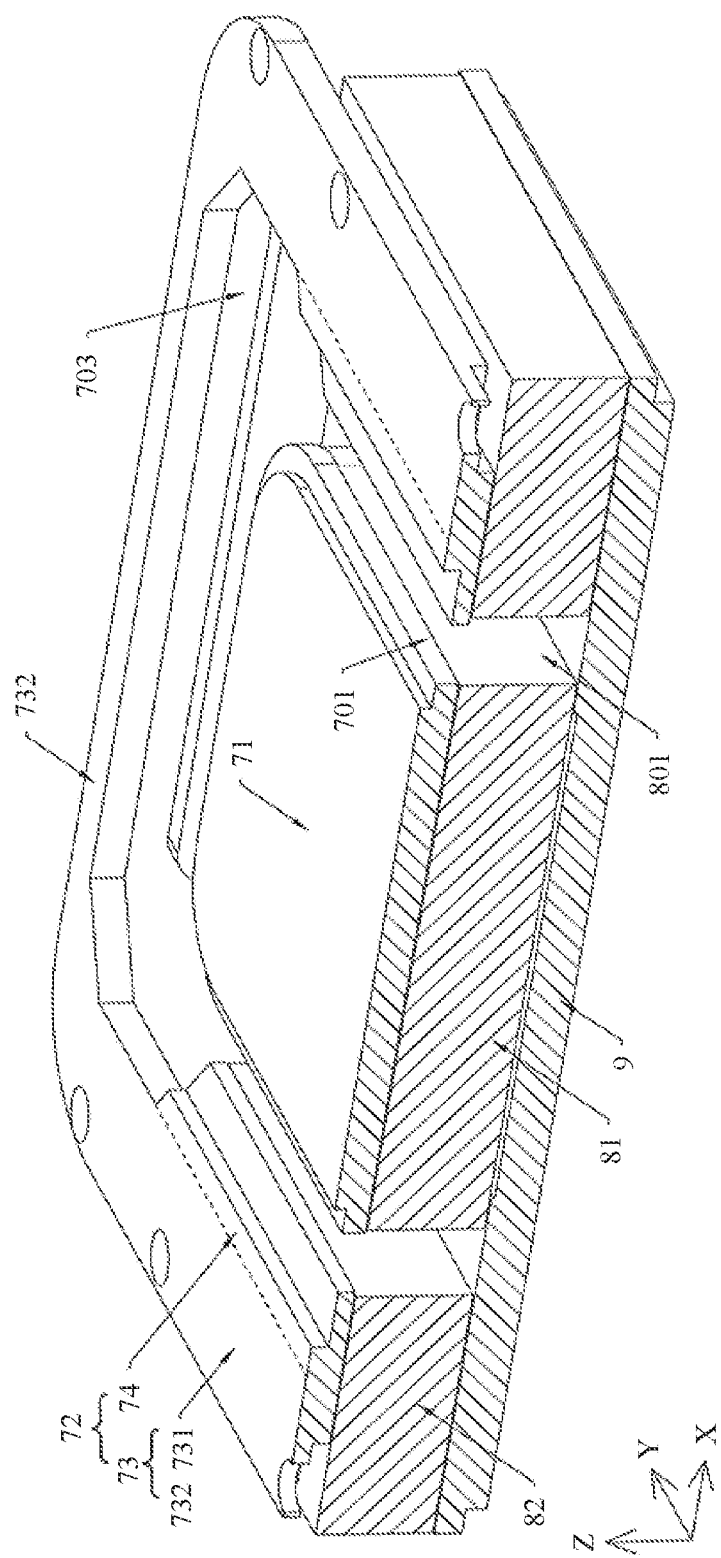
FIG. 32 is a schematic diagram of a structure obtained after the magnetic circuit component shown in FIG. 27 is sectioned along H-H.
Figure 33:
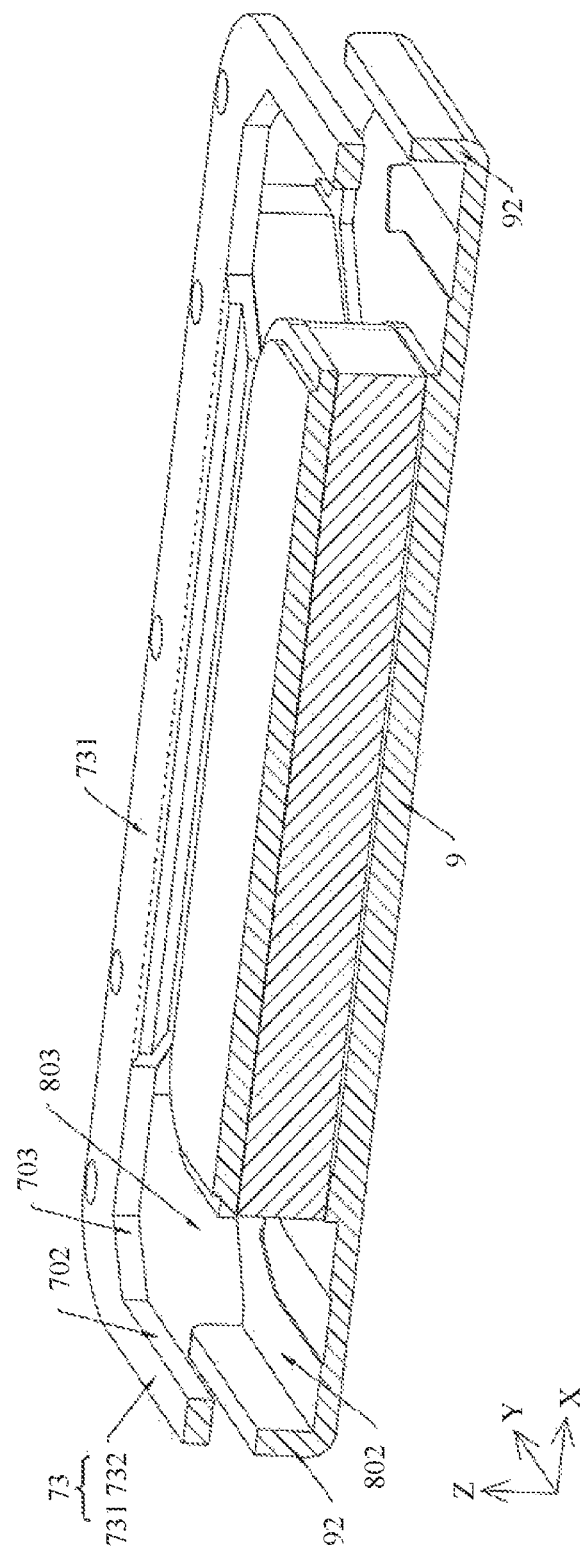
FIG. 33 is a schematic diagram of a structure obtained after the magnetic circuit component shown in FIG. 27 is sectioned along I-I.

Refer to FIG. 32 and FIG. 33. FIG. 32 is a schematic diagram of a structure obtained after the magnetic circuit component 10c shown in FIG. 27 is sectioned along H-H. FIG. 33 is a schematic diagram of a structure obtained after the magnetic circuit component 10c shown in FIG. 27 is sectioned along I-I.

The central electrode plate 71 is fastened on a side that is of the central magnet 81 and that is away from the lower electrode plate 9. Specifically, the central electrode plate 71 is fastened to a top surface (not shown in the figure) of the central magnet 81. A bottom surface (not shown in the figure) of the central electrode plate 71 is in contact with the top surface of the central magnet 81. For example, the central electrode plate 71 and the central magnet 81 may be fastened to each other through bonding.

The side electrode plate 72 is fastened on a side that is of the first side magnet 82 and that is away from the lower electrode plate 9, and is disposed around the central electrode plate 71. The two first straight edges 731 of the connection frame part 73 respectively directly face the two first side magnets 82, and the two first electrode plate parts 74 also respectively directly face the two first side magnets 82. Specifically, both the first straight edge 731 of the connection frame part 73 and the first electrode plate part 74 are fastened to a top surface of the first side magnet 82. For example, the first straight edge 731 of the connection frame part 73 and the first electrode plate part 74 may be fastened to the first side magnet 82 through bonding. A second gap 701 is formed between the first electrode plate part 74 and the central electrode plate 71, and the second gap 701 is connected to the first gap 801. In addition, the second gap 701 is further connected to the corner gap 703 of the side electrode plate 72.

In addition, the connection frame part 73 partially directly faces the two mounting parts 9 of the lower electrode plate 9. Specifically, the two second straight edges 732 of the connection frame part 73 respectively directly face the two mounting parts 92 of the lower electrode plate 9. The second straight edge 732 of the connection frame part 73 and the mounting part 92 of the lower electrode plate 9 are disposed at intervals, and a fourth gap 702 is formed between the second straight edge 732 of the connection frame part 73 and the central electrode plate 71. The fourth gap 702 is connected to the third gap 802, and is connected to the second gap 701. In this case, the fourth gap 702 is further connected to the corner gap 703 of the side electrode plate 72, and the four corner gaps 703 of the side electrode plate 72 are further respectively connected to the four connection gaps 803.

The following describes a specific location relationship and connection relationship between the basket 1 and parts of the vibration component 10b and the magnetic circuit component 10c of the electroacoustic transducer 10. It may be understood that all parts of the electroacoustic transducer 10 can be arranged as compactly as possible when a requirement of a relative location relationship is met to meet a performance requirement of the electroacoustic transducer 10, to implement miniaturization and portability of the electroacoustic transducer 10.

Figure 34:
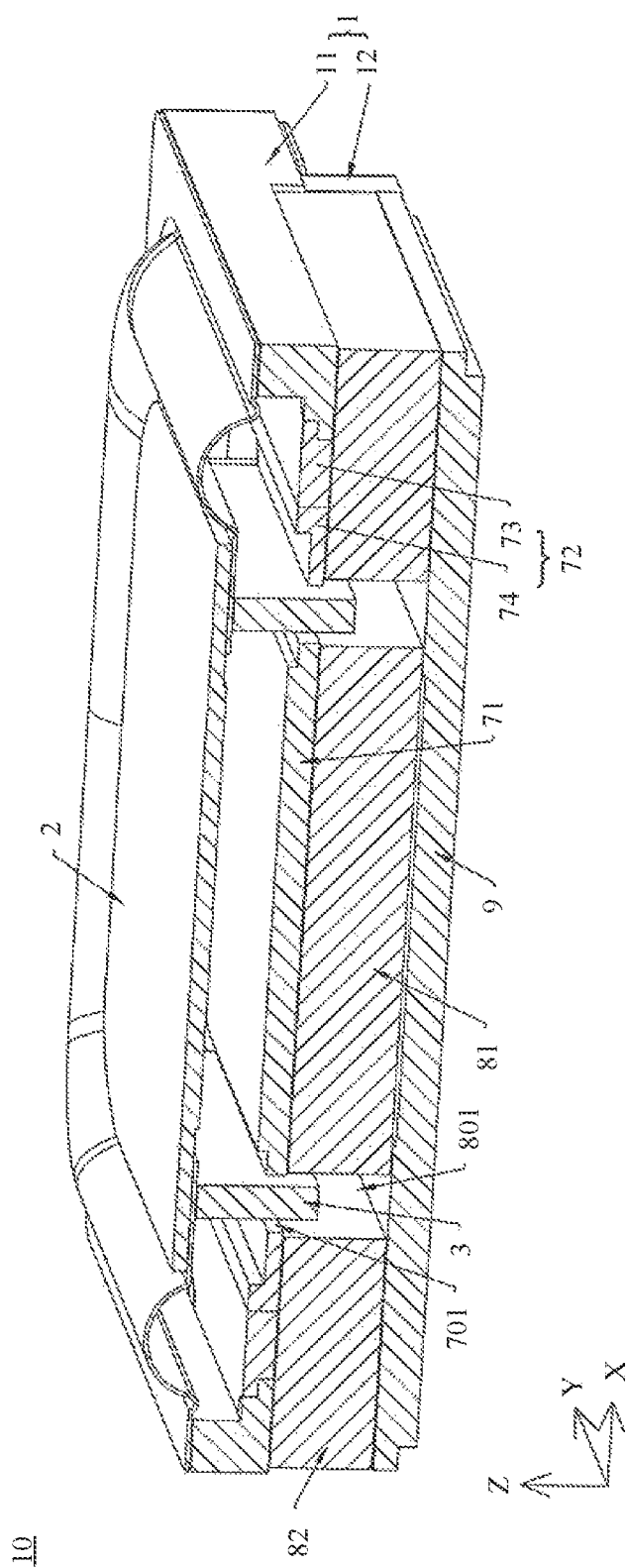
FIG. 34 is a schematic diagram of a structure obtained after the electroacoustic transducer shown in FIG. 7 is sectioned along J-J.
Figure 35:
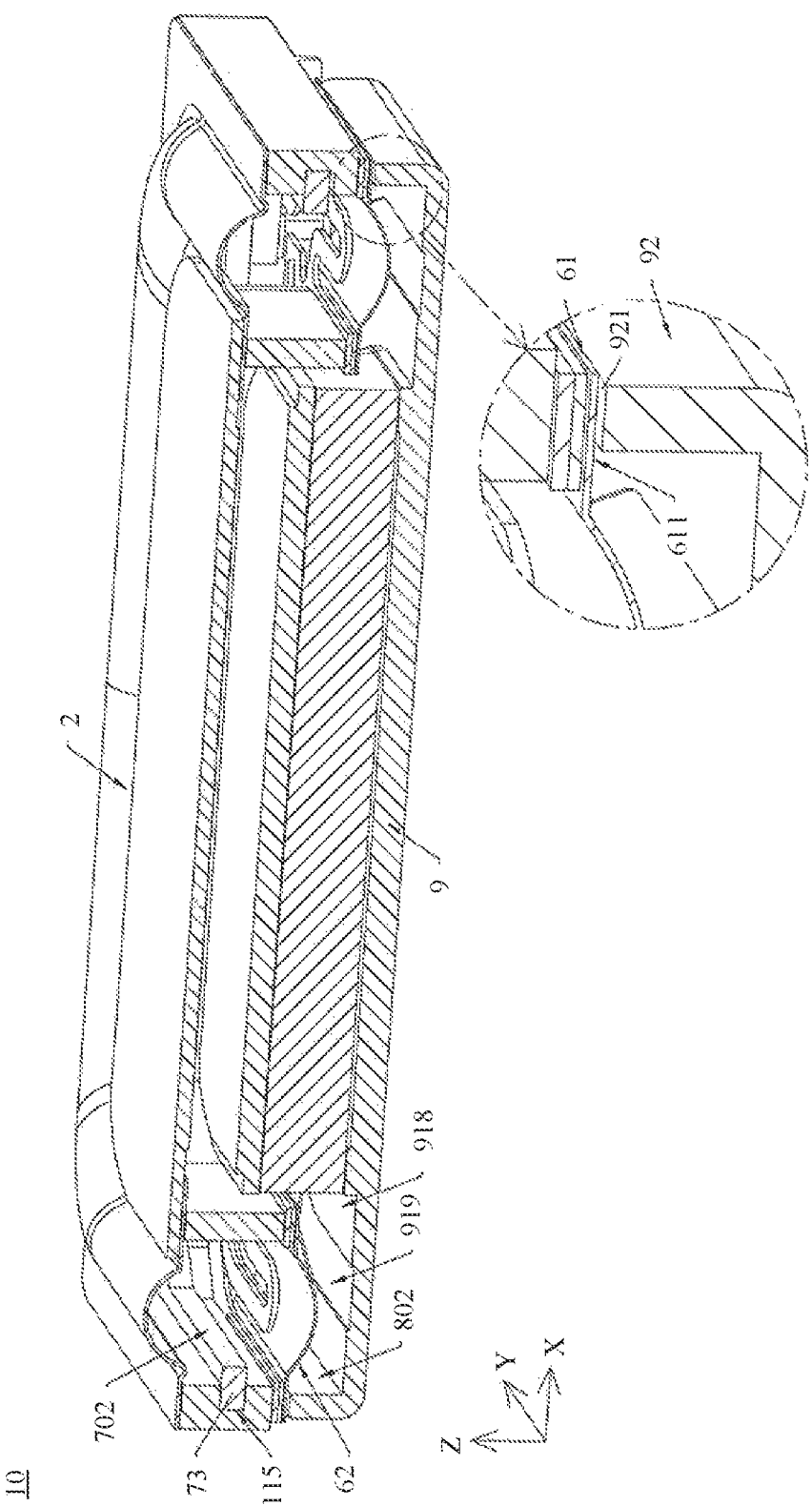
FIG. 35 is a schematic diagram of a structure obtained after the electroacoustic transducer shown in FIG. 7 is sectioned along K-K.

Refer to FIG. 34 and FIG. 35. FIG. 34 is a schematic diagram of a structure obtained after the electroacoustic transducer 10 shown in FIG. 7 is sectioned along J-J. FIG. 35 is a schematic diagram of a structure obtained after the electroacoustic transducer 10 shown in FIG. 7 is sectioned along K-K.

The lower electrode plate 9 is located on the side that is of the framework 11 of the basket 1 and that is away from the voice membrane 2, and is spaced apart from the framework 11 of the basket 1. Specifically, the lower electrode plate 9 is fastened to the plurality of feet 12 of the basket 1, and the two mounting parts 92 of the lower electrode plate 9 are located between the lower electrode plate 9 and the framework 11 of the basket 1. Free ends of the plurality of feet 12 of the basket 1 may be accommodated in the clamping space 906 (as shown in FIG. 29) of the lower electrode plate 9, and the free end and an inner wall of the clamping space 906 may be fastened to each other through bonding.

Both the central magnet 81 and the two first side magnets 82 are fastened on a side that is of the lower electrode plate 9 and that faces the framework 11. The two first side magnets 82 are located on two sides of the central magnet 81. The central electrode plate 71 is fastened on a side that is of the central magnet 81 and that faces the voice membrane 2, and is located between the central magnet 81 and the voice membrane 2.

The side electrode plate 72 is fastened on an inner side of the framework 11, and is spaced apart from the flexible circuit board 4. Specifically, the connection frame part 73 of the side electrode plate 72 is snapped into the fastening groove 115 of the framework 11, and the two first electrode plate parts 74 are located outside the fastening groove 115, and are respectively located on two sides of the central electrode plate 71. The connection frame part 73 is partially located in the fastening groove 115, and the connection frame part 73 is partially located outside the fastening groove 115.

In addition, the limiting block 13 (as shown in FIG. 9) of the framework 11 of the basket 1 is snapped into the first limiting hole 734 (as shown in FIG. 31) of the connection frame part 73, and the limiting feet 14 (as shown in FIG. 9) of the framework 11 are snapped into the second limiting holes 735 (as shown in FIG. 31) of the connection frame part 73 one by one. The first portion of the limiting block 13 is snapped into a first portion of the first limiting hole 734, and the second portion of the limiting block 13 is snapped into a second portion of the first limiting hole 734. In this case, the limiting block 13 and the first limiting hole 734 form a concave-convex fitting structure, so that the framework 11 of the basket 1 and the connection frame part 73 of the side electrode plate 72 are fixed relative to each other.

In the electroacoustic transducer 10 shown in this embodiment, the plurality of feet 12 provide a support between the framework 11 and the lower electrode plate 9, and the plurality of feet 12 can have support and connection functions, and occupy little space between the framework 11 and the lower electrode plate 9, so that large magnetic circuit arrangement space can be formed between the framework 11 and the lower electrode plate 9, and the magnetic circuit component 10c can fully use the space for magnet arrangement, and therefore the electroacoustic transducer 10 has high magnetic induction intensity and high sensitivity.

An end that is of the voice coil 3 and that is away from the voice membrane 2 is partially located in the first gap 801, the third gap 802, and the connection gap 803, and is partially located in the second gap 701, the fourth gap 702, and the corner gap 703. In other words, a portion at the end that is of the voice coil 3 and that is away from the voice membrane 2 is located in the magnetic field provided by the magnetic circuit component 10c. When the voice coil 3 receives an audio signal transmitted by the flexible circuit board 4, the voice coil 3 moves up and down in the Z-axis direction to cut a magnetic line of the magnetic field, and drives the voice membrane 2, the flexible circuit board 4, the gasket 5, and the auxiliary diaphragm 6 to vibrate.

In addition, the two flexible circuit boards 4, the two first gaskets 5, and the two auxiliary diaphragms 6 are symmetrically distributed on two sides of the central magnet 81, and the two auxiliary diaphragms 6 are respectively fastened to the two mounting parts 92 of the lower electrode plate 9. Specifically, the first fastening parts 61 of the two auxiliary diaphragms 6 are respectively fastened to the two mounting parts 92 of the lower electrode plate 9. A bottom surface 612 of the first fastening part 61 of the auxiliary diaphragm 6 is in contact with the top surface 921 of the mounting part 92 of the lower electrode plate 9. For example, the first fastening part 61 of the auxiliary diaphragm 6 and the mounting part 92 of the lower electrode plate 9 are fastened to each other through bonding.

The vibration part 62 of the auxiliary diaphragm 6 is located in the third gap 802 and the fourth gap 702, and directly faces the avoidance groove 908 and the auxiliary groove 909. Because the avoidance groove 908 and the auxiliary groove 909 exist, a distance between the vibration part 62 of the auxiliary diaphragm 6 and the lower electrode plate 9 in the Z-axis direction is increased, to avoid a problem that vibration interference occurs between the auxiliary diaphragm 6 and the lower electrode plate 9 when the auxiliary diaphragm 6 vibrates with the voice coil 3, so that amplitude of the electroacoustic transducer 10 is increased, and low-frequency sensitivity and loudness of the electroacoustic transducer 10 are improved.

Refer to FIG. 1 and FIG. 2. An embodiment of this application further provides the second electronic device 1000. The electronic device 1000 includes a housing 100, a display module 200, a receiver 300, a camera module 400, a speaker module 500, a first circuit board 600, a second circuit board 700, and a battery 800. The display module 200 is fastened to the housing 100, and the receiver 300, the camera module 400, the speaker module 500, the first circuit board 600, the second circuit board 700, and the battery 800 are all accommodated in the housing 100.

The speaker module 500 includes an electroacoustic transducer 10, a module upper-housing 20, a module lower-housing 30, and a circuit board 40. The module upper-housing 20 and the module lower-housing 30 are fastened to each other to form a sound box. The electroacoustic transducer 10 is located inside the sound box. One end of the circuit board 40 is located inside the sound box to electrically connect to the electroacoustic transducer 10, and the other end is located outside the sound box to electrically connect to external components of the electroacoustic transducer 10 and the speaker module 500. The electroacoustic transducer 10 is configured to convert an electrical signal into a sound signal as a speaker core of the speaker module 500.

Next, a structure of the electroacoustic transducer 10 of the speaker module 500 in the second electronic device 1000 provided in this embodiment of this application is described. Another structure of the electronic device 1000 shown in this embodiment is basically the same as another structure of the foregoing first electronic device 1000. To avoid repetition, details are not described herein again.

Figure 36:
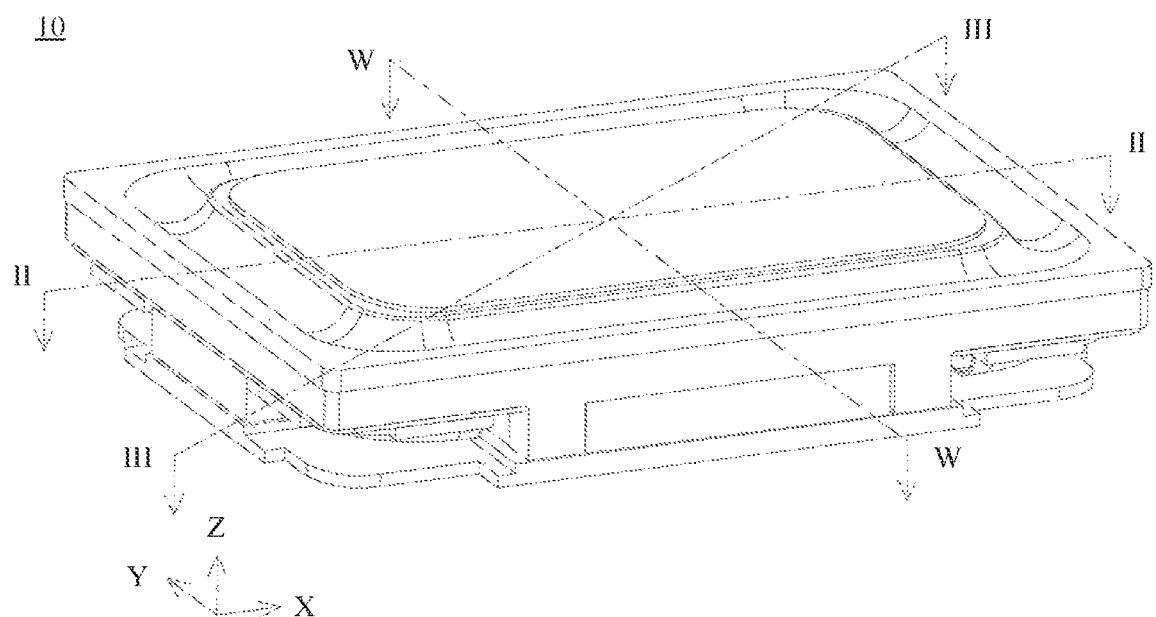
FIG. 36 is a schematic diagram of a structure of an electroacoustic transducer of a speaker module in the second electronic device according to an embodiment of this application.
Figure 37:
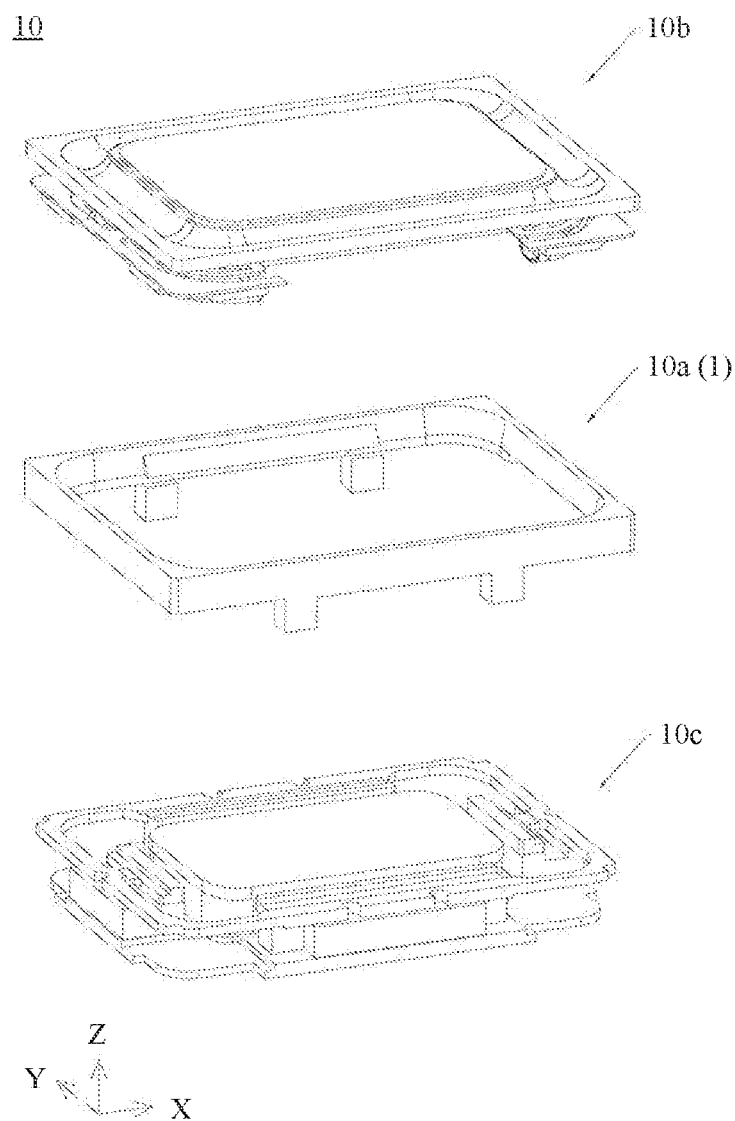
FIG. 37 is a schematic diagram of an exploded structure of the electroacoustic transducer shown in FIG. 36.

Refer to FIG. 36 and FIG. 37. FIG. 36 is a schematic diagram of a structure of the electroacoustic transducer 10 of the speaker module 500 in the second electronic device 1000 according to an embodiment of this application. FIG. 37 is a schematic diagram of an exploded structure of the electroacoustic transducer 10 shown in FIG. 36. In this embodiment of this application, an X-axis direction is shown as a length direction of the electroacoustic transducer 10, a Y-axis direction is shown as a width direction of the electroacoustic transducer 10, a Z-axis direction is shown as a thickness direction of the electroacoustic transducer 10, and the X-axis direction, the Y-axis direction, and the Z-axis direction are perpendicular to each other.

In this embodiment of this application, a plurality of parts of the electroacoustic transducer 10 are symmetrically disposed. That two parts are symmetrically disposed means that there is an axisymmetric relationship between the two parts with respect to a reference plane, allowing a slight deviation caused by a manufacturing tolerance, an assembly tolerance, or the like. Some parts may be symmetrical with respect to a first reference plane, some parts may be symmetrical with respect to a second reference plane, and the second reference plane intersects the first reference plane. For example, as shown in FIG. 36, the first reference plane may pass through a W-W line and be parallel to a YZ plane, and the YZ plane is a plane on which the width direction Y of the electroacoustic transducer 10 and the thickness direction Z of the electroacoustic transducer 10 are located. The second reference plane may pass through an II-II line and be parallel to an XZ plane, and the XZ plane is a plane on which the length direction X of the electroacoustic transducer 10 and the thickness direction Z of the electroacoustic transducer 10 are located.

The electroacoustic transducer 10 includes a support component 10a, a vibration component 10b, and a magnetic circuit component 10c. The support component 10a includes a basket 1. The vibration component 10b and the magnetic circuit component 10c are mounted in the basket 1. A portion that is of parts of the vibration component 10b and that is fastened to the basket 1 remains still relative to the basket 1, and a remaining portion may vibrate relative to the basket 1. The magnetic circuit component 10c is fixed relative to the basket 1, and the magnetic circuit component 10c is configured to provide a driving magnetic field for the vibration component 10b.

Figure 38:
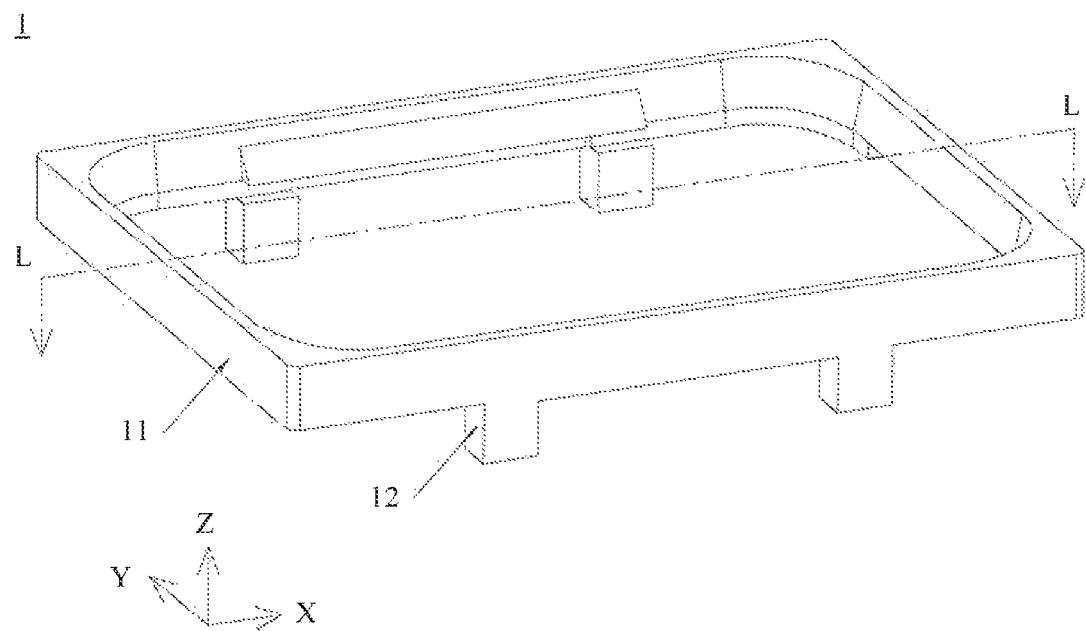
FIG. 38 is a schematic diagram of a structure of a basket in the electroacoustic transducer shown in FIG. 37.
Figure 39:
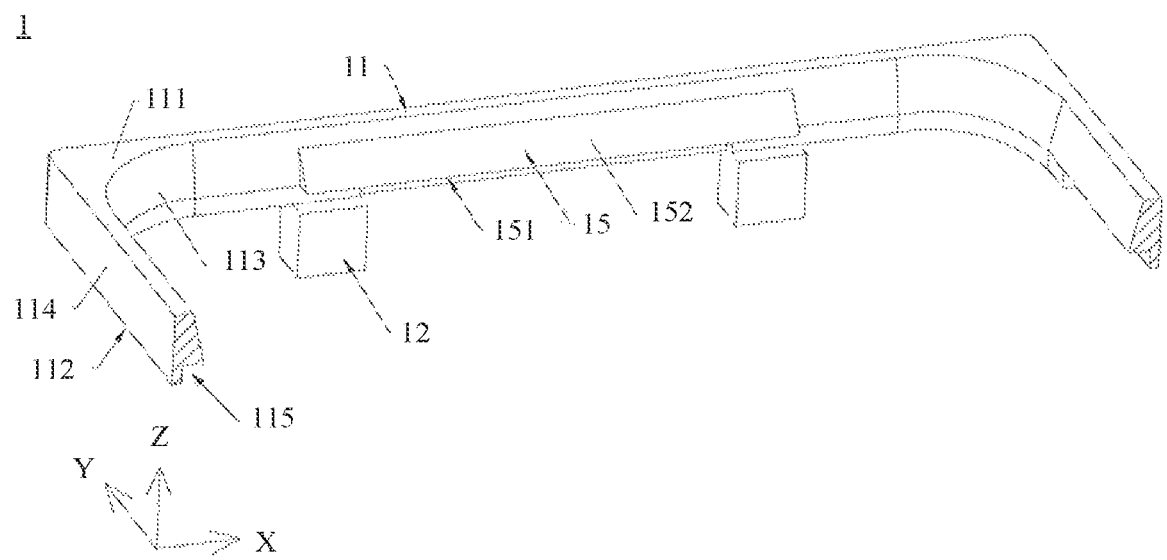
FIG. 39 is a schematic diagram of a structure obtained after the basket shown in FIG. 38 is sectioned along L-L.

Refer to FIG. 38 and FIG. 39. FIG. 38 is a schematic diagram of a structure of the basket 1 in the electroacoustic transducer 10 shown in FIG. 37. FIG. 39 is a schematic diagram of a structure obtained after the basket 1 shown in FIG. 38 is sectioned along L-L.

The basket 1 includes a framework 11 and a plurality of feet 12. The framework 11 is approximately a rectangular framework. The framework 11 includes a top surface 111 and a bottom surface 112 that are opposite to each other, and the plurality of feet 12 are fastened to the bottom surface 112 at intervals. There are four feet 12, and every two of the four feet 12 are symmetrically fastened to two side edges of the framework 11. The four feet 12 may be symmetrical with respect to the first reference plane, or may be symmetrical with respect to the second reference plane. In some other embodiments, there may be two, three, or at least five feet 12.

The framework 11 further includes an inner side surface 113 and an outer side surface 114 that are disposed opposite to each other, and the inner side surface 113 and the outer side surface 114 are connected between the top surface 111 and the bottom surface 112. The inner side surface 113 is tilted relative to the outer side surface 114, and a spacing between the inner side surface 113 and the outer side surface 114 decreases in a direction approaching the top surface 111, so that inner space of the framework 11 can be of a bottom-narrow and top-wide shape. A fastening groove 115 is disposed in the framework 11, and an opening of the fastening groove 115 is located on the inner side surface 113 of the framework 11. The fastening groove 115 is disposed around an inner side of the framework 11, and partially penetrates the bottom surface 112 of the framework 11. A recessed direction of the fastening groove 115 is a direction from the inner side surface 113 to the outer side surface 114 of the framework 11.

In addition, two limiting strips 15 are disposed in the basket 1, and the two limiting strips 15 are symmetrically fastened on inner sides of two side edges of the framework 11. The two limiting strips 15 are symmetrical with respect to the second reference plane. Specifically, the limiting strip 15 is fastened to the inner side surface 113 of the framework 11, and a bottom surface 151 of the limiting strip 15 and a sidewall (not shown in the figure) of the fastening groove 115 are disposed on a same plane. The limiting strip 15 includes a side surface 152 connecting the bottom surface 151 of the limiting strip 15 and the sidewall of the fastening groove 115, and the side surface 152 of the limiting strip 15 is tilted relative to the inner side surface 113 of the framework 11.

For example, the framework 11, the feet 12, and the limiting strip 15 are integrally formed, in other words, the basket 1 is of an integral structure. In some other embodiments, structures of portions of the basket 1 may form an integral structure through assembling (for example, bonding or clamping).

It may be understood that the basket 1 of the electroacoustic transducer 10 is configured to fasten and support another part of the electroacoustic transducer 10. When this requirement is met, the basket 1 may be alternatively of another design shape. This embodiment does not constitute a limitation.

Figure 40:
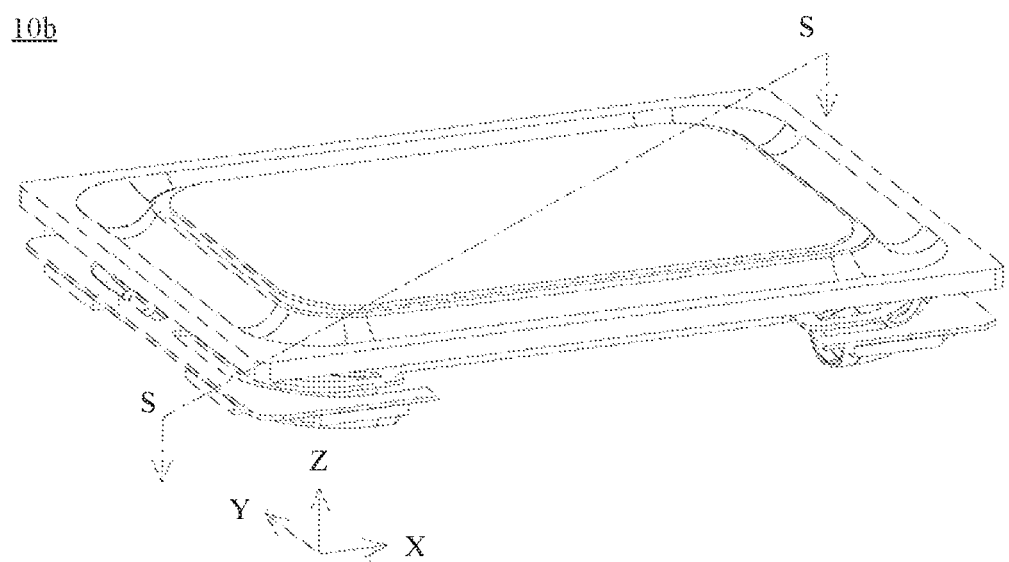
FIG. 40 is a schematic diagram of a structure of a vibration component in the electroacoustic transducer shown in FIG. 37.
Figure 41:
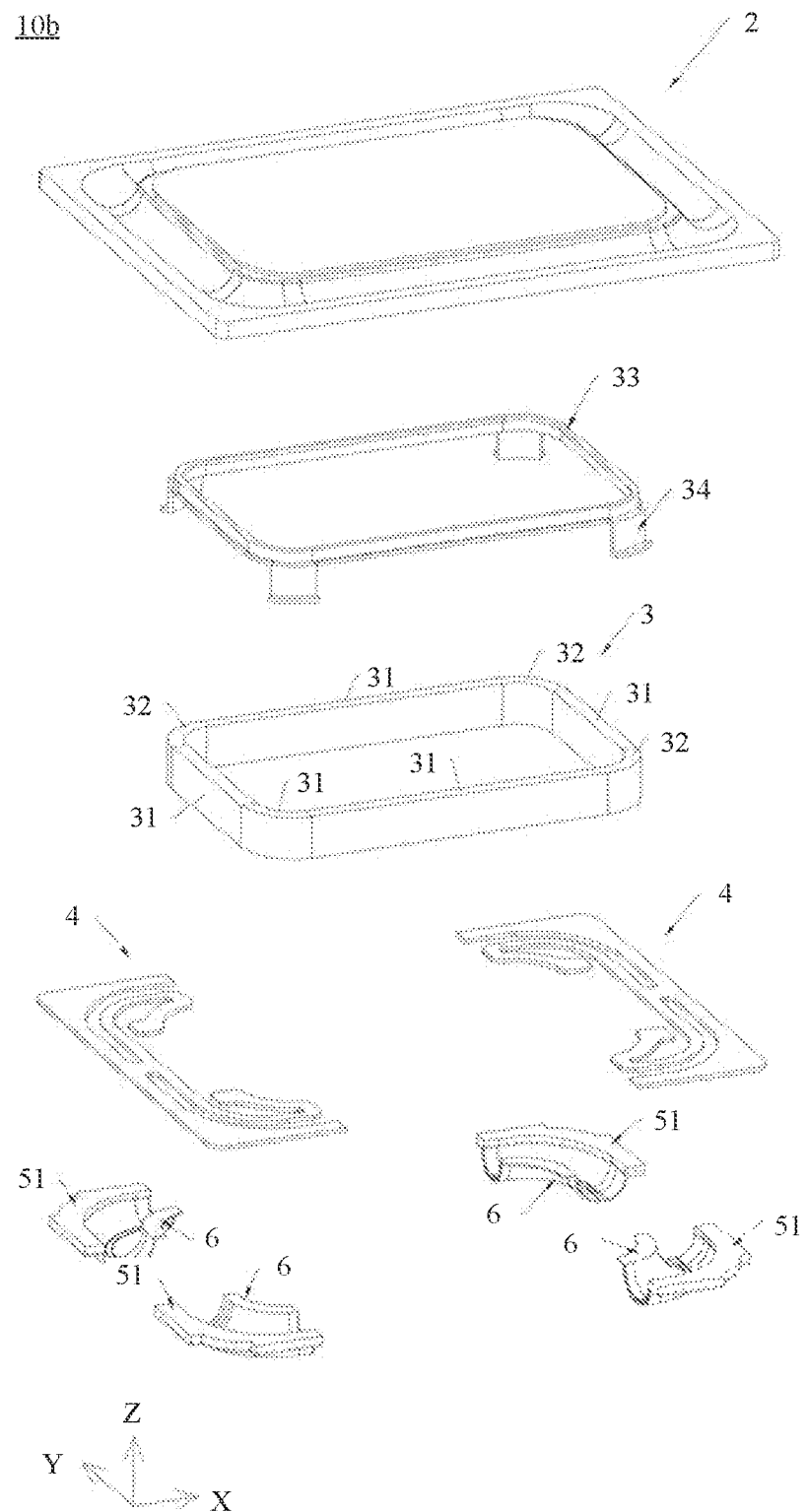
FIG. 41 is a schematic diagram of an exploded structure of the vibration component shown in FIG. 40.

Refer to FIG. 40 and FIG. 41. FIG. 40 is a schematic diagram of a structure of the vibration component 10b in the electroacoustic transducer 10 shown in FIG. 37. FIG. 41 is a schematic diagram of an exploded structure of the vibration component 10b shown in FIG. 40.

The vibration component 10b includes a voice membrane 2, a voice coil 3, a voice coil bobbin 33, four auxiliary bobbins 34, two flexible circuit boards 4, two first gaskets 51, and four auxiliary diaphragms 6. The magnetic circuit component 10c provides a magnetic field that drives the voice coil 3 to vibrate. When the voice coil 3 is inserted into the magnetic circuit component 10c, and a current is applied, the voice coil 3 drives the voice membrane 2, the voice coil bobbin 33, the four auxiliary bobbins 34, the two flexible circuit boards 4, the two first gaskets 51, and the four auxiliary diaphragms 6 to vibrate.

In this embodiment, the voice coil 3 is in a shape of a rounded rectangle. The voice coil 3 includes four straight edges 31 and four rounded corners 32, and each rounded corner 32 is connected between two straight edges 31. It should be understood that, in this application, a length relationship between the four straight edges 31 of the voice coil 3 is not strictly limited, and a length of one straight edge 31 may be greater than, equal to, or less than a length of another adjacent straight edge 31. In other embodiments, the voice coil 3 may be in a shape of a right-angled rectangle or another shape. A specific shape of the voice coil 3 is not strictly limited in this application.

The four straight edges 31 of the voice coil 3 are a left straight edge 31 and a right straight edge 31 arranged in the X-axis direction and a front straight edge 31 and a rear straight edge 31 arranged in the Y-axis direction. The four rounded corners 32 of the voice coil 3 are two left rounded corners 32 connected to two ends of the left straight edge 31 and two right rounded corners 32 connected to two ends of the right straight edge 31.

It should be noted that azimuth words such as "left", "right", "front", and "rear" used when the electroacoustic transducer 10 is described in this embodiment of this application are mainly described based on a display azimuth of the electroacoustic transducer 10 in FIG. 36. A positive direction of an X-axis is right, a negative direction of the X-axis is left, a positive direction of a Y-axis is rear, and a negative direction of the Y-axis is front. This does not constitute a limitation on an azimuth of the electroacoustic transducer 10 in an actual application scenario.

Figure 42:
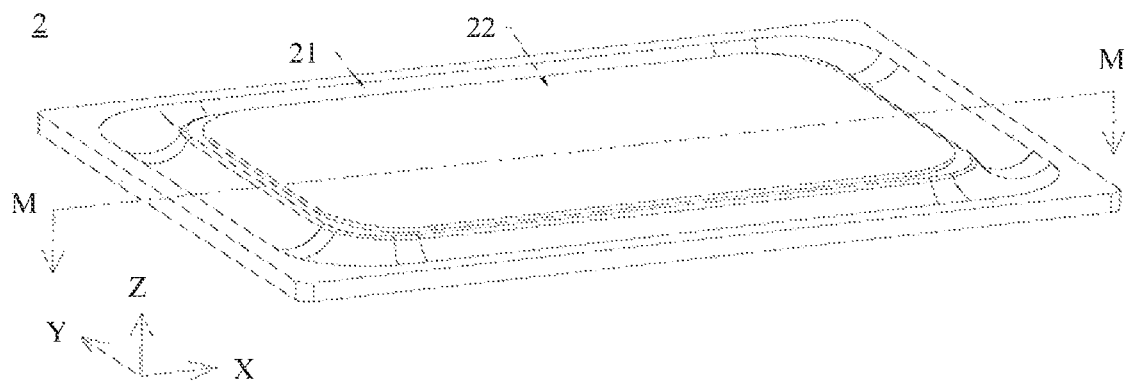
FIG. 42 is a schematic diagram of a structure of a voice membrane in the vibration component shown in FIG. 41.
Figure 43:
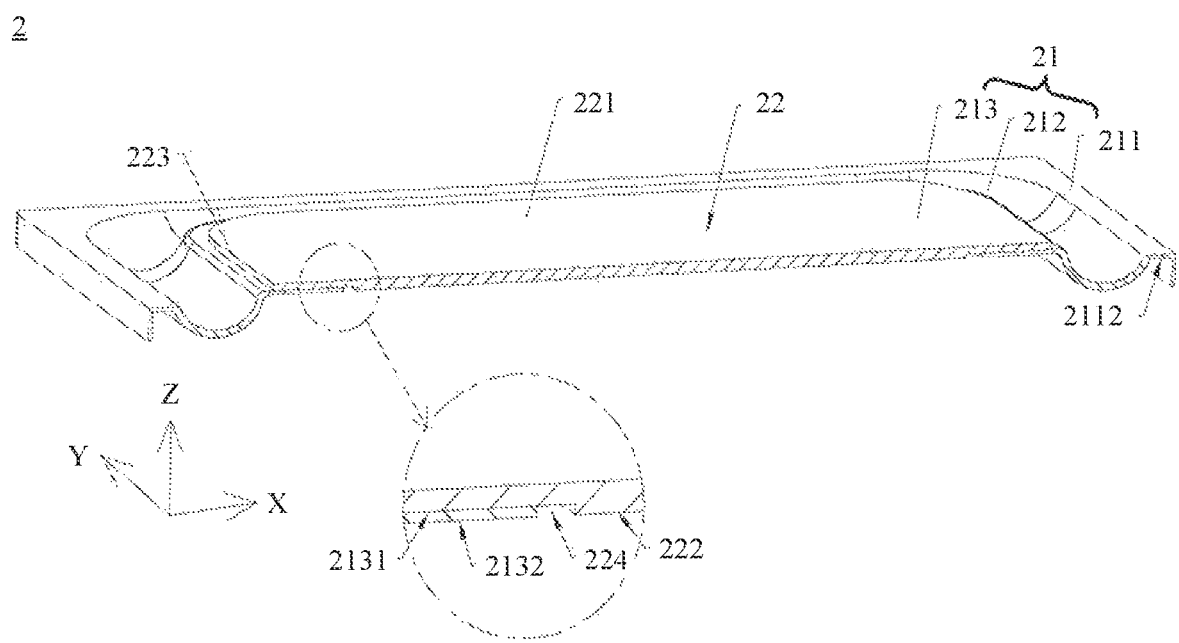
FIG. 43 is a schematic diagram of a structure obtained after the voice membrane shown in FIG. 42 is sectioned along M-M.

Refer to FIG. 42 and FIG. 43. FIG. 42 is a schematic diagram of a structure of the voice membrane 2 in the vibration component 10b shown in FIG. 41. FIG. 43 is a schematic diagram of a structure obtained after the voice membrane 2 shown in FIG. 42 is sectioned along M-M.

The voice membrane 2 includes a diaphragm 21 and a dome 22. The dome 22 is in a shape of a rectangular plate. The dome 22 includes a top surface 221 and a bottom surface 222 that are disposed opposite to each other and a peripheral surface 223 connected between the top surface 221 and the bottom surface 222. A limiting groove 224 is disposed on the dome 22, and an opening of the limiting groove 224 is located in a peripheral region of the bottom surface 222 of the dome 22. A recessed direction of the limiting groove 224 is a direction from the bottom surface 222 to the top surface 221 of the dome 22. In addition, the limiting groove 224 further penetrates the peripheral surface 223 of the dome 22.

The diaphragm 21 is approximately in a shape of a rectangular ring. The diaphragm 21 includes a first fastening part 211, a vibration part 212, and a second fastening part 213 that are sequentially connected, the first fastening part 211 is located on an outer side of the vibration part 212, and the second fastening part 213 is located on an inner side of the vibration part 212. A cross-sectional shape of the vibration part 212 of the diaphragm 21 is an arc shape or an approximate arc shape, and an extension track of the vibration part 212 is in a shape of a rounded rectangle. The vibration part 212 of the diaphragm 21 is concave, that is, the vibration part 212 is recessed away from a top surface 2112 of the first fastening part 211 and a top surface 2132 of the second fastening part 213 of the diaphragm 21. When the vibration part 212 of the diaphragm 21 is subjected to an external force, the vibration part 212 can be deformed, so that both the first fastening part 211 and the dome 22 can move relative to the second fastening part 213. In some other embodiments, the vibration part 212 of the diaphragm 21 may be convex, that is, the vibration part 212 protrudes in a direction away from a bottom surface 2112 of the first fastening part 211 and a bottom surface 2132 of the second fastening part 213 of the diaphragm 21.

A portion of the second fastening part 213 of the diaphragm 21 is accommodated in the limiting groove 224 of the dome 22, and is fastened to the dome 22. The top surface 2131 of the second fastening part 213 of the diaphragm 21 is in contact with a bottom wall (not shown in the figure) of the limiting groove 224 of the dome 22. For example, the second fastening part 213 of the diaphragm 21 and the dome 22 are fastened to each other through bonding. The bottom surface 2132 of the second fastening part 213 of the diaphragm 21 is flush with the bottom surface 222 of the dome 22.

Figure 44:
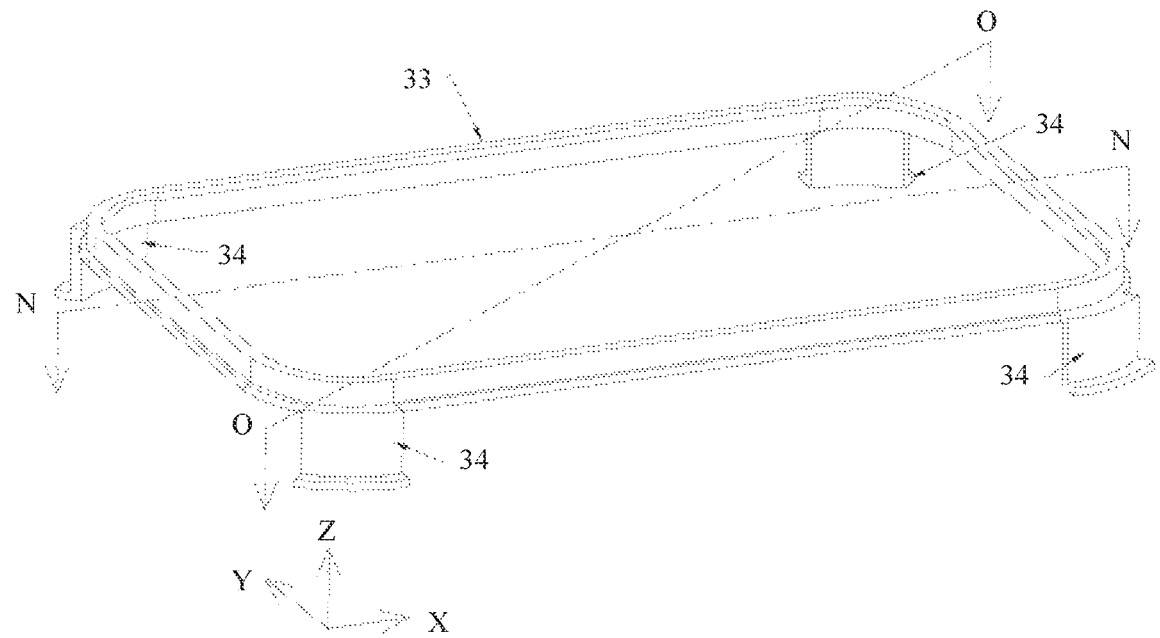
FIG. 44 is a schematic diagram of an assembly structure of a voice coil bobbin and an auxiliary bobbin in the vibration component shown in FIG. 41.
Figure 45:
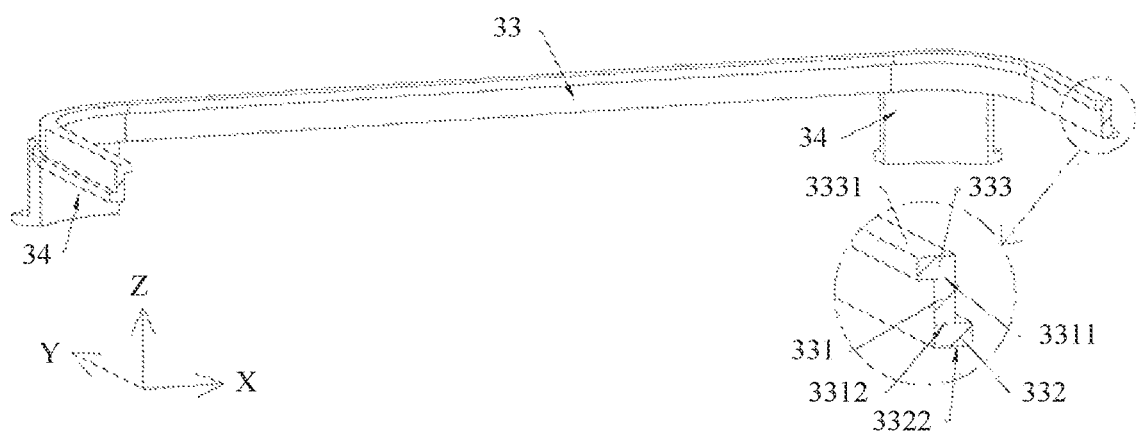
FIG. 45 is a schematic diagram of a structure obtained after the structure shown in FIG. 44 is sectioned along N-N.

Refer to FIG. 44 and FIG. 45. FIG. 44 is a schematic diagram of an assembly structure of the voice coil bobbin 33 and the four auxiliary bobbins 34 in the vibration component 10b shown in FIG. 41. FIG. 45 is a schematic diagram of a structure obtained after the structure shown in FIG. 44 is sectioned along N-N.

An extension track of the voice coil bobbin 33 is in a shape of a rounded rectangle. A structure of the voice coil bobbin 33 matches a structure of the voice coil 3. In this embodiment, a cross-sectional shape of the voice coil bobbin 33 is approximately a shape of "Z". The voice coil bobbin 33 includes a body part 331, an epitaxial part 332, and an endotaxial part 333. The body part 331, the epitaxial part 332, and the endotaxial part 333 may be integrally formed. The epitaxial part 332 is connected to a bottom surface 3312 of the body part 331, and extends toward an outer side of the body part 331. An area of a bottom surface 3322 of the epitaxial part 332 is greater than an area of the bottom surface 3312 of the body part 331, to increase a connection area between the voice coil bobbin 33 and another part. The endotaxial part 333 is connected to a top surface 3311 of the body part 331, and extends toward an inner side of the body part 331. An area of a top surface 3331 of the endotaxial part 333 is greater than an area of the top surface 3311 of the body part 331, to increase a connection area between the voice coil bobbin 33 and another part. It may be understood that areas of end surfaces (namely, the bottom surface 3322 of the epitaxial part 332 and the top surface 3331 of the endotaxial part 333) of two ends of the voice coil bobbin 33 are large, so that a connection area between the voice coil bobbin 33 and an external structure is large, and a connection relationship is more stable.

In some other embodiments, the cross-sectional shape of the voice coil bobbin 33 may be a shape of "1", a shape of "L", a shape of inverted "L", a shape of "T", a shape of inverted "T", a shape of "[", or the like. The cross-sectional shape of the voice coil bobbin 33 is not strictly limited in this application.

Figure 46:
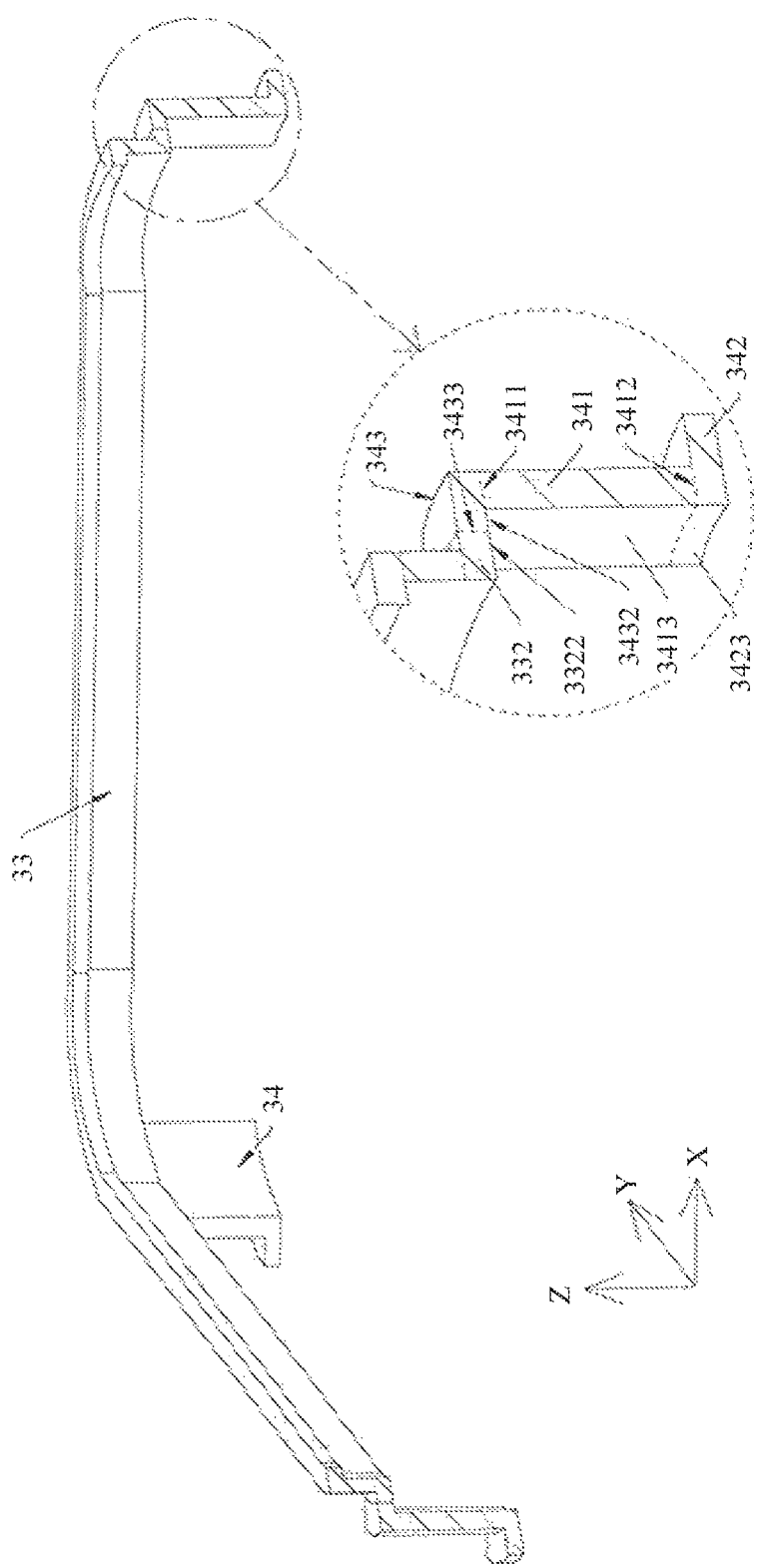
FIG. 46 is a schematic diagram of a structure obtained after the structure shown in FIG. 44 is sectioned along O-O.

FIG. 46 is a schematic diagram of a structure obtained after the structure shown in FIG. 44 is sectioned along O-O.

The four auxiliary bobbins 34 are located on an outer side of the voice coil bobbin 33. In this embodiment, a cross-sectional shape of the auxiliary bobbin 34 is approximately a shape of "Z". The auxiliary bobbin 34 includes a body part 341, an epitaxial part 342, and an endotaxial part 343. The body part 341, the epitaxial part 342, and the endotaxial part 343 may be integrally formed. The epitaxial part 342 is connected to a bottom surface 3412 of the body part 341, and extends toward an outer side of the body part 341. An inner side surface 3423 of the epitaxial part 342 and an inner side surface 3413 of the body part 341 are located on a same plane. An area of a bottom surface 3422 of the epitaxial part 342 is greater than an area of the bottom surface 3412 of the body part 341, to increase a connection area between the voice coil bobbin 34 and another part, so that connection stability between the auxiliary bobbin 34 and the another part is improved. The endotaxial part 343 is connected to a top surface 3411 of the body part 341, and extends toward an inner side of the body part 341.

The four auxiliary bobbins 34 are spaced apart from each other, and are all fastened to the voice coil bobbin 33. Specifically, the four auxiliary bobbins 34 are respectively fastened to four corners of the voice coil bobbin 33. The endotaxial part 343 of the auxiliary bobbin 34 is connected to an outer side surface 3324 of the epitaxial part 332 of the voice coil bobbin 33. In this case, a bottom surface 3432 of the endotaxial part 343 of the auxiliary bobbin 34 and the bottom surface 3322 of the epitaxial part 332 of the voice coil bobbin 33 are located on a same plane, to increase a connection area between the voice coil bobbin 33, the auxiliary bobbin 34, and another part, so that connection stability between the voice coil bobbin 33, the auxiliary bobbin 34, and the another part is improved.

For example, the four auxiliary bobbins 34 are two left auxiliary bobbins 34 on the left of the voice coil bobbin 33 and two right auxiliary bobbins 34 on the right of the voice coil bobbin 33. The two left auxiliary bobbins 34 are arranged at intervals in the Y-axis direction, and the two right auxiliary bobbins 34 are arranged at intervals in the Y-axis direction.

In this embodiment, the four auxiliary bobbins 34 and the voice coil bobbin 33 are integrally formed to simplify a production process of the auxiliary bobbin 34 and the voice coil bobbin 33. In some other embodiments, the four auxiliary bobbins 34 and the voice coil bobbin 33 may be of an integral structure formed through assembling.

Figure 47:
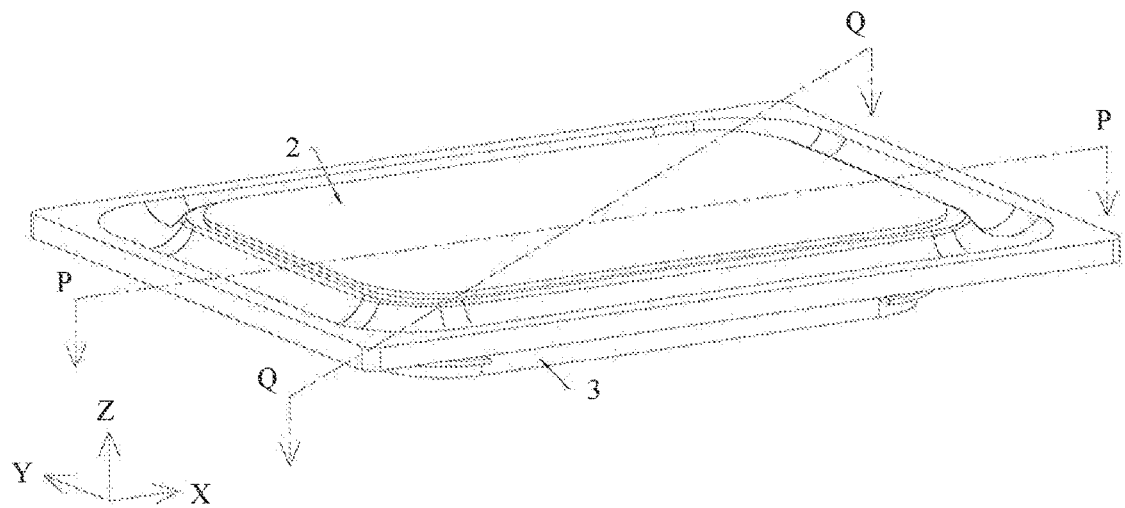
FIG. 47 is a schematic diagram of an assembly structure of a voice membrane, a voice coil, a voice coil bobbin, and four auxiliary bobbins in the vibration component shown in FIG. 41.
Figure 48:
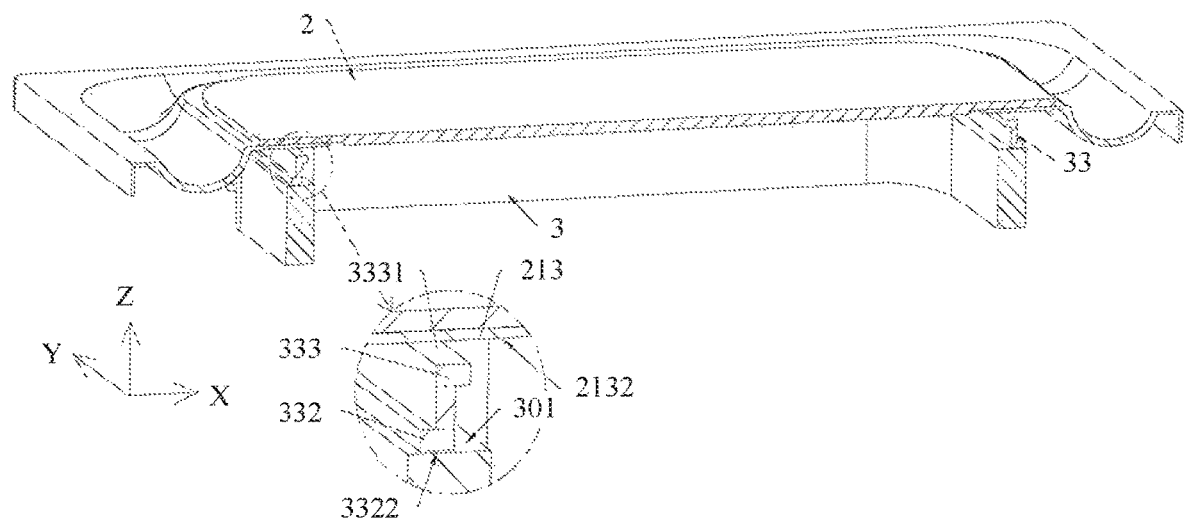
FIG. 48 is a schematic diagram of a structure obtained after the structure shown in FIG. 47 is sectioned along P-P.

Refer to FIG. 47 and FIG. 48. FIG. 47 is a schematic diagram of an assembly structure of the voice membrane 2, the voice coil 3, the voice coil bobbin 33, and the four auxiliary bobbins 34 in the vibration component 10b shown in FIG. 41. FIG. 48 is a schematic diagram of a structure obtained after the structure shown in FIG. 47 is sectioned along P-P.

The voice coil 3 is fastened to the voice membrane 2. Specifically, the voice coil 3 is indirectly connected to the voice membrane 2 by using the voice coil bobbin 33. The voice coil bobbin 33 is located between the voice coil 3 and the voice membrane 2, one end of the voice coil bobbin 33 is fastened to the voice coil 3, and the other end of the voice coil bobbin 33 is fastened to the voice membrane 2. The top surface 3331 of the endotaxial part 333 of the voice coil bobbin 33 is in contact with the bottom surface 2132 of the second fastening part 213 of the diaphragm 21, and the two may be fastened to each other through bonding. The bottom surface 3322 of the epitaxial part 332 of the voice coil bobbin 33 is in contact with a top surface 301 of the voice coil 3, and the two may be fastened to each other through bonding. The area of the bottom surface 3322 of the epitaxial part 332 of the voice coil bobbin 33 may be less than an area of the top surface 301 of the voice coil 3.

In this embodiment, the voice coil bobbin 33 isolates the voice coil 3 from the voice membrane 2, so that the voice membrane 2 is away from the voice coil 3. In addition, the voice coil bobbin 33 can dissipate heat of the voice coil 3 to reduce a risk of damage to the voice membrane 2 caused by overheating of the voice coil 3. In some other embodiments, the voice coil bobbin 33 is omitted from the electroacoustic transducer 10, and the voice coil 3 is directly connected to the voice membrane 2, to simplify a structure of the electroacoustic transducer 10.

Figure 49:
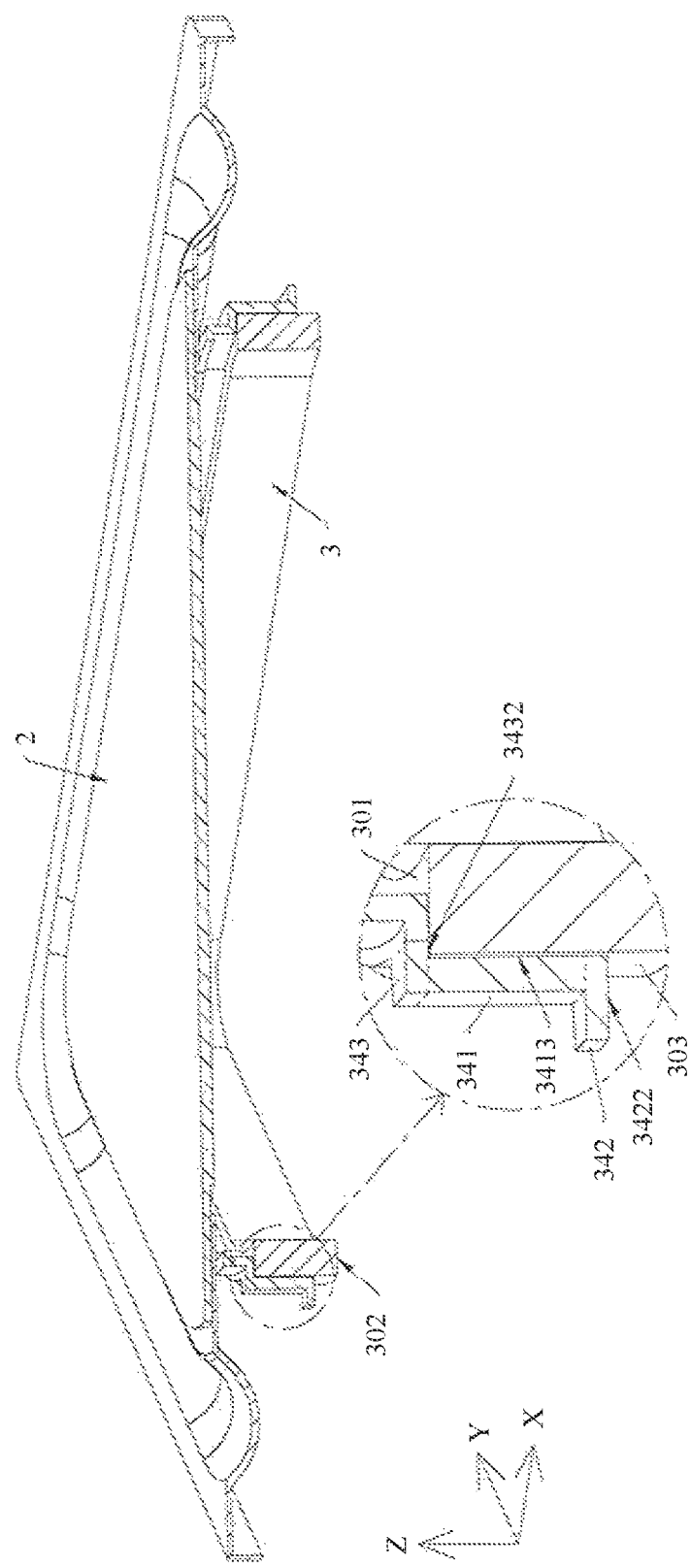
FIG. 49 is a schematic diagram of a structure obtained after the structure shown in FIG. 47 is sectioned along Q-Q.

FIG. 49 is a schematic diagram of a structure obtained after the structure shown in FIG. 47 is sectioned along Q-Q.

The auxiliary bobbin 34 is fastened to an outer side surface 303 of the voice coil 3. In this embodiment, the four auxiliary bobbins 34 are respectively fastened to the four rounded corners 32 of the voice coil 3. The two left auxiliary bobbins 34 are respectively fastened to the two left rounded corners 32 of the voice coil 3, and the two right auxiliary bobbins 34 are respectively fastened to the two right rounded corners 32 of the voice coil 3.

Specifically, the bottom surface 3432 of the endotaxial part 343 of the auxiliary bobbin 34 is in contact with the top surface 301 of the voice coil 3, the inner side surface 3413 of the body part 341 of the auxiliary bobbin 34 is in contact with the outer side surface 303 of the voice coil 3, and the auxiliary bobbin 34 and the voice coil 3 may be fastened to each other through bonding. In this case, the bottom surface 3422 (namely, a bottom surface of the auxiliary bobbin 34) of the epitaxial part 342 of the auxiliary bobbin 34 is located on a top side of the bottom surface 302 of the voice coil 3. In other words, the bottom surface 3422 of the auxiliary bobbin 34 is located on a side that is of the bottom surface 302 of the voice coil 3 and that faces the top surface 303 of the voice coil 3.

In some other embodiments, the bottom surface 3422 of the epitaxial part 342 of the auxiliary bobbin 34 may be located on a same plane as the bottom surface 302 of the voice coil 3, to increase a contact area between the auxiliary bobbin 34, the voice coil 3, and an external part, so that connection stability between the auxiliary bobbin 34, the voice coil 3, and the external part is improved.

Figure 50:
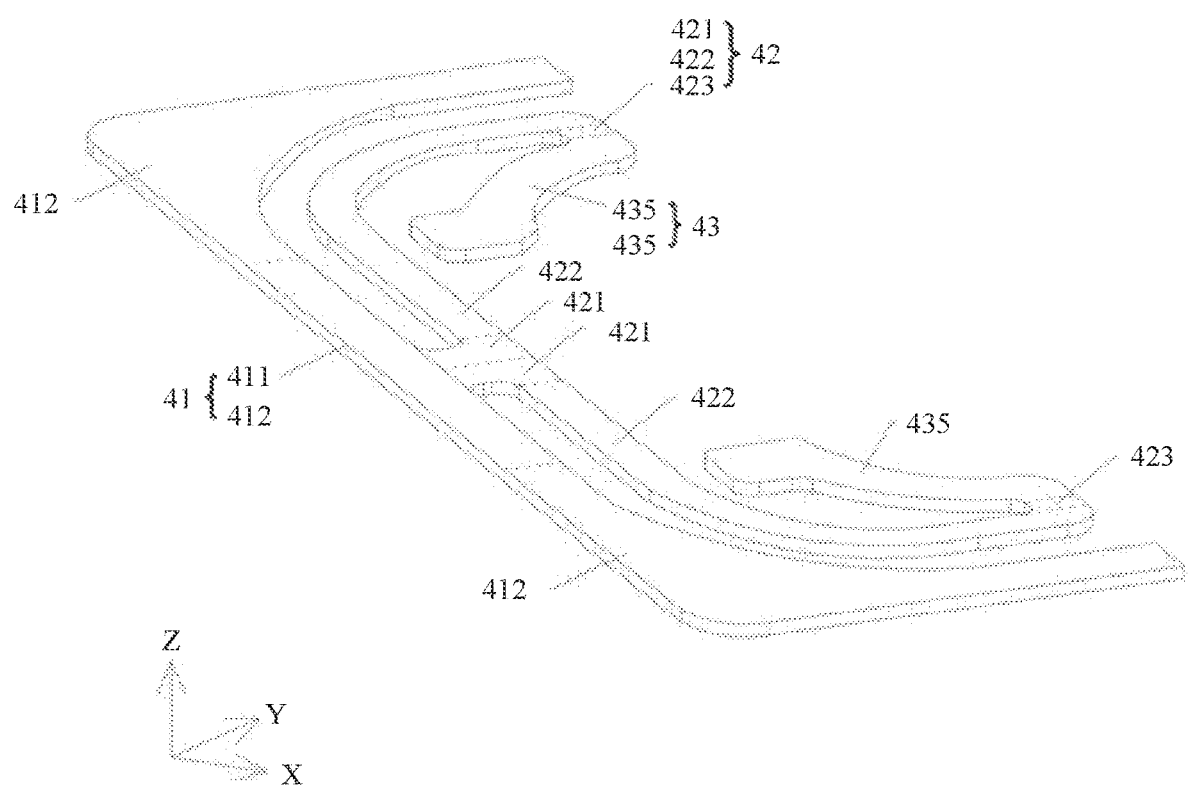
FIG. 50 is a schematic diagram of a structure of a flexible circuit board in the vibration component shown in FIG. 41.

Refer to FIG. 41 and FIG. 50. FIG. 50 is a schematic diagram of a structure of the flexible circuit board 4 in the vibration component 10b shown in FIG. 41.

The two flexible circuit boards 4 have a same structure. The flexible circuit board 4 includes a first fastening part 41, a second fastening part 43, and two connection stubs 42. The two connection stubs 42 are connected between the first fastening part 41 and the second fastening part 43, the first fastening part 41 is located on outer sides of the two connection stubs 42, and the second fastening part 43 is located on inner sides of the two connection stubs 42. The first fastening part 41 is a fixed portion of the flexible circuit board 4, the second fastening part 43 is a movable portion of the flexible circuit board 4, and the second fastening part 43 may move relative to the first fastening part 41, and drive the two connection stubs 42 to move relative to the first fastening part 41.

The first fastening part 41 is approximately in a shape of "[". The first fastening part 41 includes a middle part 411 and two end parts 412 that are respectively connected to two sides of the middle part 411. The second fastening part 43 is located on an inner side of the first fastening part 41, and is spaced apart from the first fastening part 41. The second fastening part 43 includes two fastening end parts 435, and the two fastening end parts 435 are spaced apart from each other. The two fastening end parts 435 are respectively spaced apart from the two end parts 412 of the first fastening part 411.

The two connection stubs 42 are located on the inner side of the first fastening part 41, and the two connection stubs 42 are spaced apart from each other. Each connection stub 42 includes a head end 421, a tail end 422, and a connection segment 423 connected between the head end 421 and the tail end 422. Head ends 421 of the two connection stubs 42 are spliced and then connected to the middle part 411 of the first fastening part 41. In some other embodiments, the head ends 421 of the two connection stubs 42 may be connected to different locations of the first fastening part 41, and a gap is formed between the connection stub 42 and the first fastening part 41.

Tail ends 422 of the two connection stubs 42 are respectively connected to the two fastening end parts 435 of the second fastening part 43. Connection segments 423 of the two connection stubs 42 are located between the first fastening part 41 and the second fastening part 43, and are spaced apart from the first fastening part 41 and the second fastening part 43. The connection segments 423 of the two connection stubs 42 are approximately in a shape of "L", to increase a size of the flexible circuit board 4, reduce stress on the flexible circuit board 4 when the flexible circuit board 4 moves with the voice coil 3, and prolong a service life of the flexible circuit board 4. In some other embodiments, the connection segment 423 of the connection stub 42 may be designed in another shape such as "U" or "N".

Figure 51:
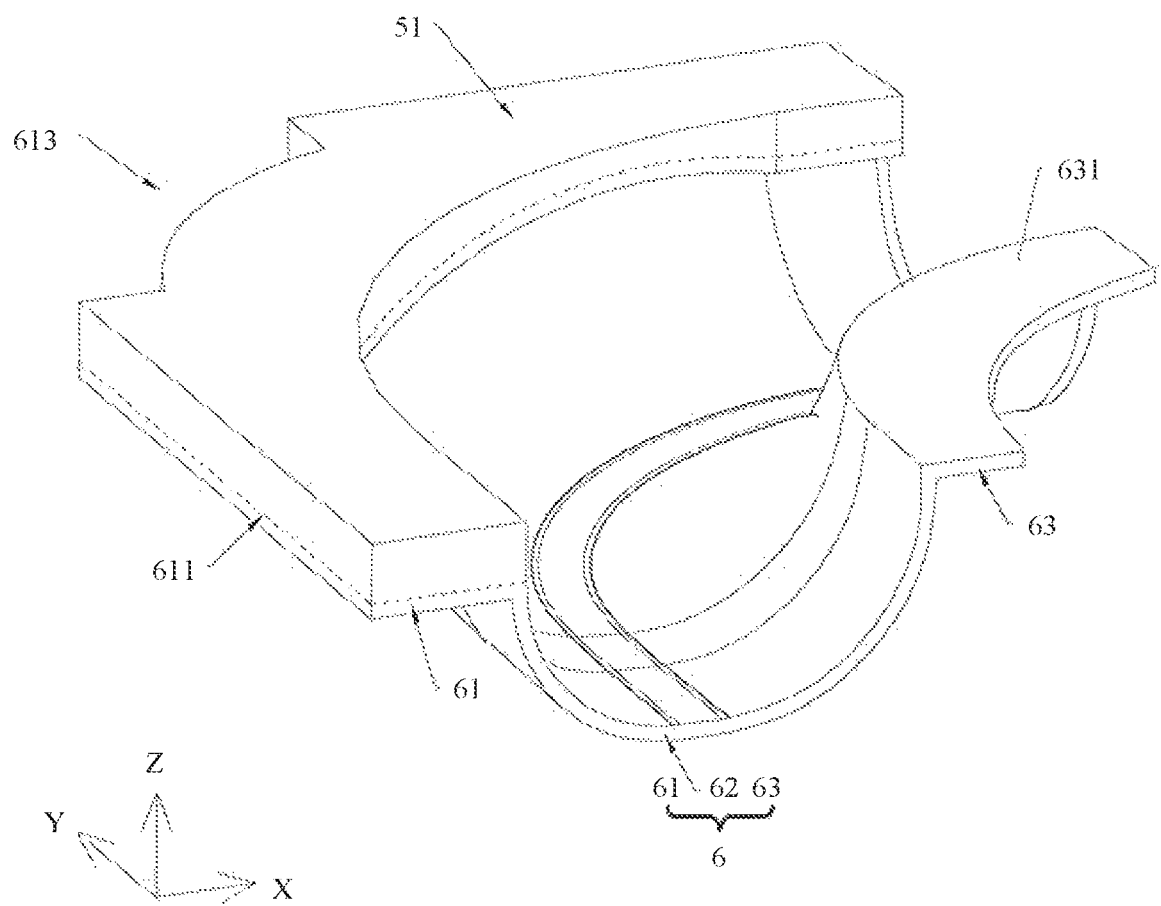
FIG. 51 is a schematic diagram of an assembly structure of an auxiliary diaphragm and a first gasket in the vibration component shown in FIG. 41.

Refer to FIG. 41 and FIG. 51. FIG. 51 is a schematic diagram of an assembly structure of the auxiliary diaphragm 6 and the first gasket 51 in the vibration component 10b shown in FIG. 41.

The four auxiliary diaphragms 6 have a same structure. The auxiliary diaphragm 6 is approximately sector-shaped. The auxiliary diaphragm 6 includes a first fastening part 61, a vibration part 62, and a second fastening part 63 that are sequentially connected, the first fastening part 61 is located on an outer side of the vibration part 62, and the second fastening part 63 is located on an inner side of the vibration part 62. A cross-sectional shape of the vibration part 62 of the auxiliary diaphragm 6 is an arc shape or an approximate arc shape, and an extension track of the vibration part 62 is arc-shaped. The vibration part 62 of the auxiliary diaphragm 6 is concave, that is, the vibration part 62 is recessed away from a top surface 611 of the first fastening part 61 and a top surface 631 of the second fastening part 63. Both the first fastening part 61 and the second fastening part 63 of the auxiliary diaphragm 6 are sector-shaped. A notch 613 is formed on a side that is of the first fastening part 61 of the auxiliary diaphragm 6 and that is away from the second fastening part 63. The first fastening part 61 is a fixed portion of the auxiliary diaphragm 6, and the second fastening part 63 is a movable portion of the auxiliary diaphragm 6, and may move relative to the first fastening part 61, and drive the vibration part 62 to move relative to the first fastening part 61. In this case, the vibration part 62 may be deformed when driven by the second fastening part 63.

The four first gaskets 51 have a same structure, and are respectively fastened to the four auxiliary diaphragms 6. Specifically, each first gasket 51 is fastened to a first fastening part 61 of one auxiliary diaphragm 6. A thickness of the first gasket 51 falls between 0.1 mm and 0.5 mm. In this embodiment, a shape of the first gasket 51 is the same as a structure of the first fastening part 61 of the auxiliary diaphragm 6, and the first gasket 51 and the auxiliary diaphragm 6 are integrally formed. In some other embodiments, the first gasket 51 and the auxiliary diaphragm 6 may be assembled (for example, bonded or welded) to form an integral structure. In this case, the first gasket 51 may be a structural member such as a copper sheet, a plastic sheet, or a steel sheet.

Figure 52:
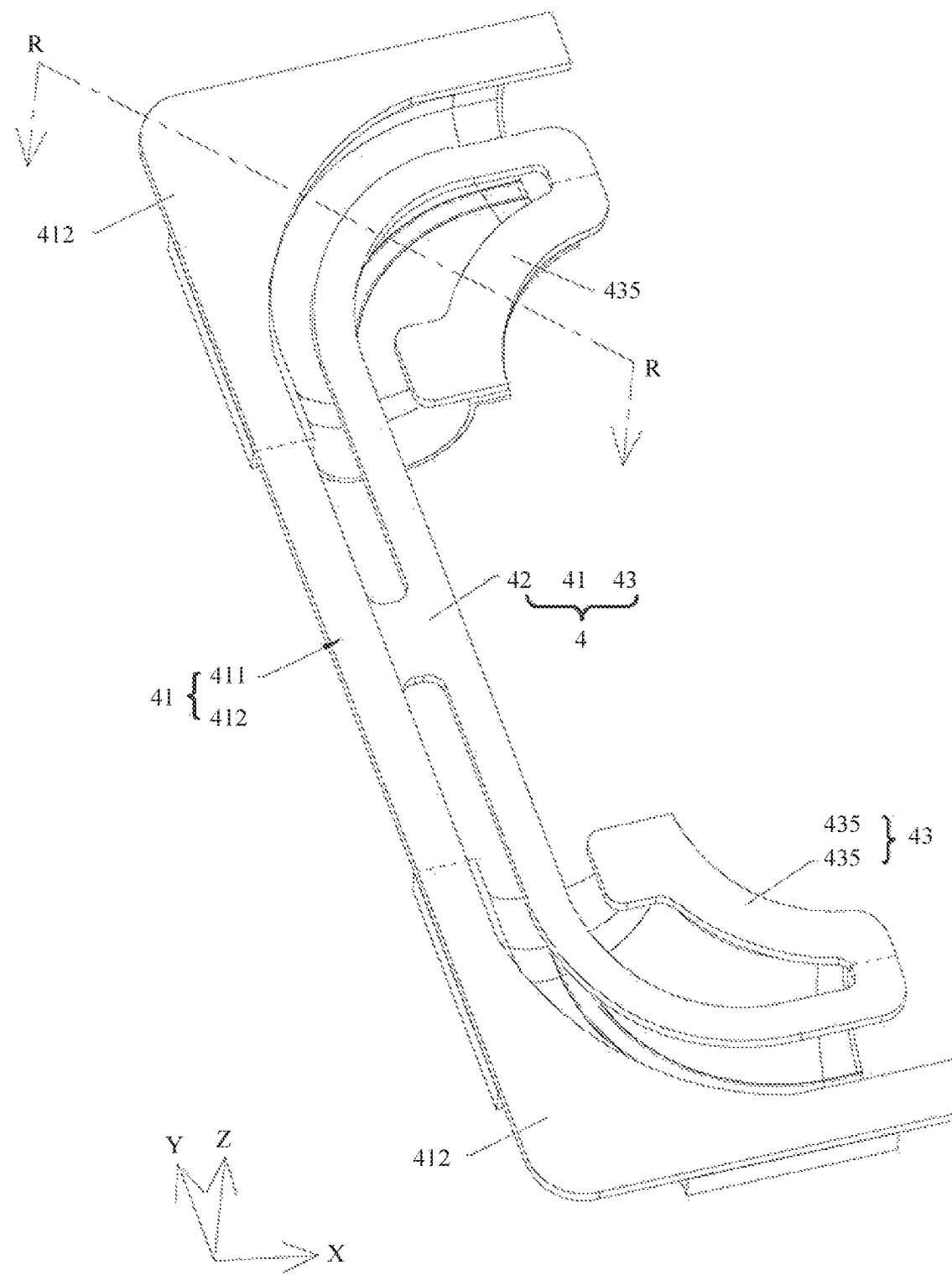
FIG. 52 is a schematic diagram of an assembly structure of a flexible circuit board, a first gasket, and an auxiliary diaphragm in the vibration component shown in FIG. 41.
Figure 53:
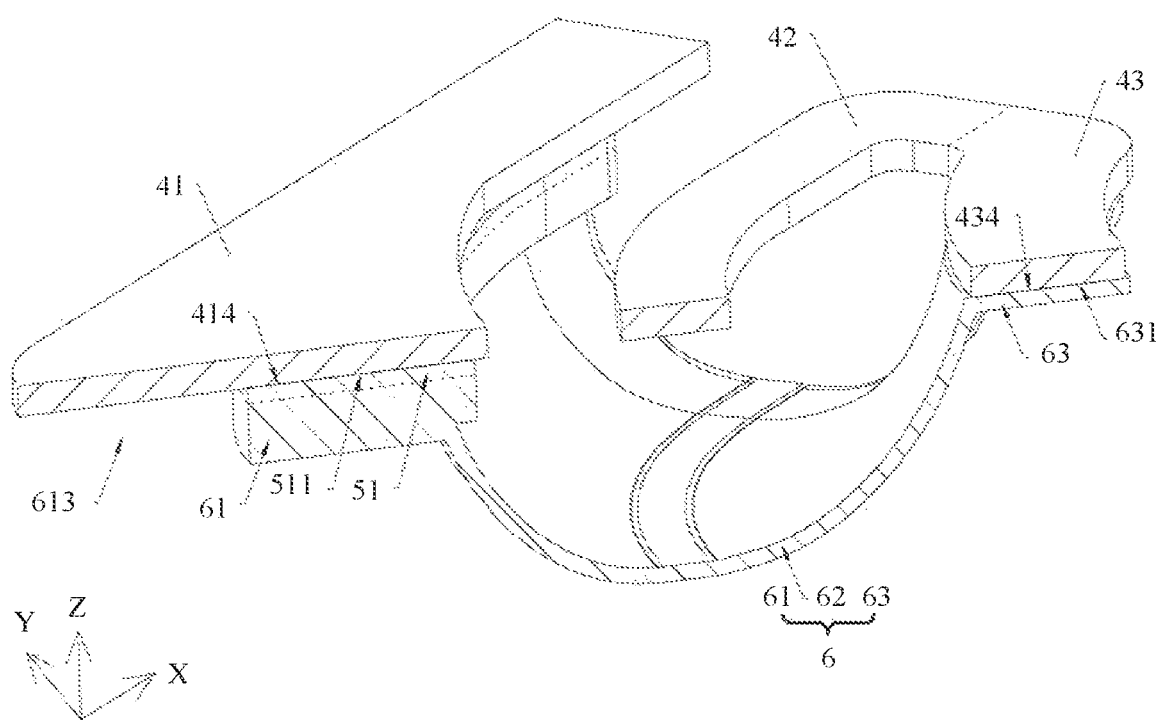
FIG. 53 is a schematic diagram of a structure obtained after the structure shown in FIG. 52 is sectioned along R-R.

Refer to FIG. 52 and FIG. 53. FIG. 52 is a schematic diagram of an assembly structure of the flexible circuit board 4, the first gasket 51, and the auxiliary diaphragm 6 in the vibration component 10*b* shown in FIG. 41. FIG. 53 is a schematic diagram of a structure obtained after the structure shown in FIG. 52 is sectioned along R-R. FIG. 52 is a schematic diagram of an assembly structure of only one flexible circuit board 4, two first gaskets 51, and two auxiliary diaphragms 6.

The first gasket 51 and the auxiliary diaphragm 6 are located on a same side of the flexible circuit board 4. Specifically, the auxiliary diaphragm 6 is located on a side that is of the first gasket 51 and that is away from the flexible circuit board 4. In other words, the first gasket 51 is located between the flexible circuit board 4 and the auxiliary diaphragm 6. The vibration part 62 of the auxiliary diaphragm 6 is recessed away from the flexible circuit board 4, and is spaced apart from the connection stub 42 of the flexible circuit board 4.

The two first gaskets 51 are fastened to the first fastening part 41 of the flexible circuit board 4. Specifically, the two first gaskets 51 are respectively fastened to the two end parts 414 of the first fastening part 41. A top surface 511 of the first gasket 51 is in contact with a bottom surface 414 of the first fastening part 41 of the flexible circuit board 4. For example, the first gasket 51 and the first fastening part 41 of the flexible circuit board 4 may be fastened to each other through bonding. In other words, the first gasket 51 is located between the first fastening part 41 of the flexible circuit board 4 and the first fastening part 61 of the auxiliary diaphragm 6, to increase a distance between the first fastening part 61 of the auxiliary diaphragm 6 and the first fastening part 41 of the flexible circuit board 4 in the thickness direction (namely, the Z-axis direction shown in the figure) of the electroacoustic transducer 10 and increase a distance between the vibration part 62 of the auxiliary diaphragm 6 and the connection stub 42 of the flexible circuit board 4 in the Z-axis direction.

Figure 54:
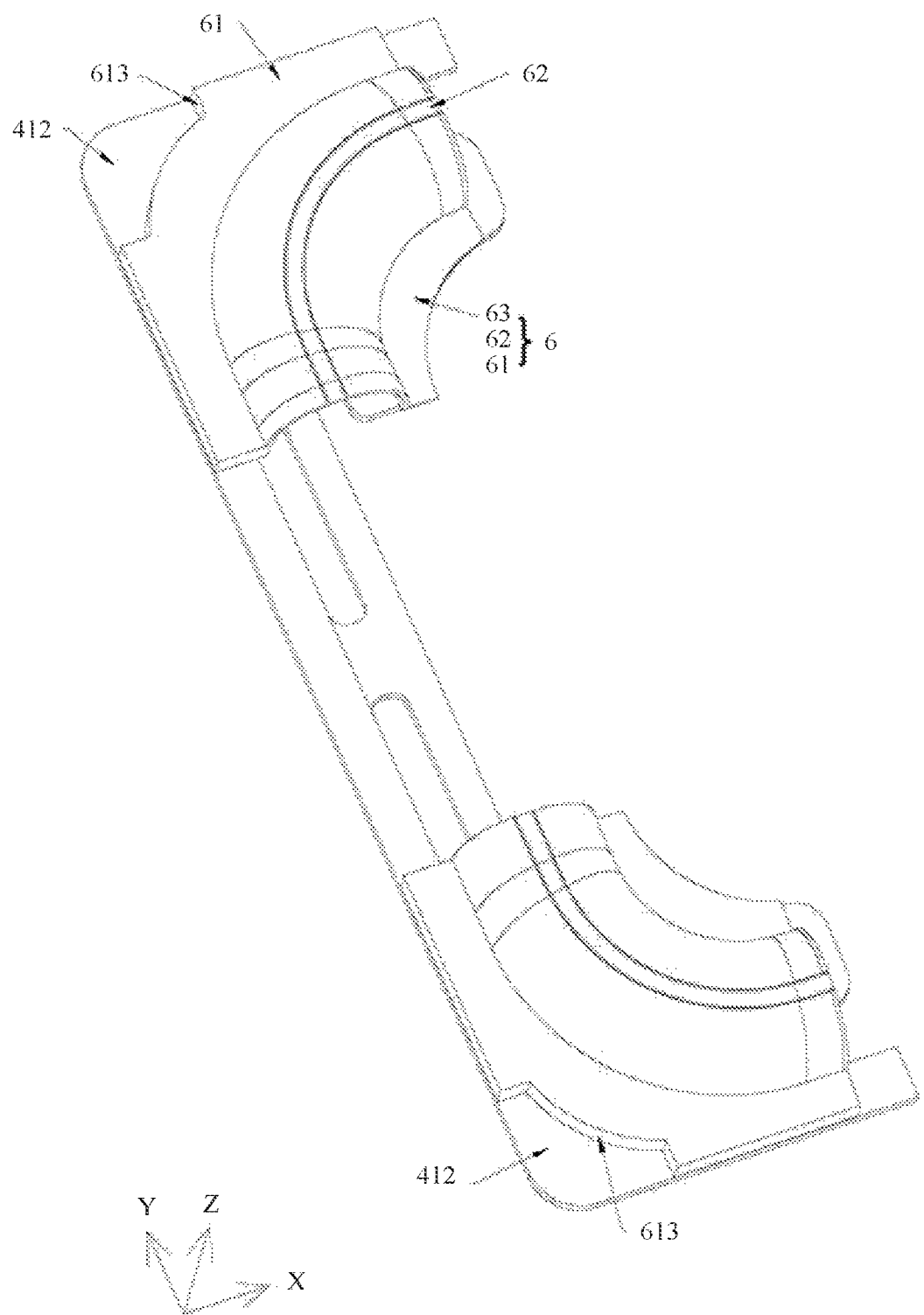
FIG. 54 is a schematic diagram of a structure that is of the structure shown in FIG. 52 and that is viewed from another angle.

FIG. 54 is a schematic diagram of a structure that is of FIG. 52 and that is viewed from another angle.

The second fastening part 63 of the auxiliary diaphragm 6 is fastened to the second fastening part 43 of the flexible circuit board 4. Specifically, second fastening parts 63 of the two auxiliary diaphragms 6 are respectively fastened to the two fastening end parts 435 of the second fastening part 43 of the flexible circuit board 4. The top surface 631 of the second fastening part 63 of the auxiliary diaphragm 6 is in contact with a bottom surface 434 of the second fastening part 43 of the flexible circuit board 4. For example, the second fastening part 63 of the auxiliary diaphragm 6 and the second fastening part 43 of the flexible circuit board 4 may be fastened to each other through bonding.

In addition, the auxiliary diaphragm 6 exposes a portion of the flexible circuit board 4. Specifically, the end part 412 of the first fastening part 41 of the flexible circuit board 4 may be exposed by using the notch 613 of the first fastening part 61 of the auxiliary diaphragm 6. A region that is of the end part 412 of the first fastening part 41 of the flexible circuit board 4 and that is exposed relative to the auxiliary diaphragm 6 may be configured to connect to another part of the electroacoustic transducer 10. For example, as shown in FIG. 6, exposed regions of the two end parts 412 of the body 41 of the flexible circuit board 4 may be configured to fasten (for example, weld) tail ends of two branches of the circuit board 40, to implement an electrical connection between the electroacoustic transducer 10 and an external component.

Figure 55:
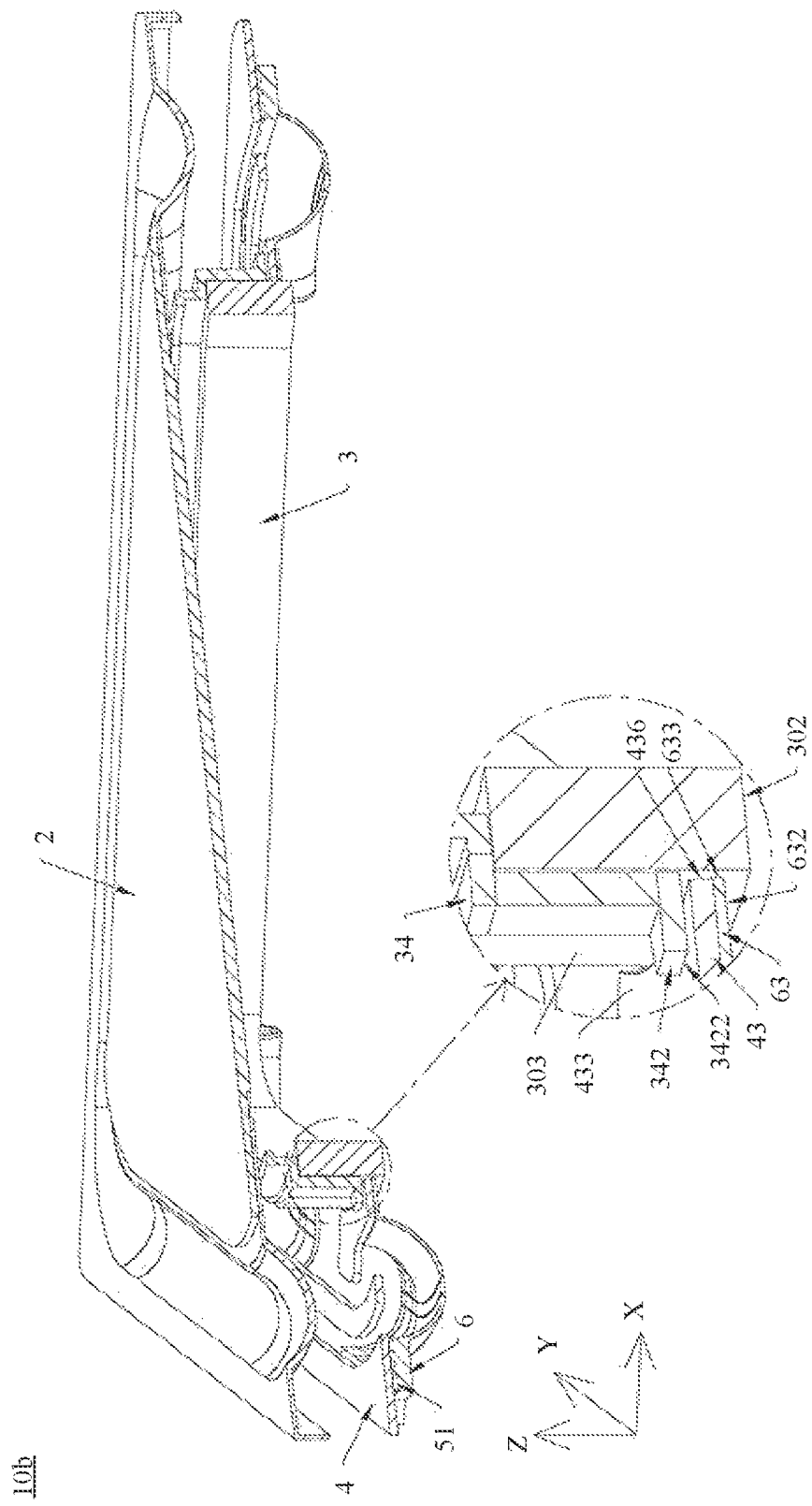
FIG. 55 is a schematic diagram of a structure obtained after the vibration component shown in FIG. 40 is sectioned along S-S.
Figure 56:
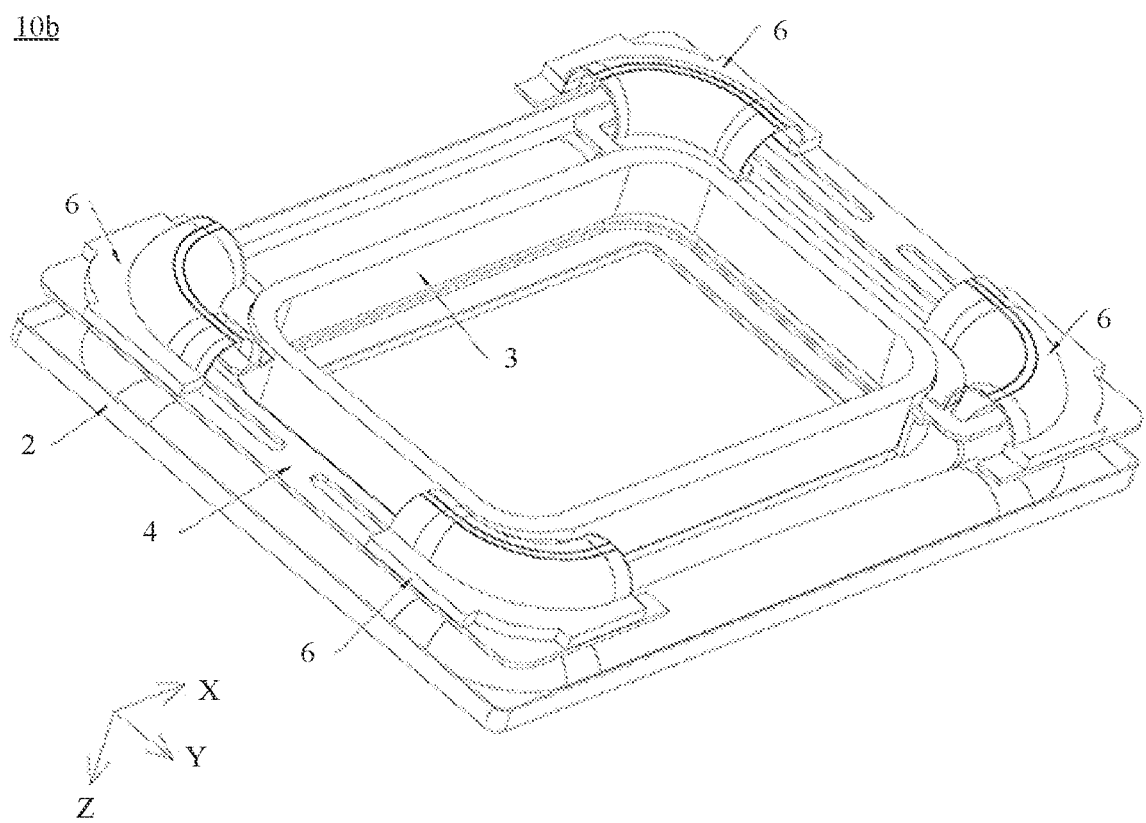
FIG. 56 is a schematic diagram of a structure of the vibration component shown in FIG. 40 from another angle.

Refer to FIG. 55 and FIG. 56. FIG. 55 is a schematic diagram of a structure obtained after the vibration component 10*b* shown in FIG. 40 is sectioned along S-S. FIG. 56 is a schematic diagram of a structure of the vibration component 10*b* shown in FIG. 40 from another angle.

The two flexible circuit boards 4, the four first gaskets 51, and the four auxiliary diaphragms 6 are located on a same side of the voice membrane 2 as the voice coil 3, and are located on the outer side of the voice coil 3. The two flexible circuit boards 4 are arranged at intervals. The two flexible circuit boards 4 may be symmetrical with respect to the first reference plane, and each flexible circuit board 4 may be symmetrical with respect to the second reference plane.

The two flexible circuit boards 4 are fastened to the outer side surface 303 of the voice coil 3. Specifically, a second fastening part 43 of each flexible circuit board 4 is fastened to the outer side surface 303 of the voice coil 3. Each flexible circuit board 4 is indirectly connected to the outer side surface 303 of the voice coil 3 by using two auxiliary bobbins 34. In other words, the two auxiliary bobbins 34 are connected between the second fastening part 43 of the flexible circuit board 4 and the voice coil 3.

The second fastening part 43 of the flexible circuit board 4 is fastened to the bottom surface 3422 of the auxiliary bobbin 34. Specifically, the two fastening end parts 435 (as shown in FIG. 52) of the second fastening part 43 of the flexible circuit board 4 are respectively indirectly connected to the voice coil 3 by using the two auxiliary bobbins 34, to improve connection stability between the second fastening part 43 of the flexible circuit board 4 and the voice coil 3. In this case, a top surface 433 of the second fastening part 43 of the flexible circuit board 4 is in contact with the bottom surface 3422 of the epitaxial part 342 of the auxiliary bobbin 34. For example, the second fastening part 43 of the flexible circuit board 4 and the epitaxial part 342 of the auxiliary bobbin 34 may be fastened to each other through bonding. In addition, an inner side surface 436 of the second fastening part 43 of the flexible circuit board 4 may abut against the outer side surface 303 of the voice coil 3, and may be attached to the outer side surface 303 of the voice coil 3.

In this embodiment, the two flexible circuit boards 4 are a left flexible circuit board 4 and a right flexible circuit board 4 arranged at intervals in the X-axis direction. Two fastening end parts 435 of a second fastening part 43 of the left flexible circuit board 4 are respectively fastened to the two left auxiliary bobbins 34, and an inner side surface 436 of the second fastening part 43 of the left flexible circuit board 4 may abut against the two left rounded corners of the voice coil 3. Two fastening end parts 435 of a first fastening part 41 of the right flexible circuit board 4 are respectively fastened to the two right auxiliary bobbins 34, and an inner side surface 436 of the second fastening part 43 of the flexible circuit board 4 may abut against the two right rounded corners 32 of the voice coil 3.

The four auxiliary diaphragms 6 are located on a side of the two flexible circuit boards 4 that is away from the voice membrane 2. The four auxiliary diaphragms 6 are arranged at intervals, and may be symmetrical with respect to the first reference plane and the second reference plane. In addition, an inner side surface 633 of the second fastening part 63 of the auxiliary diaphragm 6 may abut against the outer side surface 303 of the voice coil 3, and may be attached to the outer side surface 303 of the voice coil 3.

In this embodiment, the four auxiliary diaphragms 6 are two left auxiliary diaphragms 6 and two right auxiliary diaphragms 6 arranged in the X-axis direction, and the two left auxiliary diaphragms 6 and the two right auxiliary diaphragms 6 are arranged at intervals in the Y-axis direction. Specifically, the two left auxiliary diaphragms 6 are respectively located on outer sides of the two left rounded corners 32 (as shown in FIG. 41) of the voice coil 3, and second fastening parts 63 of the two left auxiliary diaphragms 6 are fastened to the two fastening end parts 435 of the second fastening part 43 of the left flexible circuit board 4. The two right auxiliary diaphragms 6 are respectively located on outer sides of the two right rounded corners 32 of the voice coil 3, and second fastening parts 63 of the two right auxiliary diaphragms 6 are fastened to the two fastening end parts 435 of the second fastening part 43 of the right flexible circuit board 4.

The four first gaskets 51 are located between the four auxiliary diaphragms 6 and the two flexible circuit boards 4. The four first gaskets 51 are arranged at intervals, and may be symmetrical with respect to the first reference plane and the second reference plane. In this embodiment, the four first gaskets 51 are two left first gaskets 51 and two right first gaskets 51 arranged in the X-axis direction, and the two left first gaskets 51 and the two right first gaskets 51 are arranged at intervals in the Y-axis direction. Specifically, the two left first gaskets 51 are respectively located on the outer sides of the two left rounded corners 32 of the voice coil 3, and are connected between a first fastening part 41 of the left flexible circuit board 4 and first fastening parts 61 of the two left auxiliary diaphragms 6. The two right first gaskets 51 are respectively located on the outer sides of the two right rounded corners 32 of the voice coil 3, and are separately connected between the right flexible circuit board 4 and the two right auxiliary diaphragms 6.

In this embodiment, a bottom surface 632 of the second fastening part 63 of the auxiliary diaphragm 6 is located on the top side of the bottom surface 302 of the voice coil 3. In other words, the bottom surface 632 of the second fastening part 63 of the auxiliary diaphragm 6 is located on the top side of the bottom surface 302 of the voice coil 3. In other words, the bottom surface 632 of the second fastening part 63 of the auxiliary diaphragm 6 is located on the side that is of the bottom surface 302 of the voice coil 3 and that faces the top surface 301 of the voice coil 3, so that the second fastening part 42 of the flexible circuit board 4 and the second fastening part 62 of the auxiliary diaphragm 6 multiplex a distance of the voice coil 3 in the Z-axis direction, thereby reducing a collision probability between the vibration part 62 of the auxiliary diaphragm 6 and the magnetic circuit component 10c and improving reliability of the electroacoustic transducer 10.

In some other embodiments, the bottom surface 632 of the second fastening part 63 of the auxiliary diaphragm 6 may be flush with the bottom surface 302 of the voice coil 3. Alternatively, the bottom surface 632 of the second fastening part 63 of the auxiliary diaphragm 6 is located on a bottom side of the bottom surface 302 of the voice coil 3. The second fastening part 63 of the auxiliary diaphragm 6 partially extends out of the bottom surface 302 of the voice coil 3, or the second fastening part 63 of the auxiliary diaphragm 6 completely extends out of the bottom surface 302 of the voice coil 3, and in this case, the top surface 631 of the second fastening part 63 of the auxiliary diaphragm 6 may be further fastened to the bottom surface 302 of the voice coil 3.

Figure 57:
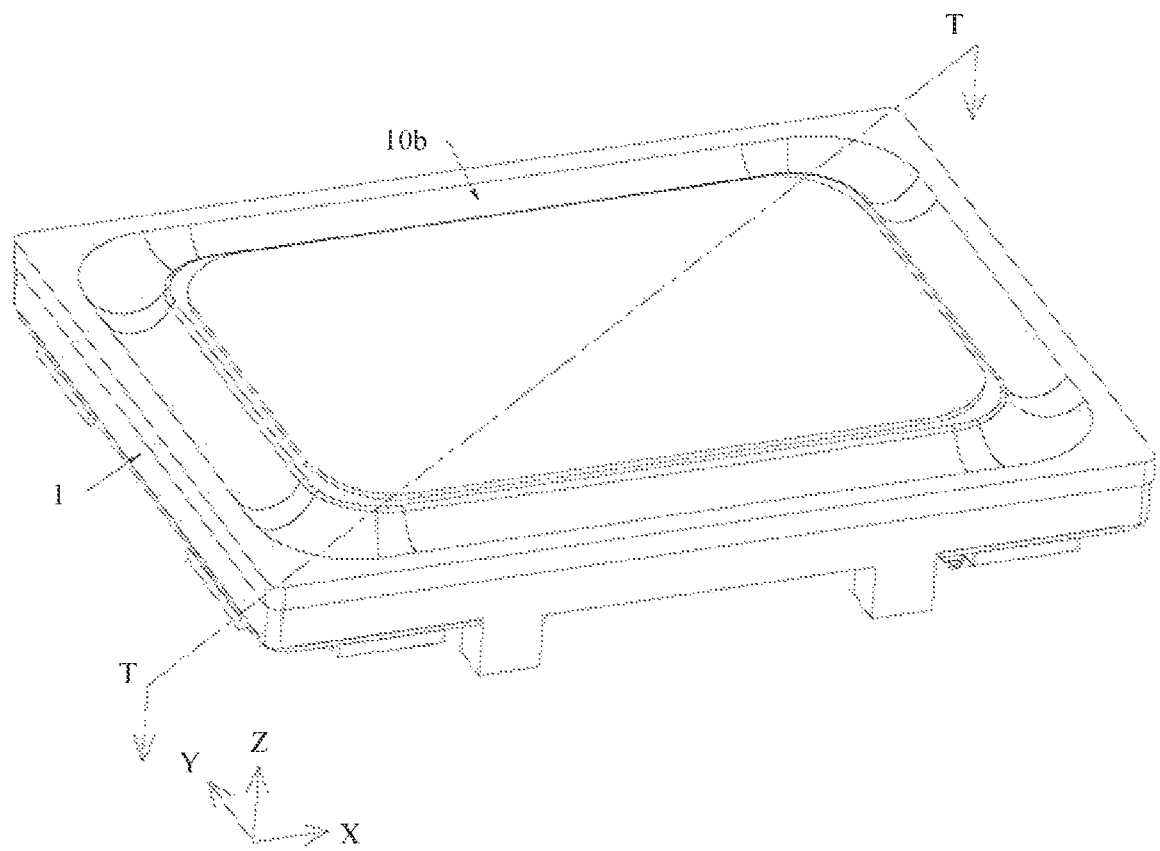
FIG. 57 is a schematic diagram of an assembly structure of a vibration component and a basket in the electroacoustic transducer shown in FIG. 41.
Figure 58:
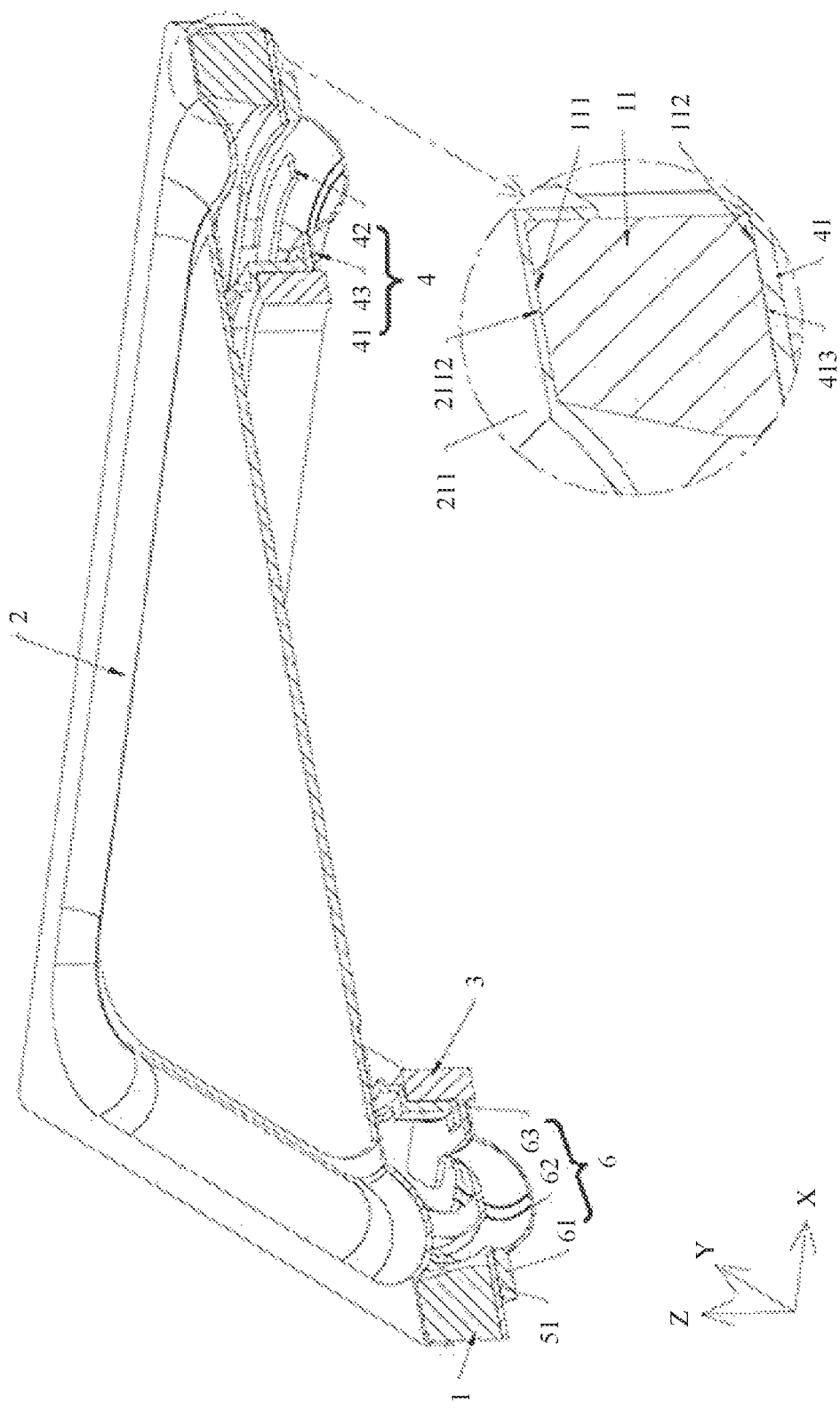
FIG. 58 is a schematic diagram of a structure obtained after the structure shown in FIG. 57 is sectioned along T-T.

Refer to FIG. 57 and FIG. 58. FIG. 57 is a schematic diagram of an assembly structure of the vibration component 10b and the basket 1 in the electroacoustic transducer 10 shown in FIG. 41. FIG. 58 is a schematic diagram of a structure obtained after the structure shown in FIG. 57 is sectioned along T-T.

A peripheral edge of the voice membrane 2 is fastened to the framework 11 of the basket 1. Specifically, the first fastening part 211 of the diaphragm 21 is fastened to the top surface 111 of the framework 11. The bottom surface 2112 of the first fastening part 211 of the diaphragm 21 is in contact with the top surface 111 of the framework 11. For example, the first fastening part 211 of the diaphragm 21 and the framework 11 of the basket 1 may be fastened to each other through bonding. In this case, inner space of the framework 11 is in a bottom-narrow top-wide shape, so that the vibration part 212 of the diaphragm 21 has larger vibration space, thereby implementing large-amplitude vibration of the voice membrane 2.

The voice coil 3 is located on an inner side of the basket 1. The two flexible circuit boards 4, the four first gaskets 51, and the four auxiliary diaphragms 6 are all located on a side that is of the framework 11 of the basket 1 and that is away from the voice membrane 2. Specifically, the first fastening part 41 of the flexible circuit board 4 is fastened to the framework 11. A top surface 413 of the first fastening part 41 of the flexible circuit board 4 is in contact with the bottom surface 112 of the framework 11. For example, the first fastening part 41 of the flexible circuit board 4 and the framework 11 may be fastened to each other through bonding. In this case, the first fastening part 41 of the flexible circuit board 4 is fastened to the framework 11, the second fastening part 43 of the flexible circuit board 4 is fastened to the voice coil 3, and the two connection stubs 42 of the flexible circuit board 4 and the vibration part 62 of the auxiliary diaphragm 6 suspend relative to the framework 11.

In the electroacoustic transducer 10 shown in this embodiment, because the first gasket 51 exists, the distance between the first fastening part 41 of the flexible circuit board 4 and the first fastening part 61 of the auxiliary diaphragm 6 in the thickness direction (namely, the Z-axis direction) of the electroacoustic transducer 10 is increased, which equivalently means that the distance between the vibration part 62 of the auxiliary diaphragm 6 and the connection stub 42 of the flexible circuit board 4 in the thickness direction of the electroacoustic transducer 10 is increased, so that a problem that noise is generated because the vibration part 62 of the auxiliary diaphragm 6 interferes with the connection stub 42 of the flexible circuit board 4 is avoided, amplitude of the electroacoustic transducer 10 is increased, a resonance frequency of the electroacoustic transducer 10 is reduced, and low-frequency sensitivity and loudness of the electroacoustic transducer are improved. Because the thickness of the first gasket 51 falls between 0.1 mm and 0.5 mm, the amplitude of the electroacoustic transducer 10 may be increased by at least 0.1 mm. In this case, the amplitude of the electroacoustic transducer 10 may be at least 0.5 mm.

Figure 59:
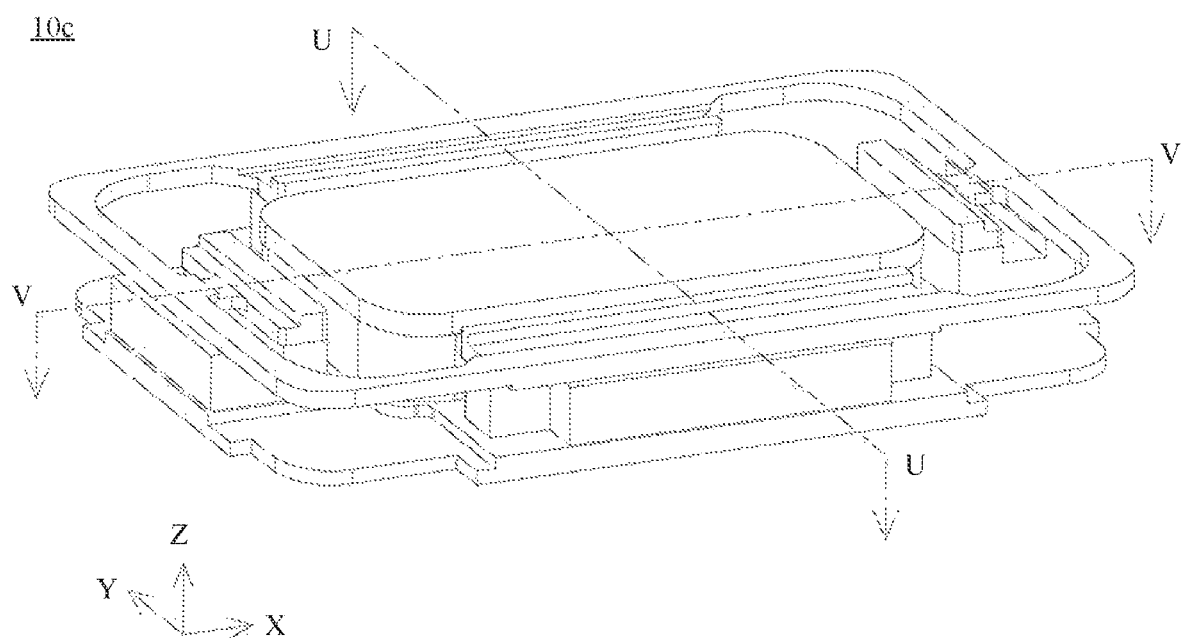
FIG. 59 is a schematic diagram of a structure of a magnetic circuit component in the electroacoustic transducer shown in FIG. 41.
Figure 60:
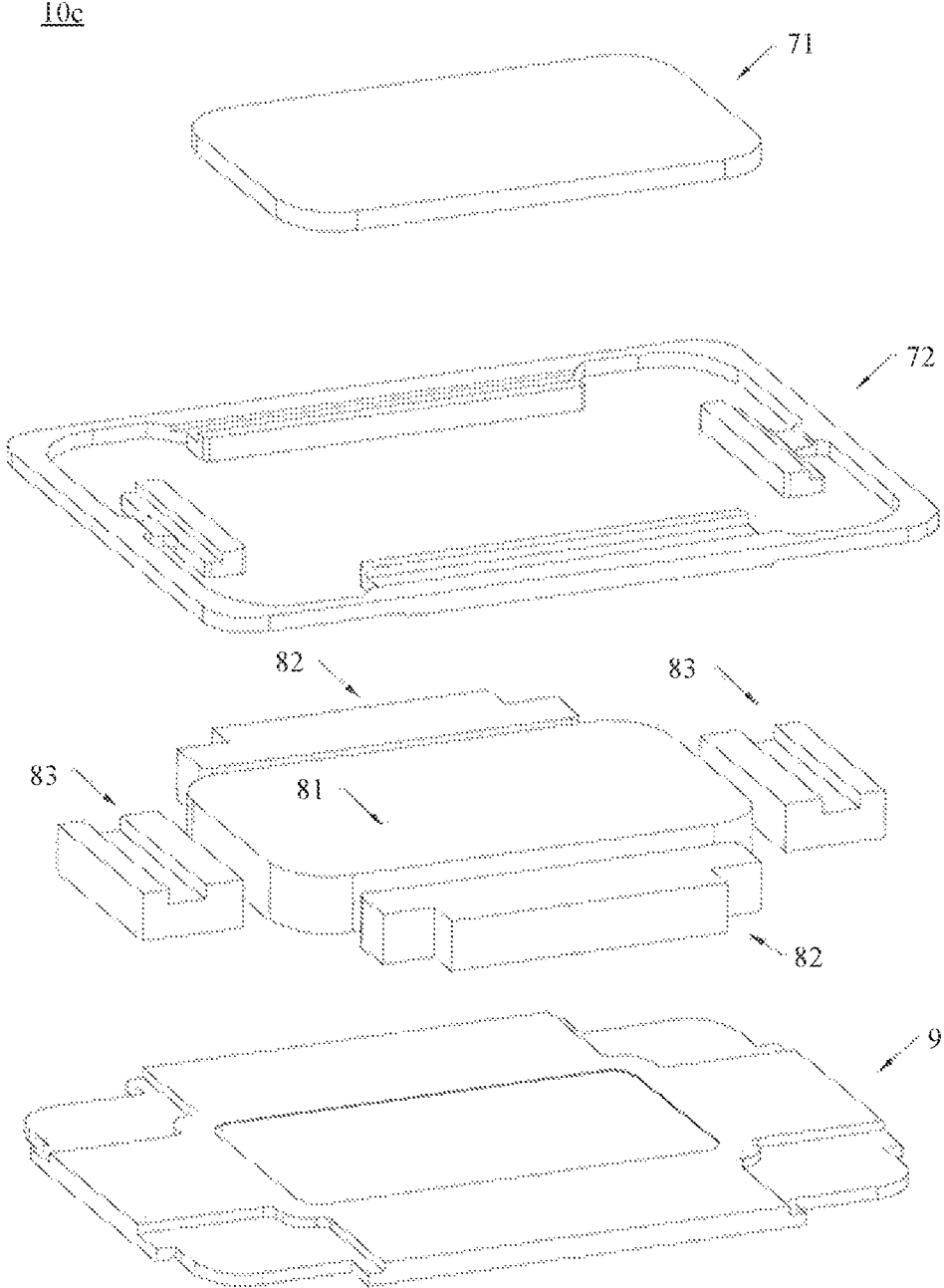
FIG. 60 is a schematic diagram of an exploded structure of the magnetic circuit component shown in FIG. 59.

Refer to FIG. 59 and FIG. 60. FIG. 59 is a schematic diagram of a structure of the magnetic circuit component 10c in the electroacoustic transducer 10 shown in FIG. 41. FIG. 60 is a schematic diagram of an exploded structure of the magnetic circuit component 10c shown in FIG. 59.

The magnetic circuit component 10c includes a central electrode plate 71, a side electrode plate 72, a central magnet 81, two first side magnets 82, two second side magnets 83, and a lower electrode plate 9. The central electrode plate 71, the side electrode plate 72, and the lower electrode plate 9 are magnetic conductive parts. The central magnet 81, the two first side magnets 82, and the two second side magnets 83 are permanent magnets, and jointly form a magnet group.

Figure 61:
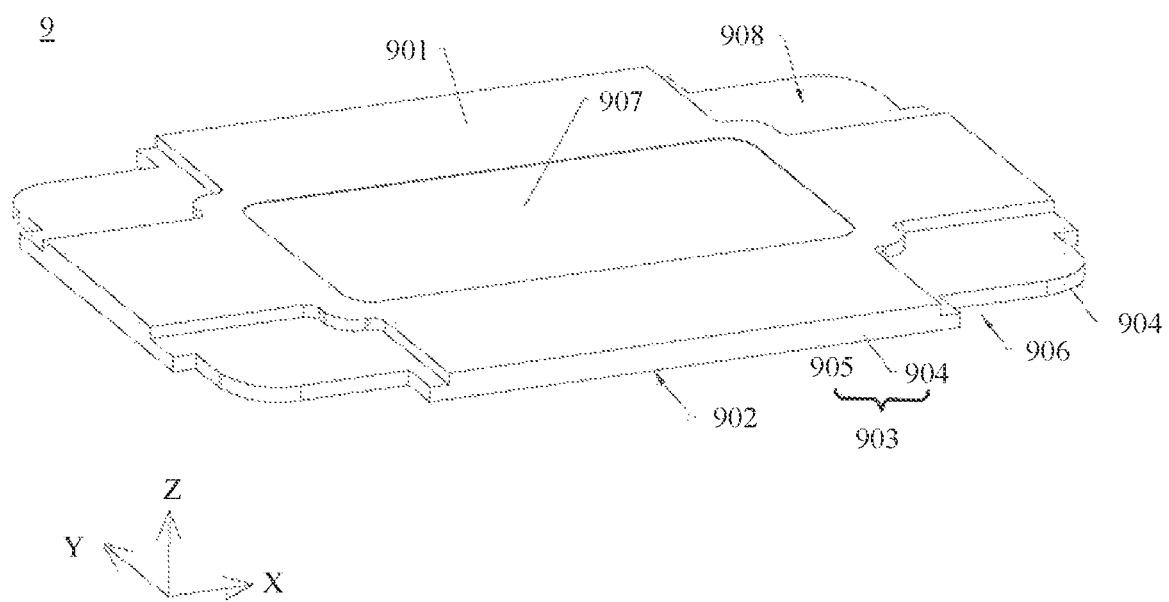
FIG. 61 is a schematic diagram of a structure of a lower electrode plate in the magnetic circuit component shown in FIG. 60.

FIG. 61 is a schematic diagram of a structure of the lower electrode plate 9 in the magnetic circuit component 10c shown in FIG. 60.

The lower electrode plate 9 is approximately in a shape of a chamfered rectangle. The lower electrode plate 9 includes a top surface 901 and a bottom surface 902 that are disposed opposite to each other and a peripheral side surface 903 connected between the top surface 901 and the bottom surface 902. The peripheral side surface 903 includes four side peripheral surfaces 904 and four chamfered surfaces 905, and one chamfered surface 905 is connected between two adjacent side peripheral surfaces 904.

Four clamping spaces 906, a central groove 907, and four avoidance grooves 908 are disposed on the lower electrode plate 9. In this embodiment, the clamping space 906 is a notch, and an opening of the clamping space 906 is located on the top surface 901 of the body part 90. An extension direction of the clamping space 906 is a direction from the top surface 901 to the bottom surface 902 of the body part 90, and the clamping space 906 penetrates the bottom surface 902 and the side peripheral surface 904 of the body part 90. The four clamping spaces 906 are arranged at intervals on the edge of the lower electrode plate 9, and may be symmetrical with respect to the first reference plane, or may be symmetrical with respect to the second reference plane. In some other embodiments, the clamping space 906 may be a hole.

An opening of the central groove 907 is located on the top surface 901 of the lower electrode plate 90. Specifically, the opening of the central groove 907 is located in a central region of the top surface 901 of the lower electrode plate 90. A recessed direction of the central groove 907 is a direction from the top surface 901 to the bottom surface 902 of the lower electrode plate 90.

Openings of the four avoidance grooves 908 are located on the top surface 901 of the lower electrode plate 90, are disposed around the opening of the central groove 907, and are spaced apart from the opening of the central groove 907. Specifically, the openings of the four avoidance grooves 908 are located in an edge region of the top surface 901 of the lower electrode plate 90. The openings of the four avoidance grooves 908 are respectively located in four corners of the top surface 901, and may be symmetrical with respect to the first reference plane, or may be symmetrical with respect to the second reference plane. A recessed direction of each avoidance groove 908 is a direction from the top surface 901 to the bottom surface 902 of the lower electrode plate 90, and each avoidance groove 908 further penetrates into a corresponding side edge surface 904 and chamfered surface 905.

Figure 62:
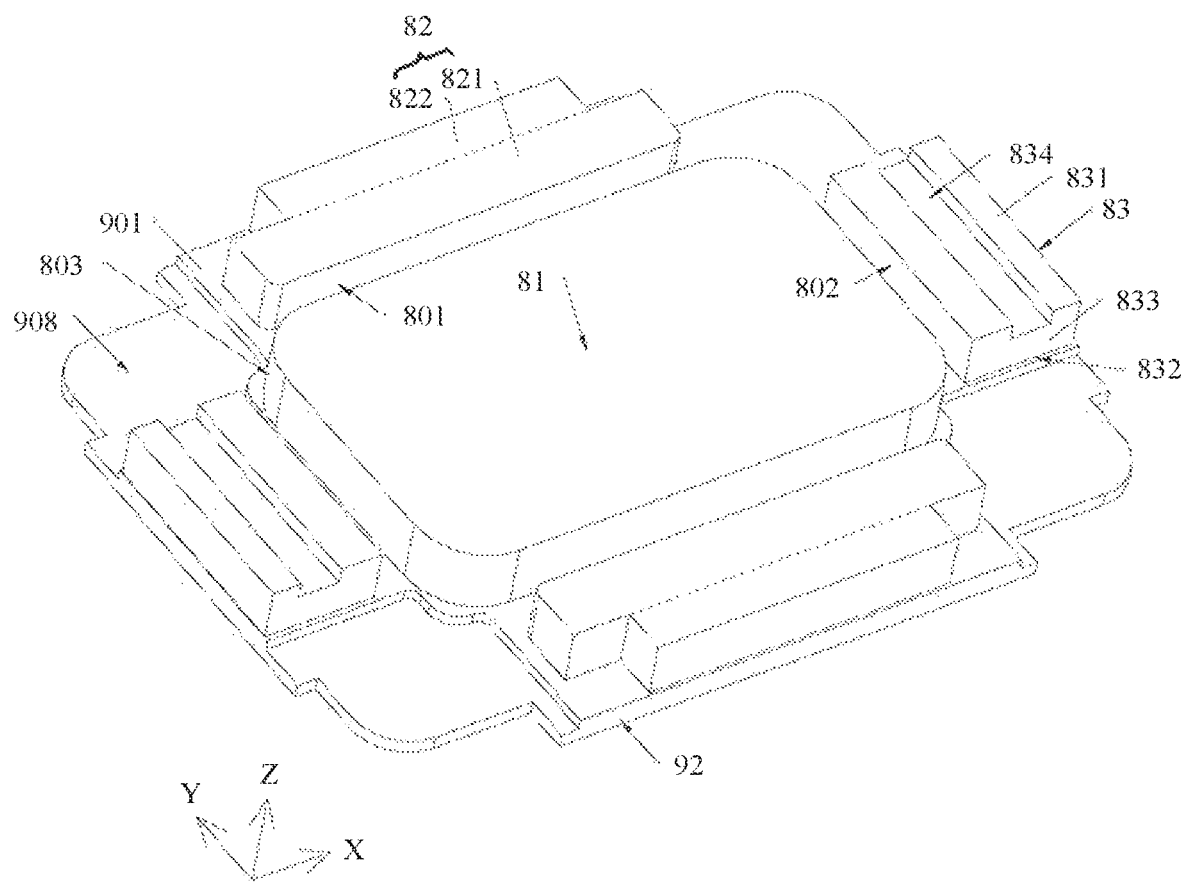
FIG. 62 is a schematic diagram of an assembly structure of a central magnet, two first side magnets, two second side magnets, and a lower electrode plate in the magnetic circuit component shown in FIG. 60.

Refer to FIG. 60 and FIG. 62. FIG. 62 is a schematic diagram of an assembly structure of the central magnet 81, the two first side magnets 82, the two second side magnets 83, and the lower electrode plate 9 in the magnetic circuit component 10c shown in FIG. 60.

The central magnet 81, the two first side magnets 82, and the two second side magnets 83 are all fastened to the top surface 901 of the lower electrode plate 9. The central magnet 81 is approximately in a shape of a rounded rectangle or a rectangle. Specifically, the central magnet 81 is fastened to the top surface 901 of the lower electrode plate 9, and covers the central groove 907 (as shown in FIG. 61) of the lower electrode plate 9. For example, the central magnet 81 may be fastened to the top surface 901 of the lower electrode plate 9 through bonding. The central groove 907 is disposed to reduce a weight of the lower electrode plate 9 and reduce a connection area between a lower surface of the central magnet 81 and the top surface 901 of the lower electrode plate 9, so that it is easier to implement a connection between the surfaces, and connection quality is higher. In some other embodiments, the central groove 907 may be omitted from the lower electrode plate 9.

The first side magnet 82 is in a shape of "T". The first side magnet 82 includes a first portion 821 and a second portion 822 fastened to the first portion 821. The first portion 821 extends in the X-axis direction. The second portion 822 is located on an outer side of the first portion 821, is connected to a middle part 411 of the first portion 821, and extends along the outer side of the first portion 821. Specifically, the two first side magnets 82 are symmetrically arranged on two sides of the central magnet 81, and may be symmetrical with respect to the second reference plane. The two first side magnets 82 are fastened to the top surface 901 of the lower electrode plate 9. For example, the two first side magnets 82 may be fastened to the top surface 901 of the lower electrode plate 9 through bonding. The two first side magnets 82 are arranged at intervals in the Y-axis direction, and a first gap 801 is formed between each first side magnet 82 and the central magnet 81. In this case, a first portion 821 of each first side magnet 82 is located on a side that is of the second portion 822 and that faces the central magnet 81.

The second side magnet 83 is rectangular. The second side magnet 83 includes a top surface 831 and a bottom surface 832 that are disposed opposite to each other and a peripheral surface 833 connected between the top surface 831 and the bottom surface 832. An avoidance groove 834 is disposed on the second side magnet 83, and an opening of the avoidance groove 834 is located on the top surface 831 of the second side magnet 83. A recessed direction of the avoidance groove 834 is a direction from the top surface 831 to the bottom surface 832 of the second side magnet 83. The avoidance groove 834 extends in the Y-axis direction, and penetrates the peripheral surface 833 of the second side magnet 83.

The two second side magnets 83 are symmetrically arranged on the other two sides of the central magnet 81, and may be symmetrical with respect to the first reference plane. Specifically, the two second side magnets 83 are fastened to the top surface 901 of the lower electrode plate 9. For example, the two second side magnets 83 may be fastened to the top surface 901 of the lower electrode plate 9 through bonding. The two second side magnets 83 are arranged at intervals in the X-axis direction, and a third gap 802 is formed between each second side magnet 83 and the central magnet 81.

In addition, four connection gaps 803 are formed on outer sides of four corners of the central magnet 81, and each connection gap 803 is connected to an adjacent first gap 801 and third gap 802, and is further connected to the outside of the magnetic circuit component 10c. The four avoidance grooves 908 of the lower electrode plate 9 are connected to the four connection gaps 803 in a one-to-one correspondence, to form space with a larger volume.

Figure 63:
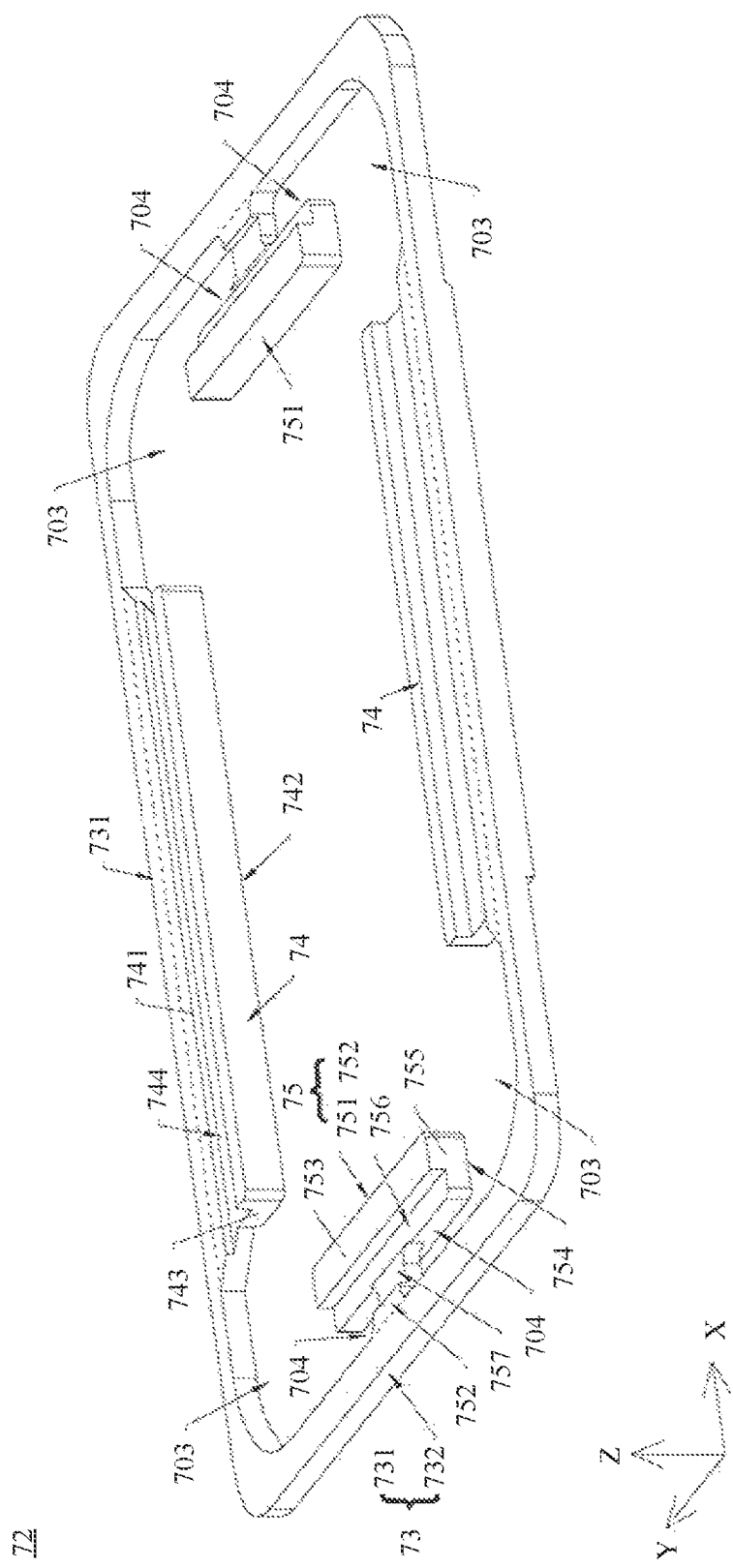
FIG. 63 is a schematic diagram of a structure of a side electrode plate in the magnetic circuit component shown in FIG. 60.

FIG. 63 is a schematic diagram of a structure of the side electrode plate 72 in the magnetic circuit component 10c shown in FIG. 60.

The side electrode plate 72 includes a connection frame part 73 and two first electrode plate parts 74 and two second electrode plate parts 75 located on an inner side of the connection frame part 73. The connection frame part 73 includes two first straight edges 731 disposed opposite to each other and two second straight edges 732 located between the two first straight edges 731. The two first straight edges 731 are arranged at intervals in the Y-axis direction, and may be symmetrical with respect to the second reference plane. The two second straight edges 732 are arranged at intervals in the X-axis direction, and may be symmetrical with respect to the first reference plane.

The two first electrode plate parts 74 are respectively connected to the two first straight edges 731 of the connection frame part 73, and may be symmetrical with respect to the second reference plane. In this embodiment, the first electrode plate part 74 is approximately rectangular. The first electrode plate part 74 includes a top surface 741 and a bottom surface 742 that are disposed opposite to each other and a peripheral surface 743 connected between the top surface 741 and the bottom surface 742. An avoidance groove 744 is disposed on the first electrode plate part 74, and an opening of the avoidance groove 744 is located on the top surface 741 of the first electrode plate part 74. A recessed direction of the avoidance groove is a direction from the top surface 741 to the bottom surface 742 of the first electrode plate part 74. The avoidance groove 744 extends in the X-axis direction, and penetrates the peripheral surface 743 of the first electrode plate part 74.

The two second electrode plate parts 75 are respectively connected to the two second straight edges 734 of the connection frame part 73, and may be symmetrical with respect to the first reference plane. In this embodiment, the second electrode plate part 75 is approximately in a shape of "T". The second electrode plate part 75 includes a first portion 751 and a second portion 752. The first portion 751 extends in the Y-axis direction. The first portion 751 includes a top surface 753 and a bottom surface 754 that are disposed opposite to each other and a peripheral surface 755 connected between the top surface 753 and the bottom surface 754. An avoidance groove 756 is disposed on the first portion 751, and an opening of the avoidance groove 756 is located on the top surface 753 of the first portion 751. A recessed direction of the avoidance groove 756 of the first portion 751 is a direction from the top surface 753 to the bottom surface 754 of the first portion 751. The avoidance groove 756 of the first portion 751 extends in the Y-axis direction, and penetrates the peripheral surface 755 of the first portion 751.

The second portion 752 is connected between a middle part of the first portion 751 and the second straight edge 732 of the connection frame part 73. The second portion 752 includes a top surface (not shown in the figure) and a bottom surface (not shown in the figure) that are disposed opposite to each other and a peripheral surface (not shown in the figure) connected between the top surface and the bottom surface. An avoidance groove 757 is disposed on the second portion 752, and an opening of the avoidance groove 757 is located on the top surface of the second portion 752. A recessed direction of the avoidance groove 757 of the second portion 752 is a direction from the top surface to the bottom surface of the second portion 752. The avoidance groove 757 of the second portion 752 extends in the Y-axis direction, and penetrates the peripheral surface of the second portion 752. In addition, the avoidance groove 757 of the second portion 752 may penetrate a portion that is of the peripheral surface of the second portion 752 and that faces the first portion 751, and be connected to the avoidance groove 756 of the first portion 751. In this case, avoidance gaps 704 are formed on two sides of the second portion 752 of the first electrode plate part 74, and the avoidance gap 704 is located between the first portion 751 of the second electrode plate part 75 and the second straight edge 732 of the connection frame part 73.

In addition, corner gaps 703 are formed at four corners of inner space of the connection frame part 73, each corner gap 703 is located between an adjacent first electrode plate part 74 and second electrode plate part 75, and each corner gap 703 is connected to an adjacent avoidance gap 704.

Figure 64:
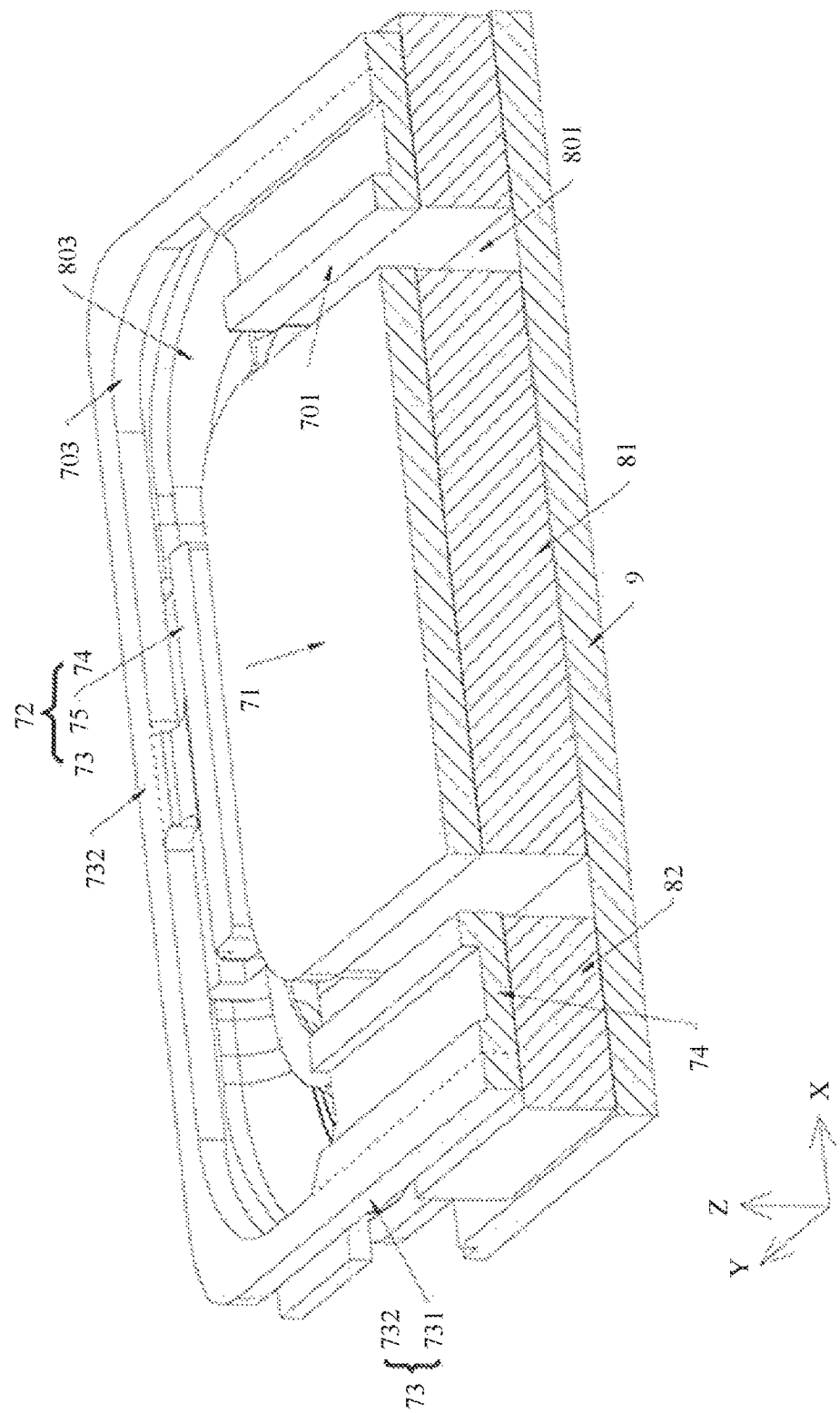
FIG. 64 is a schematic diagram of a structure obtained after the magnetic circuit component shown in FIG. 59 is sectioned along U-U.
Figure 65:
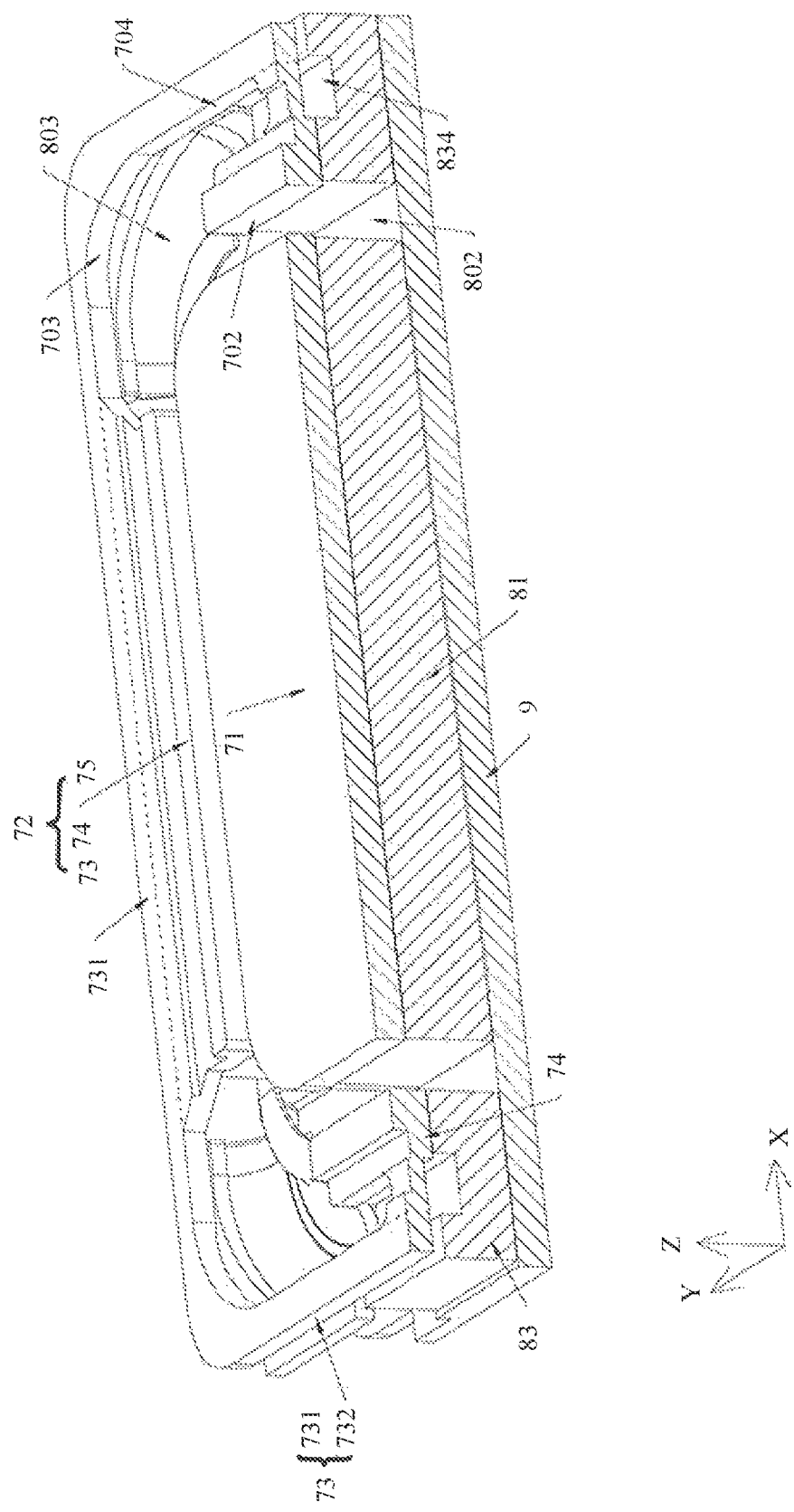
FIG. 65 is a schematic diagram of a structure obtained after the magnetic circuit component shown in FIG. 59 is sectioned along V-V.

Refer to FIG. 64 and FIG. 65. FIG. 64 is a schematic diagram of a structure obtained after the magnetic circuit component 10*c* shown in FIG. 59 is sectioned along U-U. FIG. 65 is a schematic diagram of a structure obtained after the magnetic circuit component 10*c* shown in FIG. 59 is sectioned along V-V.

The central electrode plate 71 is fastened on a side that is of the central magnet 81 and that is away from the lower electrode plate 9. Specifically, the central electrode plate 71 is fastened to a top surface (not shown in the figure) of the central magnet 81. A bottom surface (not shown in the figure) of the central electrode plate 71 is in contact with the top surface of the central magnet 81. For example, the central electrode plate 71 and the central magnet 81 may be fastened to each other through bonding.

The side electrode plate 72 is fastened on a side that is of the first side magnet 82 and the second side magnet 83 and that is away from the lower electrode plate 9, and is disposed around the central electrode plate 71. The two first straight edges 731 of the connection frame part 73 respectively directly face the two first side magnets 82, and the two first electrode plate parts 74 also respectively directly face the two first side magnets 82. Specifically, both the first straight edge 731 of the connection frame part 73 and the first electrode plate part 74 are fastened to a top surface (not shown in the figure) of the first side magnet 82. A bottom surface (not shown in the figure) of the first straight edge 731 of the connection frame part 73 and a bottom surface (not shown in the figure) of the first electrode plate part 74 are in contact with a top surface (not shown in the figure) of the first side magnet 82. For example, the first straight edge 731 of the connection frame part 73 and the first electrode plate part 74 may be fastened to the first side magnet 82 through bonding. In this case, a second gap 701 is formed between the first electrode plate part 74 and the central electrode plate 71, the second gap 701 is connected to the first gap 801, and the second gap 701 is further connected to the corner gap 703 of the side electrode plate 72.

The two second straight edges 732 of the connection frame part 73 respectively directly face the two second side magnets 83, and the two second electrode plate parts 75 also respectively directly face the two second side magnets 83. Specifically, the second straight edge 732 of the connection frame part 73 and the second side magnet 83 are disposed at intervals, and the second electrode plate part 75 is fastened to the top surface 1 of the second side magnet 83. A bottom surface (not shown in the figure) of the second electrode plate part 75 is in contact with a top surface (not shown in the figure) of the second side magnet 83. For example, the second electrode plate part 75 and the second side magnet 83 may be fastened to each other through bonding. A fourth gap 702 is formed between the second electrode plate part 75 and the central electrode plate 71, and the fourth gap 702 is connected to the second gap 701 and the third gap 802. In addition, the fourth gap 702 is further connected to the corner gap 703 of the side electrode plate 72, and the four corner gaps 703 of the side electrode plate 72 are further respectively connected to the four connection gaps 803.

In this case, the second straight edge 732 of the connection frame part 73 and the first portion 751 of the second electrode plate part 75 are respectively located on two sides of the top of the avoidance groove 834 of the second side magnet 83, and the second portion 752 of the second electrode plate part 75 is located on a top side of the avoidance groove 834 of the second side magnet 83, and partially covers the opening of the avoidance groove 834. The avoidance gap 704 is connected to the avoidance groove 834.

The following describes a specific location relationship and connection relationship between the basket 1 and parts of the vibration component 10b and the magnetic circuit component 10c of the electroacoustic transducer 10. It may be understood that all parts of the electroacoustic transducer 10 can be arranged as compactly as possible when a requirement of a relative location relationship is met to meet a performance requirement of the electroacoustic transducer 10, to implement miniaturization and portability of the electroacoustic transducer 10.

Figure 66:
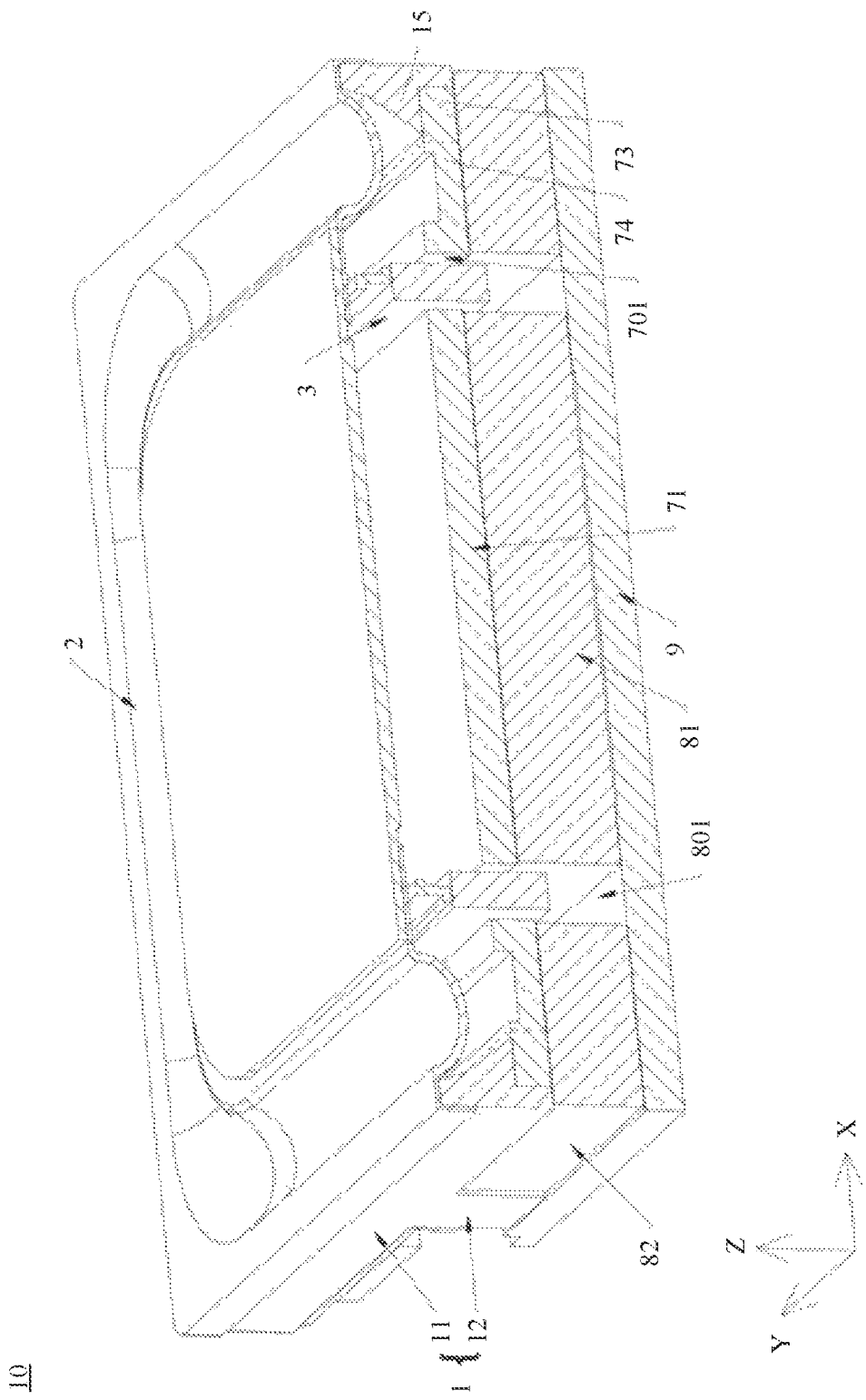
FIG. 66 is a schematic diagram of a structure obtained after the electroacoustic transducer shown in FIG. 36 is sectioned along W-W.
Figure 67:
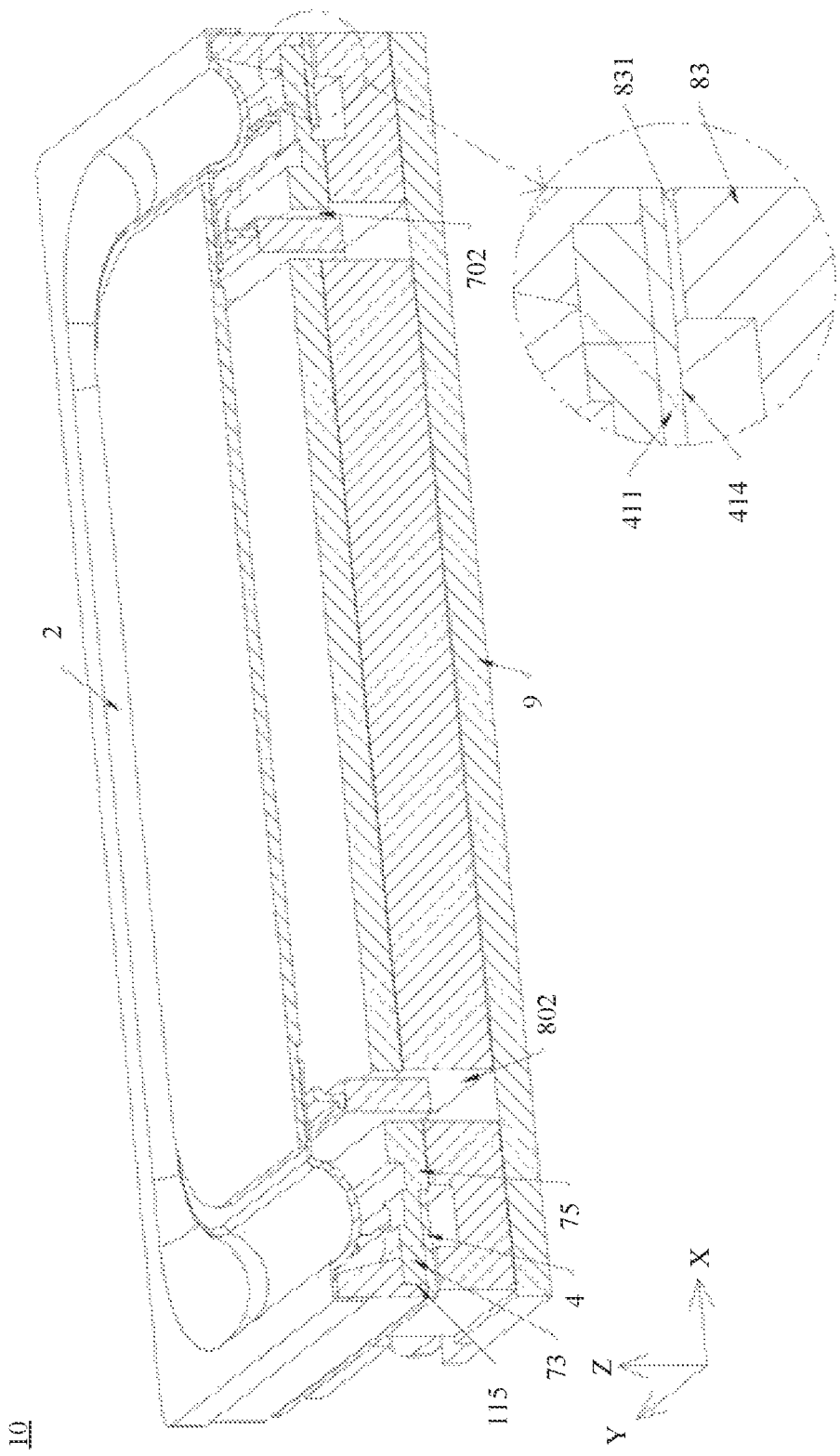
FIG. 67 is a schematic diagram of a structure obtained after the electroacoustic transducer shown in FIG. 36 is sectioned along II-II.

Refer to FIG. 66 and FIG. 67. FIG. 66 is a schematic diagram of a structure obtained after the electroacoustic transducer 10 shown in FIG. 36 is sectioned along W-W. FIG. 67 is a schematic diagram of a structure obtained after the electroacoustic transducer 10 shown in FIG. 36 is sectioned along II-II.

Figure 69:
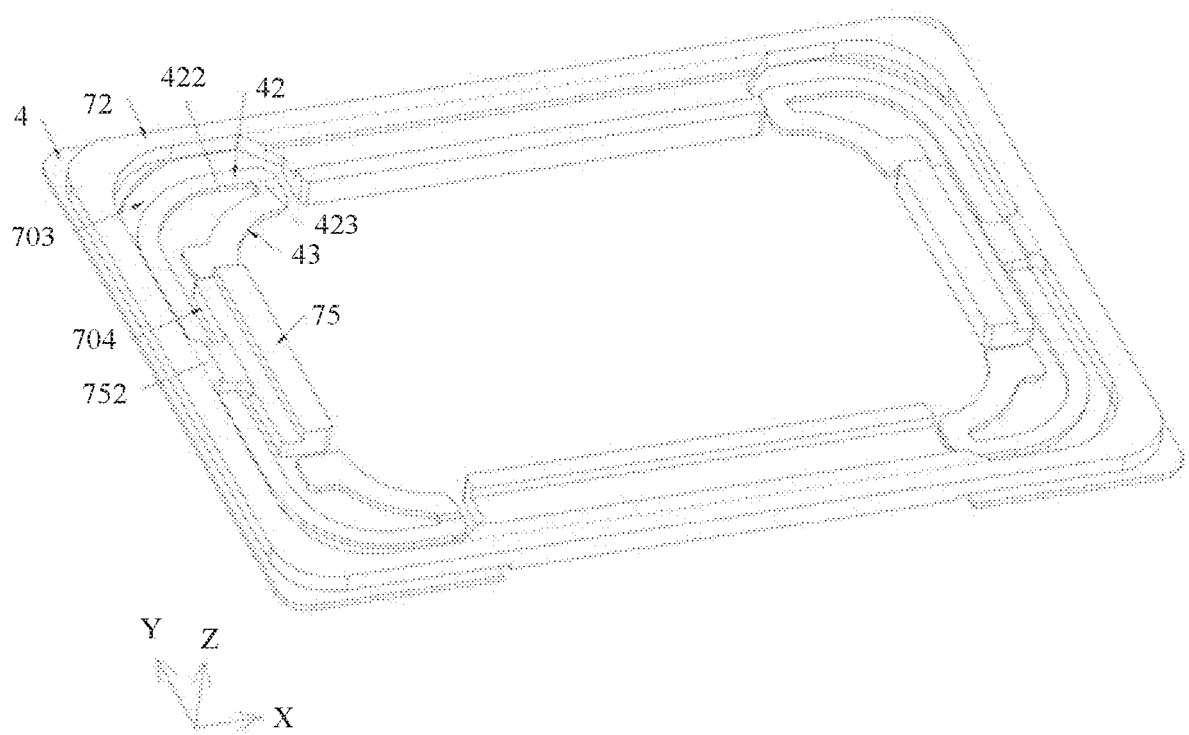
FIG. 69 is a schematic diagram of a partial structure of the electroacoustic transducer shown in FIG. 36.

The lower electrode plate 9 is located on a side that is of the auxiliary diaphragm 6 and that is away from the flexible circuit board 4, and is spaced apart from the framework 11 of the basket 1. Specifically, the lower electrode plate 9 is fastened to the plurality of feet 12 of the basket 1. Free ends of the plurality of feet 12 of the basket 1 may be accommodated in the clamping space 906 (as shown in FIG. 69) of the lower electrode plate 9, and the free end and an inner wall of the clamping space 906 may be fastened to each other through bonding.

The central magnet 81, the two first side magnets 82, and the two second side magnets 83 are all fastened to a side that is of the lower electrode plate 9 and that faces the framework 11. The two first side magnets 82 are respectively located on two sides of the central magnet 81, and the two second side magnets 83 are respectively located on the other two sides of the central magnet 81. The central electrode plate 71 is fastened on a side that is of the central magnet 81 and that faces the voice membrane 2, and is located between the central magnet 81 and the voice membrane 2.

The side electrode plate 72 is fastened on an inner side of the framework 11. Specifically, the connection frame part 73 of the side electrode plate 72 is snapped into the fastening groove 115 of the framework 11. The connection frame part 73 may be partially located in the fastening groove 115 and partially located outside the fastening groove 115. In this case, the limiting strip 15 of the basket 1 abuts against the connection frame part 73 of the side electrode plate 72.

The first electrode plate part 74 and the second electrode plate part 75 of the side electrode plate 72 are located outside the fastening groove 115. All of the avoidance groove 744 of the first electrode plate part 74 and the avoidance grooves 756 and 757 of the second electrode plate part 75 are connected to the inner space of the framework 11 of the basket 1, and directly face the vibration part 212 of the diaphragm 21 of the voice membrane 2, so that the vibration part 212 of the diaphragm 21 has larger vibration space, thereby implementing large-amplitude vibration of the voice membrane 2.

The voice coil 3 is connected to the voice membrane 2 by using a connection frame. Therefore, a spacing between the voice membrane 2 and the end part 412 that is of the voice coil 3 and that is away from the voice membrane 2 is large, so that the voice coil 3 can be fully inserted into the magnetic circuit component 10c, and a magnetic field generated by the magnetic circuit component 10c effectively acts on the voice coil 3. In addition, a spacing between the voice membrane 2 and the magnetic circuit component 10c is large, so that vibration space of the voice membrane 2 is large, thereby implementing large-amplitude vibration of the voice membrane 2.

Figure 68:
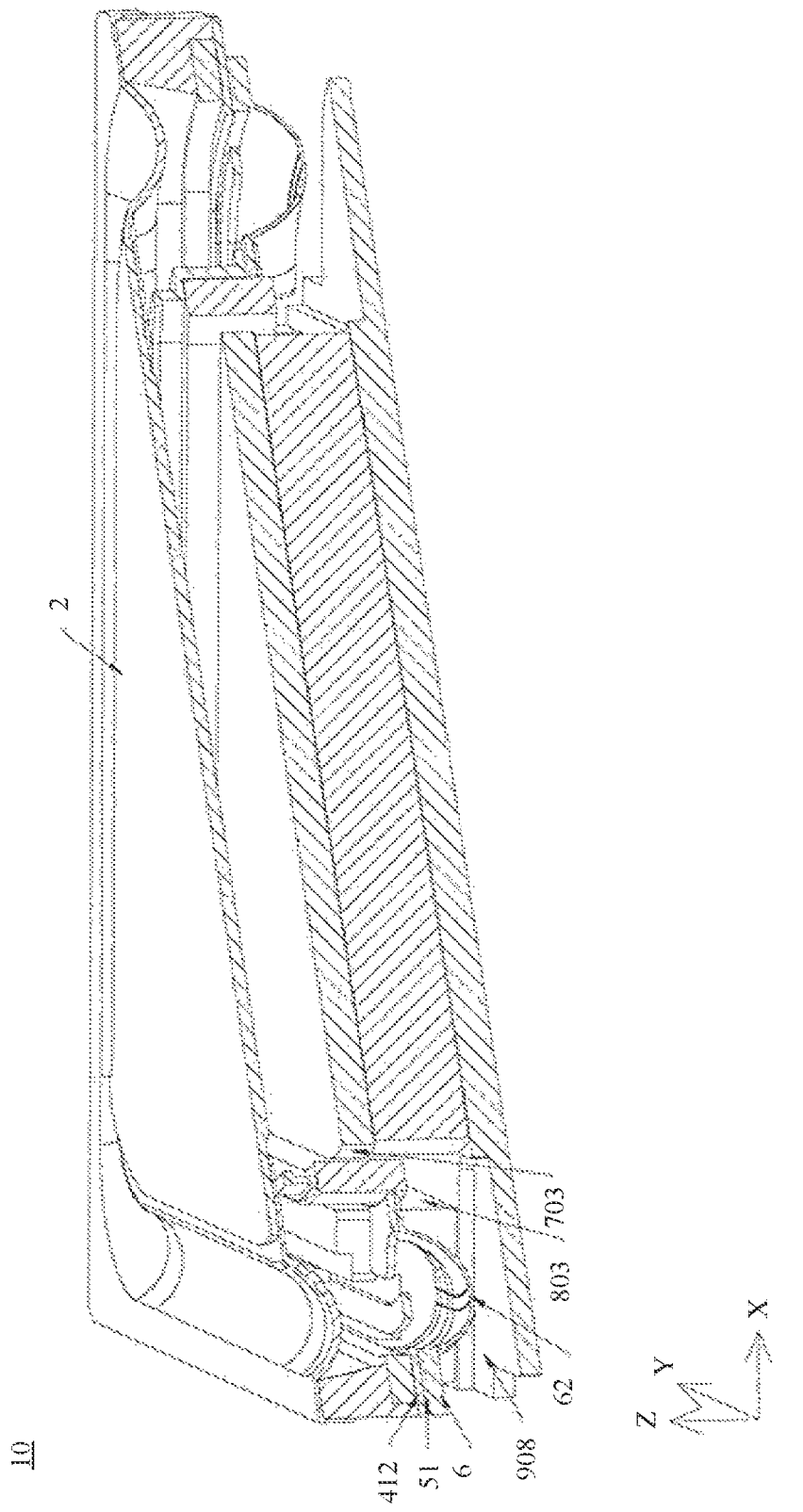
FIG. 68 is a schematic diagram of a structure obtained after the electroacoustic transducer shown in FIG. 36 is sectioned along III-III.

FIG. 68 is a schematic diagram of a structure obtained after the electroacoustic transducer 10 shown in FIG. 36 is sectioned along III-III.

An end that is of the voice coil 3 and that is away from the voice membrane 2 is partially located in the first gap 801, the third gap 802, and the connection gap 803, and is partially located in the second gap 701, the fourth gap 702, and the corner gap 703. In other words, the end that is of the voice coil 3 and that is away from the voice membrane 2 is located in the magnetic field provided by the magnetic circuit component 10c. When the voice coil 3 receives an audio signal transmitted by the flexible circuit board 4, the voice coil 3 moves up and down in the Z-axis direction to cut a magnetic line of the magnetic field, and drives the voice membrane 2, the flexible circuit board 4, the first gasket 51, and the auxiliary diaphragm 6 to vibrate.

The two flexible circuit boards 4, the four first gaskets 51, and the four auxiliary diaphragms 6 are symmetrically arranged on two sides of the central magnet 81. The flexible circuit board 4 is located on a side that is of the second side magnet 83 and that is away from the lower electrode plate 9. In other words, the second side magnet 83 is located between the flexible circuit board 4 and the lower electrode plate 9. The flexible circuit board 4 is located between the second side magnet 83 and the voice membrane 2. Specifically, the two flexible circuit boards 4 are respectively fastened to the two second side magnets 83. First fastening parts 41 of the two flexible circuit boards 4 are respectively fastened to the two second side magnets 83. The middle part 411 of the first fastening part 41 (as shown in FIG. 50) of the flexible circuit board 4 directly faces the second side magnet 83, and is fastened to the second side magnet 83. In this case, the bottom surface 414 of the first fastening part 41 of the flexible circuit board 4 is in contact with the top surface 831 of the second side magnet 83. For example, the middle part 411 of the first fastening part 41 may be fastened to the second side magnet 83 through bonding. In addition, the two end parts 412 of the first fastening part 41 of the flexible circuit board 4 directly face the connection gap 803 of the magnetic circuit component 10c.

FIG. 69 is a schematic diagram of a partial structure of the electroacoustic transducer 10 shown in FIG. 36. FIG. 69 shows only two flexible circuit boards 4 and the side electrode plate 72.

The head end (not shown in the figure) of the connection stub 42 of the flexible circuit board 4 directly faces the second portion 752 of the second electrode plate part 75 of the side electrode plate 72. The connection segment 422 and the tail end 423 of the connection stub 42 and the second fastening part 43 directly face the avoidance gap 704 and the corner gap 703 of the first electrode plate part 74. When the flexible circuit board 4 vibrates with the voice coil 3, amplitude of the flexible circuit board 4 gradually decreases from the second fastening part 43 to the first fastening part 41, amplitude of the head end 421 of the connection stub 42 is quite small or the head end 421 of the connection stub 42 does not vibrate, a distance between the second portion 752 of the second electrode plate part 75 and a groove bottom wall of the avoidance groove 834 of the second side magnet 83 is enough for the head end 421 of the connection stub 42 to vibrate, and the connection segment 423 and the tail end 423 of the connection stub 42 and the second fastening part 43 can also fully use the gaps of the side electrode plate 72 to vibrate, and do not touch the side electrode plate 72 when vibrating, so that reliability of using the electroacoustic transducer 10 is improved.

Refer to FIG. 68. One end of the auxiliary diaphragm 6 is connected to the end part 412 of the first fastening part 41 of the flexible circuit board 4 by using the first gasket 51, and the other end is connected to the stub tail end 435 of the second fastening part 43 of the flexible circuit board 4. The vibration part 62 of the auxiliary diaphragm 6 is located in the connection gap 803 and the corner gap 703 of the magnetic circuit component 10*c*, and may vibrate in the connection gap 803 and the corner gap 703. In addition, the vibration part 62 of the auxiliary diaphragm 6 directly faces the avoidance groove 908, so that the vibration part 62 of the auxiliary diaphragm 6 has large vibration space, thereby implementing large-amplitude vibration of the auxiliary diaphragm 6.

It should be understood that in a conventional electroacoustic transducer 10, when a voice coil 3 drives a voice membrane 2, a flexible circuit board 4, and an auxiliary diaphragm 6 to vibrate, a second fastening part 62 of the auxiliary diaphragm 6 moves with the voice coil 3, a first fastening part 61 of the auxiliary diaphragm 6 is fixed relative to a basket 1, and a vibration part 62 of the auxiliary diaphragm 6 moves with the second fastening part 63. In this case, the vibration part 62 of the auxiliary diaphragm 6 is likely to interfere with a lower electrode plate 9. Consequently, the electroacoustic transducer 10 generates noise, and the electroacoustic transducer 10 cannot implement large-amplitude vibration.

In the electronic device 1000 shown in this embodiment, because the flexible circuit board 4 and the auxiliary diaphragm 6 are connected to the outer side surface 303 of the voice coil 3 by using the auxiliary bobbin 34, the flexible circuit board 4 and the auxiliary diaphragm 6 multiplex the distance of the voice coil 3 in the thickness direction of the electroacoustic transducer 10, so that the three parts named the voice coil 3, the flexible circuit board 4, and the auxiliary diaphragm 6 are prevented from being superposed in the thickness direction of the electroacoustic transducer 10, vibration space between the vibration part 62 of the auxiliary diaphragm 6 and the lower electrode plate 9 is increased, and a risk of interference between the vibration part 62 of the auxiliary diaphragm 6 and the lower electrode plate 9 is avoided, thereby increasing amplitude of the electroacoustic transducer 10, implementing large-amplitude vibration of the electroacoustic transducer 10, and improving low-frequency sensitivity and loudness of the electroacoustic transducer 10.

Figure 70:
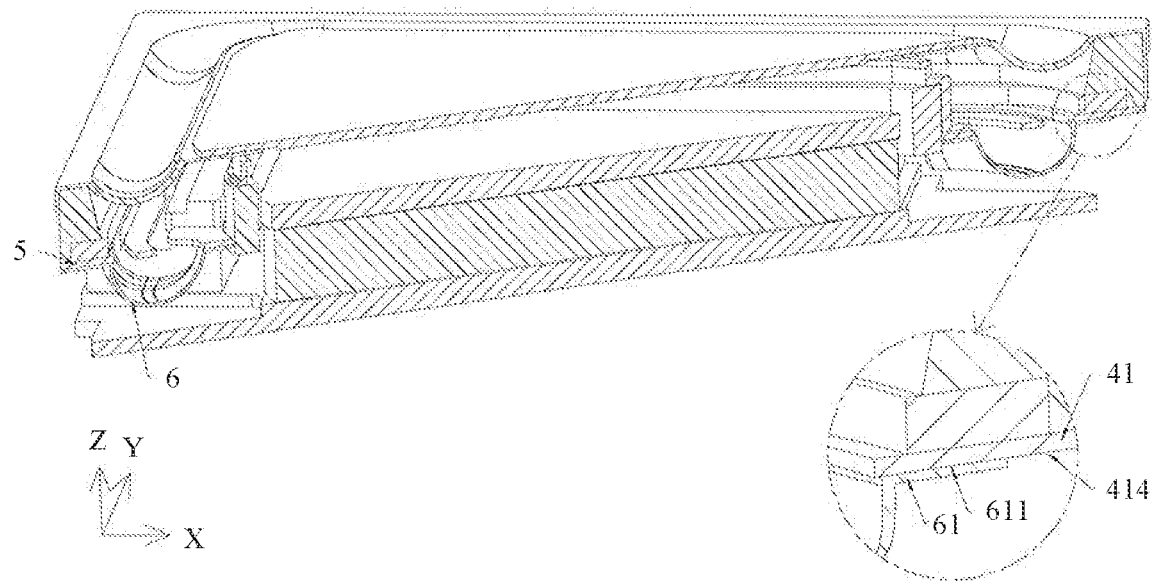
FIG. 70 is a schematic diagram of a structure obtained after an electroacoustic transducer in the third electronic device is sectioned along III-III according to an embodiment of this application.

FIG. 70 is a schematic diagram of a structure obtained after an electroacoustic transducer 10 in the third electronic device is sectioned along III-III according to an embodiment of this application.

An embodiment of this application further provides the third electronic device. The third electronic device is different from the foregoing second electronic device 1000 in that a vibration component 10*b* of the electroacoustic transducer 10 does not include a first gasket, and a first fastening part 61 of an auxiliary diaphragm 6 is fastened to a first fastening part 41 of a flexible circuit board 4. Specifically, the first fastening part 61 of the auxiliary diaphragm 6 is fastened to an end part (not shown in the figure) of the first fastening part 41 of the flexible circuit board 4. A top surface 611 of the first fastening part 61 of the auxiliary diaphragm 6 is in contact with a bottom surface 414 of the first fastening part 41 of the flexible circuit board 4. For example, the first fastening part 61 of the auxiliary diaphragm 6 and the end part 412 of the first fastening part 41 of the flexible circuit board 4 may be fastened to each other through bonding.

In the electronic device 1000 shown in this embodiment, because the flexible circuit board 4 and the auxiliary diaphragm 6 are connected to an outer side surface 303 of a voice coil 3 by using an auxiliary bobbin 34, the flexible circuit board 4 and the auxiliary diaphragm 6 multiplex a distance of the voice coil 3 in a thickness direction of the electroacoustic transducer 10, so that the three parts named the voice coil 3, the flexible circuit board 4, and the auxiliary diaphragm 6 are prevented from being superposed in the thickness direction of the electroacoustic transducer 10, vibration space between a vibration part 62 of the auxiliary diaphragm 6 and a lower electrode plate 9 is increased, and a risk of interference between the auxiliary diaphragm 6 and the lower electrode plate 9 is avoided, thereby increasing amplitude of the electroacoustic transducer 10, implementing large-amplitude vibration of the electroacoustic transducer 10, and improving low-frequency sensitivity and loudness of the electroacoustic transducer 10.

It should be noted that another structure of the electronic device shown in this embodiment is basically the same as another structure of the electronic device 1000 shown in the foregoing second embodiment. To avoid repetition, details are not described herein again.

The foregoing descriptions are merely specific embodiments of this application, but are not intended to limit the protection scope of this application. Any change or replacement readily figured out by a person skilled in the art within the technical scope disclosed in this application shall fall within the protection scope of this application. Without conflicting, embodiments of this application and features in the embodiments may be mutually combined. Therefore, the protection scope of this application shall be subject to the protection scope of the claims.

What is claimed is:
1. An electroacoustic transducer comprising:
a framework comprising:
   a first top surface;
   a first bottom surface; and
   a first inner side;
a voice membrane comprising an edge fastened to the first top surface;
a voice coil located on the first inner side and comprising a first end fastened to the voice membrane;
a flexible circuit board comprising:
   a first side;
   a first fastening part fastened to the first bottom surface;
   a connection stub; and
   a second fastening part fastened to the voice coil, wherein the first fastening part, the connection stub, and the second fastening part are sequentially coupled;
an auxiliary diaphragm located on the first side and comprising:
   a third fastening part fastened to the first fastening part;
   a vibration part protruded in a direction away from the connection stub; and a fourth fastening part fastened to the second fastening part, wherein the third fastening part, the vibration part, and the fourth fastening part are sequentially coupled; and a first gasket located between the first fastening part and the third fastening part.

2. The electroacoustic transducer of claim 1, further comprising a second gasket located between the second fastening part and the fourth fastening part.

3. The electroacoustic transducer of claim 1, wherein the first side is away from the voice membrane, wherein the voice coil comprises an outer side surface, and wherein the second fastening part is fastened to the outer side surface.

4. The electroacoustic transducer of claim 3, wherein the voice coil further comprises:
 a second top surface; and
 a second bottom surface comprising a second side facing the second top surface,
 wherein the electroacoustic transducer further comprises an auxiliary bobbin fastened to the outer side surface,
 wherein the auxiliary bobbin comprises a third bottom surface located on the second side, and
 wherein the second fastening part is fastened to the third bottom surface.

5. The electroacoustic transducer of claim 4, further comprising a voice coil bobbin located between the voice membrane and the voice coil, and wherein the voice coil bobbin is integral with the auxiliary bobbin.

6. The electroacoustic transducer of claim 3, wherein the voice coil further comprises:
 a second top surface; and
 a second bottom surface comprising a second side facing the second top surface, and
 wherein the fourth fastening part comprises a third bottom surface that is either flush with the second bottom surface or located on the second side.

7. The electroacoustic transducer of claim 1, wherein the framework further comprises a second side located away from the voice membrane, wherein the voice coil further comprises a second end located away from the voice membrane, and wherein the electroacoustic transducer further comprises:
 a lower electrode plate located on the second side and comprising a second top surface;
 a central magnet fastened to the second top surface; and
 two first side magnets fastened to the second top surface and symmetrically arranged on two sides of the central magnet, wherein a first gap is provided between each of the two first side magnets and the central magnet, and wherein the second end is partially located in the first gap.

8. The electroacoustic transducer of claim 7, wherein the central magnet comprises a third side located away from the lower electrode plate, and wherein the electroacoustic transducer further comprises:
 a central electrode plate fastened on the third side; and
 a side electrode plate-fastened to the first inner side, spaced apart from the flexible circuit board, and comprising two first electrode plate parts respectively directly facing the two first side magnets,
 wherein a second gap is provided between each of the two first electrode plate parts and the central electrode plate, wherein the second gap is coupled to the first gap, and wherein the voice coil is partially located in the second gap.

9. The electroacoustic transducer of claim 8, wherein the central magnet further comprises two fourth sides, wherein the lower electrode plate comprises two third ends that are bent to form two mounting parts through extension, wherein the two mounting parts are symmetrically disposed on the two fourth sides, wherein a third gap is provided between each of the two mounting parts and the central magnet, wherein the side electrode plate further comprises a connection frame part comprising a second inner side, wherein each of the two first electrode plate parts is located on the second inner side, wherein a portion of the connection frame part directly faces the two mounting parts, wherein a fourth gap is provided between the portion and the central electrode plate, wherein the fourth gap is coupled to the third gap, wherein a first part of the voice coil is located in the third gap, and wherein a second part of the voice coil is located in the fourth gap.

10. The electroacoustic transducer of claim 1, further comprising:
 a lower electrode plate comprising a second top surface;
 a central magnet comprising two second sides;
 two flexible circuit boards, wherein one of the two flexible circuit boards comprises:
  a fifth fastening part comprising a first middle part; and
  a sixth fastening part comprising a second middle part;
 two auxiliary diaphragms comprising vibration parts, wherein each of the two auxiliary diaphragms comprises a sixth fastening part that is fastened to the first middle part; and
 two first gaskets, wherein each of the two first gaskets is fastened to the second middle part,
 wherein the two flexible circuit boards, the two auxiliary diaphragms, and the two first gaskets are symmetrically disposed on the two second sides; and
 two avoidance grooves disposed on the lower electrode plate, wherein openings of the two avoidance grooves are located on the second top surface and respectively directly face the vibration parts.

11. The electroacoustic transducer of claim 8, wherein the central magnet further comprises two fourth sides, wherein the electroacoustic transducer further comprises two second side magnets symmetrically disposed on the two fourth sides, wherein a third gap is provided between each of the two second side magnets and the central magnet, wherein the side electrode plate further comprises a second electrode plate part directly facing each of the two second side magnets, wherein a fourth gap is provided between the second electrode plate part and the central electrode plate, wherein the fourth gap is coupled to the third gap, wherein a first part of the voice coil is located in the third gap, and wherein a second part of the voice coil is located in the fourth gap.

12. The electroacoustic transducer of claim 7, wherein the central magnet comprises two third sides, and wherein the electroacoustic transducer further comprises:
 two flexible circuit boards, wherein one of the two flexible circuit boards comprises:
  a fifth fastening part comprising two fastening end parts; and
  a sixth fastening part comprising two end parts;
 four auxiliary diaphragms comprising vibration parts, wherein seventh fastening parts of every two auxiliary diaphragms of the four auxiliary diaphragms are respectively fastened to the two fastening end parts;
 four first gaskets, wherein every two first gaskets of the four first gaskets are respectively fastened to the two end parts, wherein the two flexible circuit boards, the four auxiliary diaphragms, and the four first gaskets are separately symmetrically arranged on the two third sides; and
four avoidance grooves disposed on the lower electrode plate, wherein openings of the four avoidance grooves are located on the second top surface and respectively directly face the vibration parts.

13. The electroacoustic transducer of claim 1, further comprising:
a lower electrode plate; and
a basket comprising:
the framework; and
a plurality of feet fastened to the first bottom surface at intervals and further fastened to the lower electrode plate.

14. The electroacoustic transducer of claim 1, wherein a thickness of the first gasket comprises a value between 0.1 millimeters (mm) and 0.5 mm.

15. The electroacoustic transducer of claim 1, wherein the first gasket is a copper sheet, an aluminum foil sheet, a polyimide reinforcement plate, a glass fiber reinforcement plate, a copper ring, a plastic ring, or a steel ring.

16. An electroacoustic transducer comprising:
a framework comprising:
a first top surface;
an inner side;
a first bottom surface; and
a first side;
a voice membrane comprising an edge fastened to the first top surface;
a voice coil located on the inner side and comprising:
a first end fastened to the voice membrane; and
an outer side surface;
a flexible circuit board comprising:
a first fastening part fastened to the first bottom surface;
a connection stub; and
a second fastening part fastened to the outer side surface, wherein the first fastening part, the connection stub, and the second fastening part are sequentially coupled;
an auxiliary diaphragm located on the first side and comprising:
a second side that is away from the flexible circuit board;
a third fastening part fastened to the first fastening part;
a vibration part protrudes in a direction away from the connection stub; and
a fourth fastening part fastened to the second fastening part, wherein the third fastening part, the vibration part, and the fourth fastening part are sequentially coupled; and
a lower electrode plate having a first mounting part located on the first side that is away from the voice membrane, spaced apart from the framework, and a second mounting part located on the second side.

17. The electroacoustic transducer of claim 16, wherein the voice coil further comprises:
a second top surface; and
a second bottom surface comprising a third side facing the second top surface,
wherein the electroacoustic transducer further comprises an auxiliary bobbin located on the inner side and fastened to the outer side surface,
wherein the auxiliary bobbin comprises a third bottom surface located on the third side, and
wherein the second fastening part is further fastened to the third bottom surface.

18. An electronic device comprising:
a housing;
a display fastened to the housing; and
an electroacoustic transducer accommodated inside the housing and comprising:
a framework comprising:
a first top surface;
a first bottom surface; and
a first inner side;
a voice membrane comprising an edge fastened to the first top surface;
a voice coil located on the first inner side and comprising a first end fastened to the voice membrane;
a flexible circuit board comprising:
a first side;
a first fastening part fastened to the first bottom surface;
a connection stub; and
a second fastening part fastened to the voice coil, wherein the first fastening part, the connection stub, and the second fastening part are sequentially coupled;
an auxiliary diaphragm located on the first side and comprising:
a third fastening part fastened to the first fastening part;
a vibration part protruded in a direction away from the connection stub; and
a fourth fastening part fastened to the second fastening part, wherein the third fastening part, the vibration part, and the fourth fastening part are sequentially coupled; and
a first gasket located between the first fastening part and the third fastening part; and
a receiving hole configured to transmit a sound emitted by the electroacoustic transducer to the outside of the electronic device, wherein the receiving hole is disposed on the housing, or on the display between a second edge of the display and the housing.

19. The electronic device of claim 18, wherein the electroacoustic transducer further comprises a second gasket located between the second fastening part and the fourth fastening part.

20. The electronic device of claim 18, wherein the first side is away from the voice membrane, wherein the voice coil comprises an outer side surface, and wherein the second fastening part is fastened to the outer side surface.

* * * * *